(12) United States Patent
Ishikawa et al.

(10) Patent No.: US 12,450,948 B2
(45) Date of Patent: Oct. 21, 2025

(54) INFORMATION PROCESSING SYSTEM AND AN INFORMATION PROCESSING METHOD

(71) Applicant: PARAMOUNT BED CO., LTD., Tokyo (JP)

(72) Inventors: Takashi Ishikawa, Tokyo (JP); Yuuki Nakamura, Tokyo (JP); Kazuki Kouke, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 370 days.

(21) Appl. No.: 18/120,116

(22) Filed: Mar. 10, 2023

(65) Prior Publication Data

US 2024/0037991 A1 Feb. 1, 2024

(30) Foreign Application Priority Data

Aug. 1, 2022 (JP) .................................. 2022-122896

(51) Int. Cl.
*G06V 40/20* (2022.01)
*G06T 7/215* (2017.01)
(Continued)

(52) U.S. Cl.
CPC .............. *G06V 40/20* (2022.01); *G06T 7/215* (2017.01); *G06T 7/62* (2017.01); *G06V 10/273* (2022.01); *G06V 10/94* (2022.01); *G06V 20/68* (2022.01)

(58) Field of Classification Search
CPC . A61B 5/0002; A61B 5/02438; A61B 5/6804; A61B 5/6808; A61B 5/0022;
(Continued)

(56) References Cited

U.S. PATENT DOCUMENTS

2012/0135384 A1* 5/2012 Nakao ................ G09B 19/0092
434/127
2013/0246088 A1* 9/2013 Huster ............... G06Q 10/0635
705/2
(Continued)

FOREIGN PATENT DOCUMENTS

CN 114005540 A * 2/2022
JP 2007-7195 A 1/2007
(Continued)

OTHER PUBLICATIONS

Cao et al., "Realtime Multi-Person 2D Pose Estimation using Part Affinity Fields", Apr. 14, 2017, Total 9 pages. https://arxiv.org/pdf/1611.08050.pdf.
(Continued)

*Primary Examiner* — John Villecco
*Assistant Examiner* — Kyla Guan-Ping Tiao Allen
(74) *Attorney, Agent, or Firm* — BIRCH, STEWART, KOLASCH & BIRCH, LLP

(57) ABSTRACT

An information processing device including a processor configured to perform a first processing related to a position of at least one of a person and an object around the person using a positioning application and perform a second processing to determine an amount of food eaten by the person using a meal application, wherein the processor is configured to change an operation mode of the positioning application from a first mode to a second mode with a higher processing load of the positioning application than the first mode if the meal application determines at least one of the amount of the food or an amount of nutrients is insufficient.

13 Claims, 23 Drawing Sheets

(51) Int. Cl.
*G06T 7/62* (2017.01)
*G06V 10/26* (2022.01)
*G06V 10/94* (2022.01)
*G06V 20/68* (2022.01)

(58) Field of Classification Search
CPC ...... A61B 5/202; G06V 40/20; G06V 10/273; G06V 10/94; G06V 20/68; G06V 20/52; G06T 7/215; G06T 7/62; G06T 7/20; G06T 2207/10024; G06T 2207/20056; G06T 2207/20084; G06T 2207/30196; G16H 20/60; G16H 10/60; G16H 50/30; G06Q 50/12
See application file for complete search history.

(56) References Cited

U.S. PATENT DOCUMENTS

2019/0175093 A1     6/2019  Suzuki
2020/0005455 A1*    1/2020  Alshurafa .............. G01N 21/27
2020/0060910 A1*    2/2020  Lightcap ................ H04N 7/188
2020/0243196 A1     7/2020  Ohno et al.

FOREIGN PATENT DOCUMENTS

| | | | | |
|---|---|---|---|---|
| JP | 2017-93809 A | 6/2017 | | |
| JP | 2019-39788 A | 3/2019 | | |
| JP | 2021-18760 A | 2/2021 | | |
| KR | 102389091 A1 * | 4/2022 | | |
| WO | WO-2013138614 A1 * | 9/2013 | ........... | A61B 5/1071 |
| WO | WO-2018069262 A1 * | 4/2018 | ........... | A61B 5/1117 |

OTHER PUBLICATIONS

Yanai et al., "Food Image Recognition Using Deep Convolutional Network With Pre-Training and Fine-Tuning", IEEE International Conference on Multimedia & Expo Workshops (ICMEW), Jun. 29, 2015, Total 6 pages. http://img.cs.uec.ac.jp/pub/conf15/150703yanai_0.pdf.

* cited by examiner

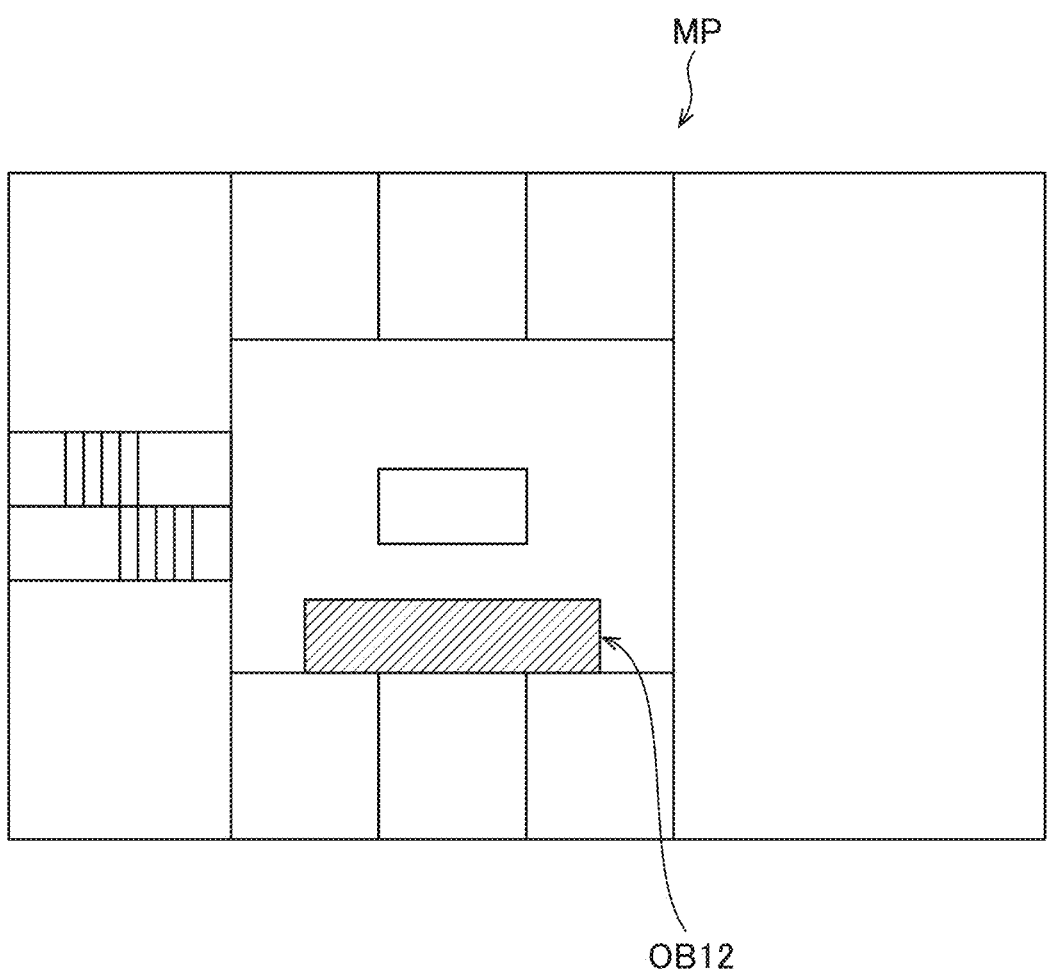

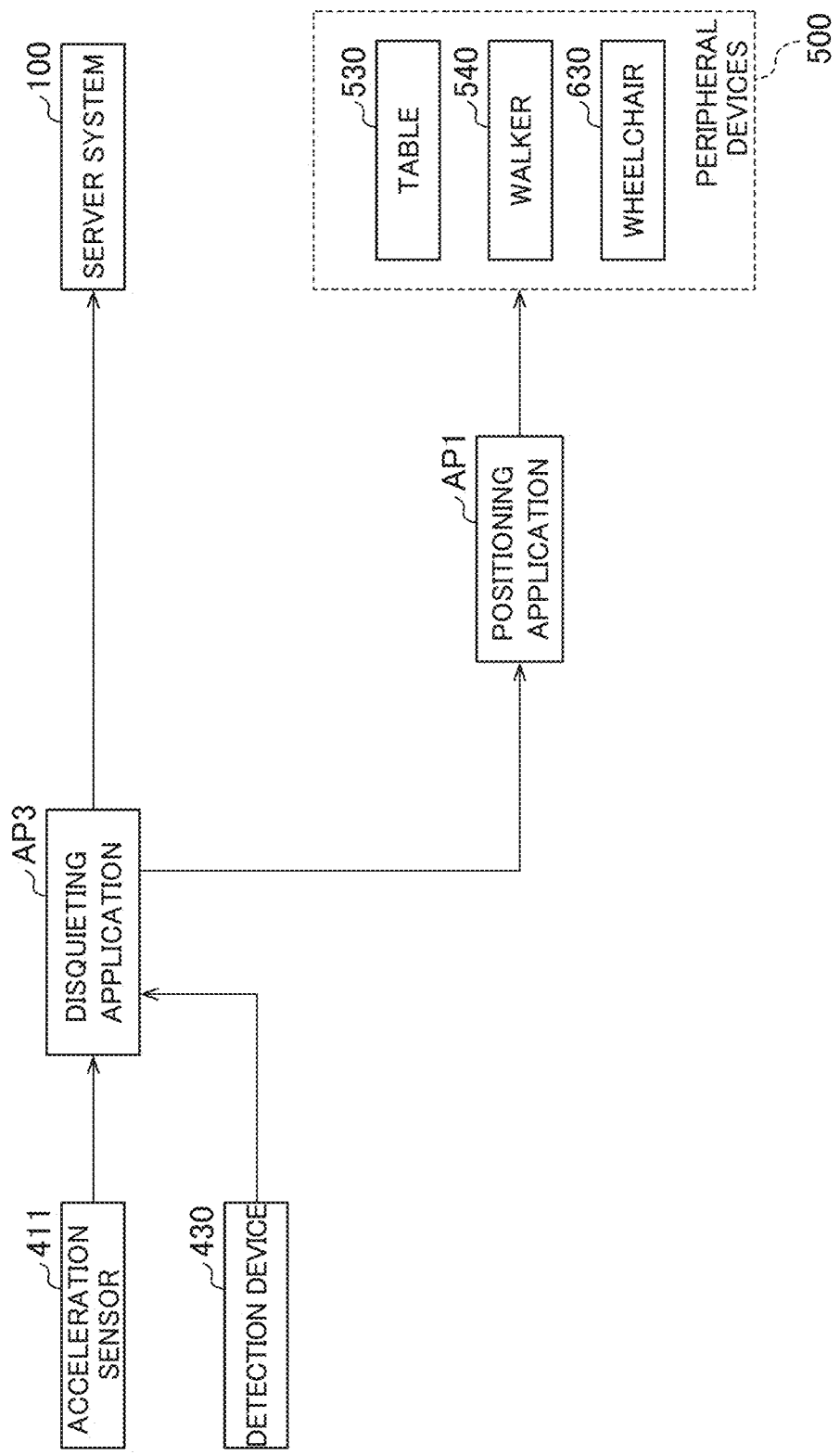

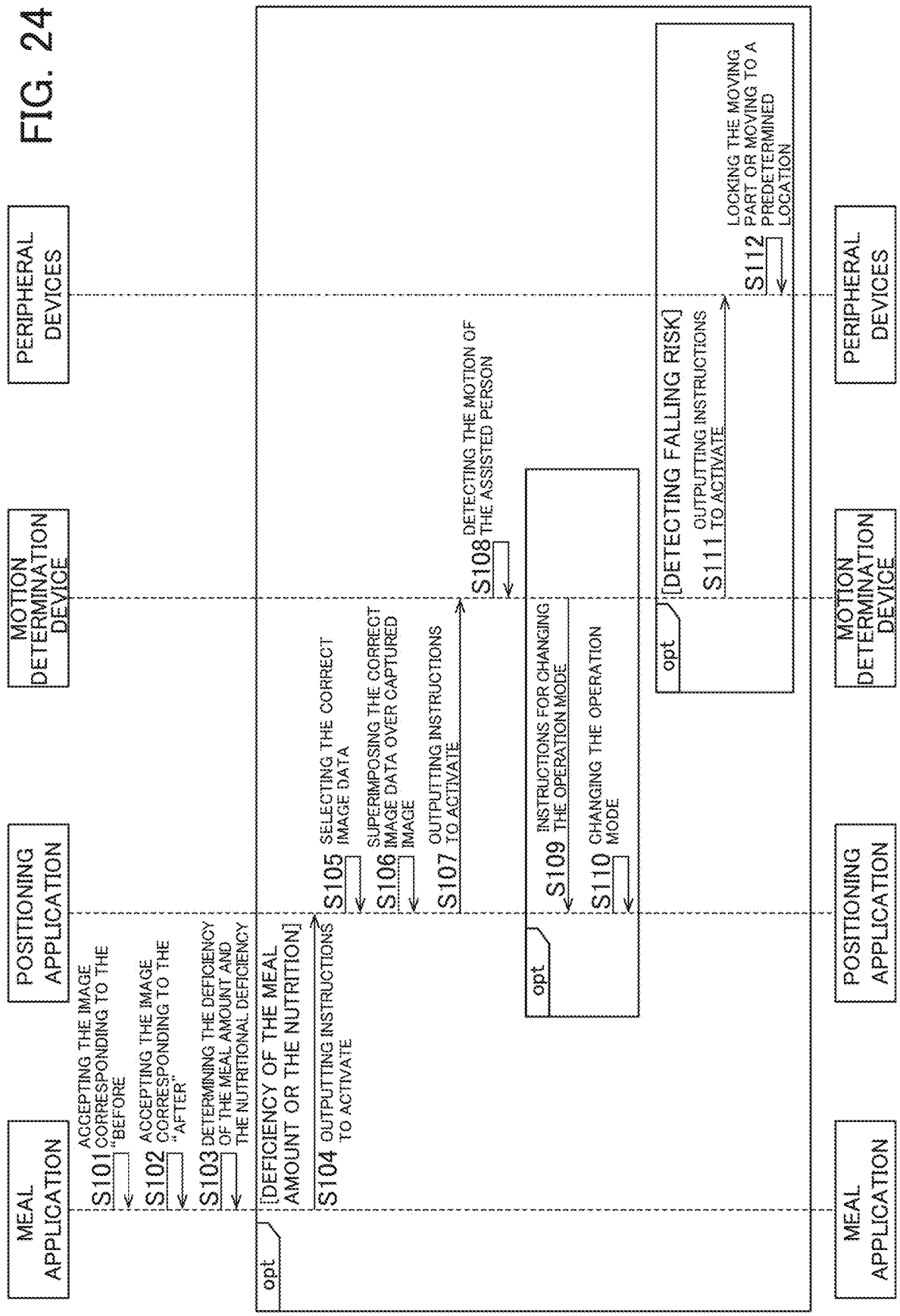

INFORMATION PROCESSING SYSTEM AND AN INFORMATION PROCESSING METHOD

CROSS-REFERENCE TO RELATED APPLICATIONS

This Non-provisional application claims priority under 35 U. S. C. § 119 (a) on Patent Application No. 2022-122896 filed in Japan on Aug. 1, 2022, the entire contents of which are hereby incorporated by reference.

FIELD

The present embodiment relates to the information processing system and the information processing method.

BACKGROUND

There is a conventionally system used in a situation where a caregiver assists an assisted person. The Japanese patent application publication No. 2021-18760 discloses a method to generate provided information related to the state of a resident in a living space based on a time change in the detection information acquired by the sensor which is placed in the living room.

BRIEF DESCRIPTION OF THE DRAWINGS

FIG. 22 is a screen example of information acquired by communication tags, etc.
FIG. 23 illustrates a cooperation example of a positioning application in view of disquieting behavior.
FIG. 24 is a sequence diagram to explain the processing flow of the information processing system of this embodiment.

DESCRIPTION OF THE PREFERRED EMBODIMENTS

Figure 1:
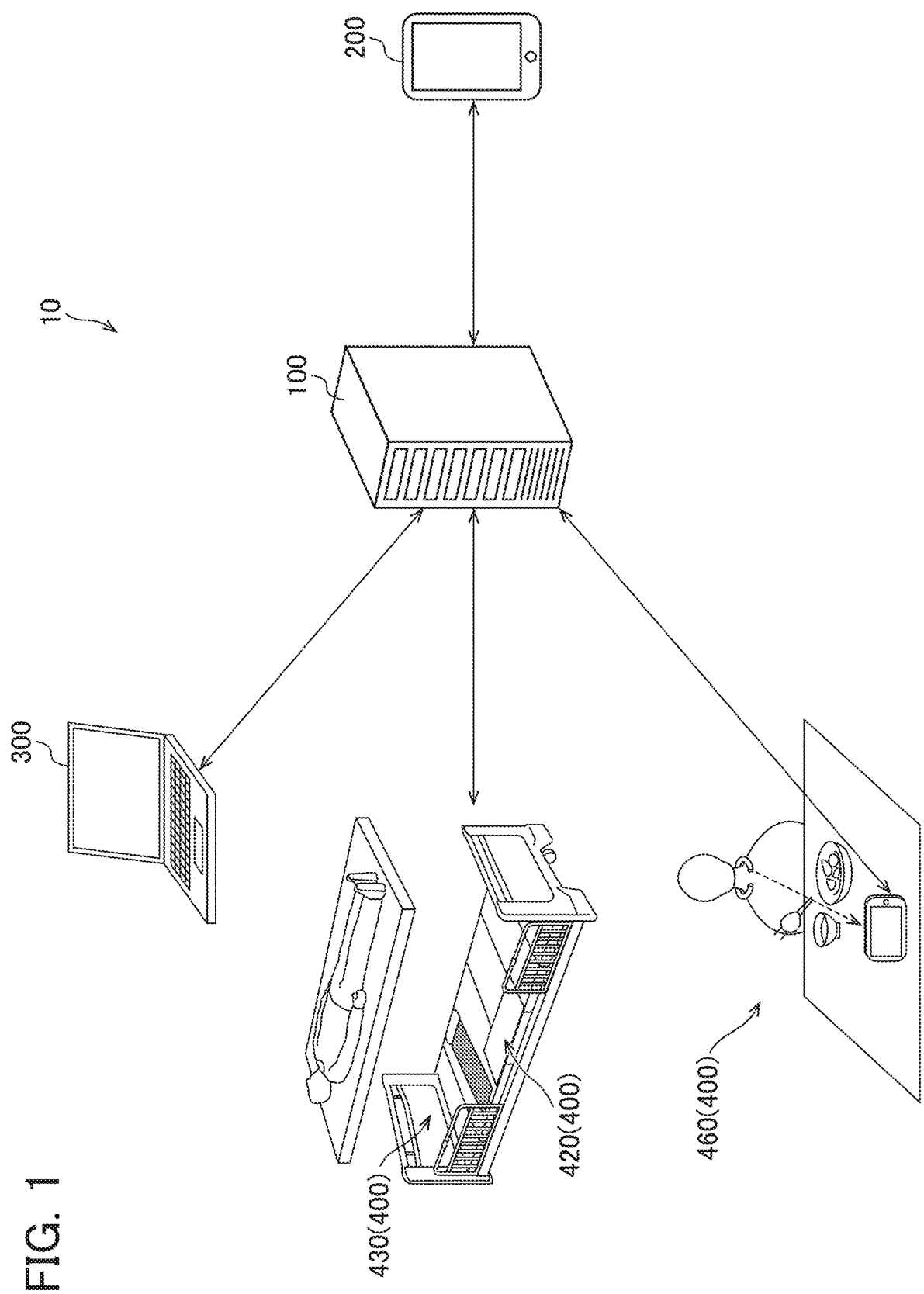
FIG. 1 shows an example of the configuration of an information processing system.

In general, one aspect of the present application is an information processing device including a processor configured to perform a first processing related to a position of at least one of a person and an object around the person using a positioning application and perform a second processing to determine an amount of food eaten by the person using a meal application, wherein the processor is configured to change an operation mode of the positioning application from a first mode to a second mode with a higher processing load of the positioning application than the first mode if the meal application determines at least one of an amount of the food or the amount of nutrients is insufficient.

Another aspect of the present application is an information processing method performed by an information processing system including a processor, the information processing method including a step of performing a first processing related to a position of at least one of a person and an object around the person using a positioning application, a step of performing a second processing to determine an amount of food eaten by the person using a meal application; and a step of changing an operation mode of the positioning application from a first mode to a second mode with a higher processing load of the positioning application than the first mode if the meal application determines at least one of an amount of the food or the amount of nutrients is insufficient.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The present embodiment will be described below with reference to the drawings. In the case of drawings, the same or equivalent elements shall be denoted by the same symbols, and duplicate descriptions shall be omitted. It should be noted that this embodiment described below does not unreasonably limit the contents of the claims. Also, not all of the configurations described in this embodiment are necessarily essential components of this disclosure.

1. System Configuration Example

The FIG. 1 shows an example of the configuration of the information processing system 10 according to the present embodiment. The information processing system 10 according to the present embodiment provides instructions to the caregiver so that the caregiver can provide appropriate assistance regardless of the skill level by digitizing the caregiver's hunch or tacit knowledge about the tasks or work used by the caregiver's hunch or tacit knowledge, for example, in a medical facility, a hospital, or a nursing home.

The caregiver may be a worker at a nursing home, a nursing assistant, a registered nurse, or a licensed practical nurse at a medical facility such as a hospital. That is, assistance in this embodiment includes a variety of actions to support the assisted person and may include a nursing care or medical treatment such as injections. In addition, the assisted person here may be a person who receives assistance from the caregiver, may be a resident of the nursing home or the nursing facilities, or may be a patient admitted to a hospital or attending a hospital. In addition, the assisted person may be, for example, an assisted person who may be suffering from dementia.

In addition, the caregiver may provide the assistance in this embodiment at home. For example, the assisted person in this embodiment may be a person requiring the assistance at home or a patient receiving the assistance or the treatment at home. The caregiver may be a family member of the assisted person or the patient, or may be a visiting caregiver to provide the assistance at the assisted person's home.

As shown in the FIG. 1, the information processing system 10 includes a server system 100, a terminal device 200, management terminal device 300, and a sensing device 400. The information processing system 10 of this embodiment includes a device which the positioning application AP1 had installed. This device can operate at least the positioning application AP1. The positioning application AP1 here is software that performs a processing regarding the position of at least one of a person and an object in the assistance. The positioning application AP1 may operate, for example, on the terminal device 200. However, this does not prevent the positioning application AP1 from operating on other devices such as the server system 100, the sensing device 400, etc.

The configuration of the information processing system 10 is not limited to the FIG. 1, and we may modify this configuration of the information processing system 10 such as omitting some components or adding others components. For example, in the FIG. 1, there are some examples such as a bedside sensor 420 described later using the FIG. 9, a detection device 430, and a swallowing choke detection device 460 described later using the FIG. 15 as the sensing devices 400. But the sensing device 400 is not limited to these above examples, and may be a seat sensor 440 described later with the reference to the FIG. 13, a motion determination device 410 described later with the reference to the FIG. 14, or a communication tag 470 described later with the reference to the FIG. 18, etc. For the sake of explanation when the multiple sensing devices 400 need not be distinguished from each other, they are simply referred to as the sensing devices 400 in the following explanation.

The server system 100 is electrically connected or communicable to the terminal devices 200, management terminal devices 300, and sensing devices 400 through a network, for example. The network here is, for example, a public communication network such as the Internet. However, the network is not limited to the public communication network and may be a LAN (Local Area Network) or the like. For example, the server system 100 may communicate in accordance with the IEEE 802.11 standard. However, various modifications can be made to the communication method between a plurality of devices.

The server system 100 may be a single server or may include multiple servers. For example, the server system 100 may include a database server and an application server. The database server may store at least one of the processing results at the terminal devices 200 and the processing results at the sensing devices 400. The application server performs various processing. For example, the information processing system 10 of this embodiment may be realized by distributed processing, and at least part of the processing performed by the terminal devices 200 or the sensing device 400 in the following explanation may be performed by the application server. The multiple servers here may be physical servers or virtual servers. If a virtual server is used, the virtual server may be located on one physical server or distributed among multiple physical servers. As described above, the detailed configuration of the server system 100 in this embodiment can be modified in various ways.

The terminal device 200 is a device used, for example, by the caregiver who assists the assisted person. Here, the terminal device 200 is a mobile terminal device such as a smartphone or tablet. However, the terminal device 200 may be another type device such as PC (Personal Computer), a headset, or a wearable device such as an AR (Augmented Reality) glass or MR (Mixed Reality) glass. One caregiver may also use a plurality of terminal devices 200. The caregivers, for example, may use both a smartphone and a headset. Also, the terminal device 200 in this embodiment may be a device carried by the caregiver, or may be a device installed at a predetermined location in the nursing home or the nursing facilities.

The management terminal device 300 is a device used to manage information of the assisted person who is a resident, for example, in the nursing home or the nursing facilities. The management terminal device 300 is, for example, a PC, but another type device may be used. The management terminal device 300, for example, has a nursing software installed, and performs the management of the assisted person and the schedule management of the caregiver (the staff of the nursing home or the nursing facilities). The nursing software includes an electronic health record or an electronic health record, for example. The management terminal device 300 may store information about the attributes of the assisted person such as an age, a sex, a height, a weight, a medical history, or a medication history, etc.

The sensing device 400 is a device used to assist the assisted person. For example, the sensing device 400 has various sensors and acquires sensing data from the sensors. The sensing data here may be the output data itself from the sensors or the data obtained by arithmetic processing from the output data from the sensors. The sensing device 400 may output certain data to the device which the positioning application AP1 had installed. The certain data may be used when setting up or using the positioning application AP1. The sensing device 400 may be a device whose operating mode changes based on the processing result of the positioning application AP1. The sensing device 400 may be a device that switches a status of the positioning application AP1 between an active status and an inactive status or changes the function to be used based on the processing result of the sensing devices 400.

Figure 2:
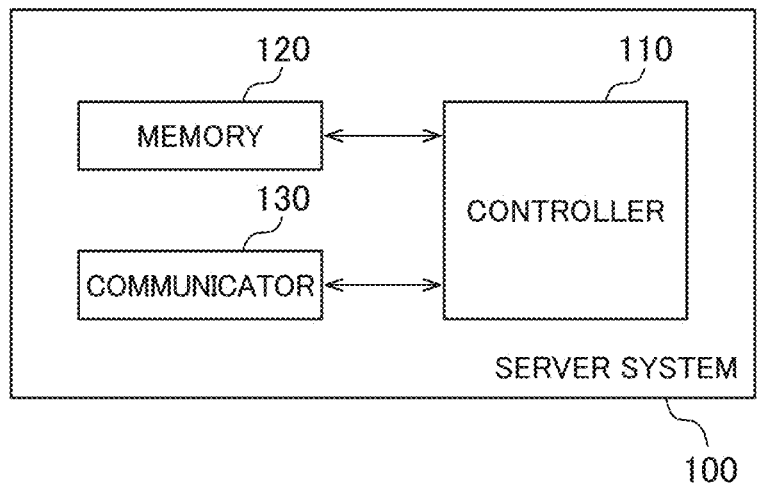
FIG. 2 shows an example of the configuration of a server system.

The FIG. 2 is a block diagram showing a detailed configuration example of the server system 100. The server system 100 includes, for example, a controller 110, a memory 120, and a communicator 130.

The controller 110 of this embodiment includes the following hardware. The hardware may include at least one of a circuit for processing digital signals and a circuit for processing analog signals. For example, the hardware can include one or more circuit devices mounted on a circuit board or one or more circuit elements. One or more circuit devices are, for example, integrated circuits (ICs), field-programmable gate arrays (FPGAs), etc. One or more circuit elements are, for example, resistors, capacitors, etc.

The controller 110 may be realized by the following processors. The server system 100 of this embodiment includes a memory for storing information and a processor operating based on the information stored in the memory. The information is, for example, programs and various kinds of data. The memory in the controller 110 may be the memory 120 or other memory. The processor includes the hardware. It is possible to use a variety of processors, such as a CPU (Central Processing Unit), a GPU (Graphics Processing Unit), and a DSP (Digital Signal Processor). The memory may be a semiconductor memory such as SRAM (Static Random Access Memory), DRAM (Dynamic Random Access Memory), or flash memory, or may be a register, a magnetic storage device such as a hard disk drive (HDD), or an optical storage device such as an optical disk device. For example, the memory stores instructions that can be read by a computer, and when the processor reads and performs the instructions, the controller 110 performs a predetermined processing corresponding to the read instruction. The instructions here may be instructions for a set of instructions that make up a computer program or instructions for operating the hardware circuitry of the processor.

The memory 120 is a work area of the controller 110 and includes various memories such as SRAM, DRAM, ROM (Read Only Memory) or flash memory, a register, a magnetic storage device or an optical storage device.

The communicator 130 is an interface for communication through a network and includes, for example, an antenna, an RF (radio frequency) circuit, and a baseband circuit when the server system 100 performs wireless communication. But the server systems 100 may perform a wire communication when the communicator 130 may include a communication interface, such as an Ethernet connector, and a control circuit of the communication interface, etc. The communicator 130 may operate according to the controller 110 or include a processor for a communication control different from a communication control of the controller 110. The communicator 130 may perform a communication processing according to a scheme specified in IEEE 802.11 or IEEE 802.3 for example. However, various modifications can be made to the specific communication system.

Figure 3:
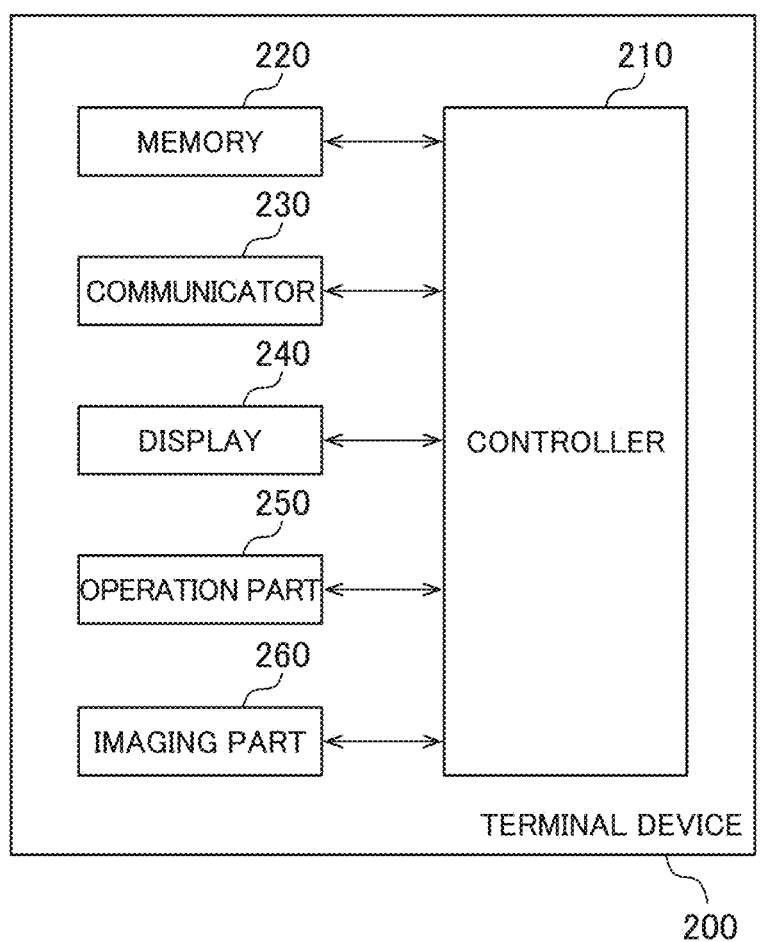
FIG. 3 shows an example of the configuration of a terminal device.

The FIG. 3 is a block diagram showing a detailed configuration example of the terminal device 200. The terminal device 200 includes, for example, a controller 210, a memory 220, a communicator 230, a display 240, an operation part 250, and an imaging part 260. However, the configuration of the terminal device 200 is not limited to the FIG. 3, and some components in the terminal device 200 can be omitted or other components can be added in the configuration of the terminal device 200. For example, the terminal device 200 may have various sensors such as the motion sensors such as accelerometers and gyro sensors, pressure sensors and GPS (Global Positioning System) sensors in addition to an image sensor included in the imaging part 260.

The controller 210 is composed of hardware including at least one of a circuit for processing digital signals and a circuit for processing analog signals. The controller 210 may also be realized by a processor. It is possible to use a variety of processors such as CPU, GPU, and DSP. By the processor reading and performing the instruction stored in the memory of the terminal device 200, the controller 210 performs a predetermined processing corresponding to the read instruction.

The memory 220 is a work area of the controller 210 and is realized by various memories such as SRAM, DRAM, and ROM. The memory 220 stores, for example, a program related to the positioning application AP1 below. We will describe the positioning application AP1 below.

The communicator 230 is an interface for communication through a network and includes, for example, an antenna, an RF circuit, and a baseband circuit. The communicator 230 communicate with the server system 100, for example, via a network. The communicator 230 may perform wireless communication according to a scheme specified in IEEE 802.11 standard with the server system 100.

The display 240 is an interface for displaying various information and may be a liquid crystal display, an organic EL display, or a display of another type. The operation part 250 is an interface that accepts user operations. The operating part 250 may include a button or the like provided in the terminal device 200. Moreover, the display 240 and the operation part 250 may be a touch panel constructed as one unit.

The imaging part 260 includes an image sensor that outputs image information by imaging a predetermined range. The image information here may be a still image or a moving image. The image information may be color or monochrome. The imaging part 260 may include a depth sensor for detecting the distance to the subject, a sensor for detecting the heat of the subject (e.g., an infrared sensor), etc.

In addition, the terminal device may include other components which is not shown in the FIG. 3. For example, the terminal device 200 may includes a light emitting part, a vibration part, a sound input part, a sound output part, etc. The light-emitting part is, for example, an LED (light emitting diode), which emits light. The vibrating part is, for example, a motor, which activates an alarm or a notification by vibration. The sound input part is, for example, a microphone. The sound output unit is a speaker, for example, and provides sound to activate the notification.

The information processing system 10 according to this embodiment includes a first processor operating according to the positioning application AP1 that performs a processing regarding the position of at least one of a person and an object in the assistance. For example, the positioning application AP1 operates in the terminal device 200, and the controller 210 of the terminal device 200 includes the first processor. The positioning application AP1 may be used to adjust the posture of the assisted person in an electric bed 610, for example, as described later with the reference to the FIGS. 5 to 9, or may be used to adjust the posture of the assisted person in a wheelchair 630, for example, as described later with the reference to the FIGS. 10 to 13. The positioning application AP1 may acquire image information representing appropriate posture defined by the skilled caregiver as correct image data (described later using FIG. 4A), perform a transparent processing for the correct image data, and then superimpose the transparent correct image data over current image from the imaging part when the caregiver adjusts a position of the assisted person in the assistance (described later using FIG. 4B).

The position adjustment in the electric bed 610 and the wheelchair 630 can be easily realized by using the positioning application AP1, so that pressure ulcers of the assisted person and falling from the electric bed 610 or the wheelchair 630 can be suppressed, and the burden of the caregiver on the position adjustment can be reduced.

The information processing system 10 also includes a second processor operating according to a meal application AP2 that detects the amount of food eaten by the assisted person in the meal assistance of the assisted person. For example, the meal application AP2 may be operated on a terminal device 462 of the swallowing choke detection device 460 described later with the reference to the FIG. 15. In this case, the processor in the terminal device 462 includes the second processor. However, the meal application AP2 may be installed in the terminal device 200. In this case, the terminal device 200 includes both the first and second processor. The meal application AP2 may perform a processing to detect the type of food eaten by the assisted person. The meal application AP2 may also detect a deficiency in the amount of food eaten by the assisted person by comparing the amount of food actually eaten by the assisted person with the desired intake of food amount. The meal application AP2 may also detect the calories and nutrients which the assisted person had obtained based on the type of food (type of cooking) actually eaten by the assisted person. In addition, the meal application AP2 may detect nutrient deficiencies in the assisted person by comparing the amount of nutrients obtained by the assisted person with the necessary amount of nutrients. The detailed processing will be described later.

Since the meal application AP2 can automate the management of the meal content (type of food, amount of food eaten by the assisted person, and the nutrients obtained by the assisted person) for each assisted person, it is possible to perform appropriate assistance based on the meal content and to reduce the burden on the caregiver in managing the meal.

As described the above, the positioning application AP1 and the meal application AP2 are useful in the assistance respectively, but the information processing system 10 of this embodiment may operate the positioning application AP1 and the meal application AP2 in cooperation with each other. The positioning application AP1 may change the operating mode of the positioning application AP1 from the first mode to the second mode with a relatively high processing load of the positioning application AP1 when the meal application AP2 detects at least one of the deficiency of the amount of food eaten by the assisted person and the nutritional deficiency of the assisted person. The positioning application AP1 may have a plurality of operation modes, or the change from the first mode to the second mode may be the change from an inactive state of the positioning application AP1 to an active state of the positioning application AP1, that is, the change from the first mode to the second mode indicates activating the positioning application AP1. Alternatively, the trigger which activates the positioning application AP1 is the detection of a person in the wheelchair 630, the detection of a person in the electric bed 610, the detection of changing diapers etc. The change from the first mode to the second mode may be an addition of functions for example, in the case that the positioning application AP1 has a first function and a second function, only the first function can be used in the first mode, and both the first and second function can be used by the positioning application AP1 in the second mode when the positioning application AP1 may change the operation mode from the first mode to the second mode.

According to the method of this embodiment, it is possible to appropriately support the assistance of the assisted person by the caregiver by changing a processing of the positioning application AP1 based on a situation change of the assisted person in view of the meal. For example, it is known that the risk of the pressure ulcer in the assisted person will increase if the amount of food is insufficient or the nutrition is insufficient. The detail explanation will be described later using SSKIN and other ideas. In the method of the present embodiment, the positioning application AP1 can be actively used for such the assisted person who has high risk of the pressure ulcer, thereby reducing the pressure ulcer risk. For example, when a target person is a relatively high-risk assisted person, the positioning application AP1 may increase the number of functions which the positioning application AP1 can perform so that the caregiver can provide more assistance than when the target person is a relatively low-risk assisted person. In addition, since the preferred posture of the assisted person may change according to the risk level of the pressure ulcer, the correct image data used for a processing by the positioning application AP1 may be automatically changed when the meal application AP2 detects at least one of the deficiencies of the amount of food eaten by the assisted person and the nutritional deficiency of the assisted person.

The information processing system 10 of this embodiment may further include a third processor operating according to a disquieting application AP3 for determining whether the assisted person have the disquieting behavior. The disquieting behavior refers to excessive and restless behavior. For example, the disquieting behavior includes a variety of symptoms not seen under the normal conditions, such as insomnia, agitation, wandering, hallucinations, anxiety, misidentification, hyperactivity, filthy behavior, verbal abuse, and violence. For example, the disquieting application AP3 operates in the management terminal device 300, and the processor of the management terminal device 300 may include the third processor. However, the disquieting application AP3 may be installed in the terminal device 200. In this case, both the first and third processor are realized by the controller 210 of the terminal device 200. Also, the disquieting application AP 3 may operate on other devices such as the server system 100.

The positioning application AP1 may then perform an information processing to support the arrangement of objects located around the assisted person when the disquieting application AP3 detects the assisted person have the disquieting behavior.

According to the method of this embodiment, it is possible to make the positioning application AP1 and the disquieting application AP3 work together. This makes it possible to support appropriate assistance as circumstances change. As will be described later, an unusual arrangement of objects around the assisted person may be the reasons in the disquieting behavior, but it is possible to suppress the influence of these reasons in the disquieting behavior by presenting an appropriate arrangement of objects using the positioning application AP1. The detail explanation will be described later using the FIG. 23.

In addition, the positioning application AP1 may cooperate not only the meal application AP2 and the disquieting application AP3, but also motion determination devices 410 described later with the reference to the FIG. 14 and the peripheral devices 500 described later with the reference to FIG. 18. That is, the method of this embodiment realizes improvement in the quality of the assistance by cooperating the positioning application AP1 with various applications and devices used for the assistance.

Some or all of the processing performed by the information processing system 10 of this embodiment may be realized by a program. The processing performed by the information processing system 10 may be the processing performed by the controller 210 of the terminal device 200, the processing performed by the controller 110 of the server system 100, or the processing performed by the processor in the management terminal device 300 or the sensing device 400. In addition, the processing performed by the information processing system 10 may be the processing performed by two or more of the following devices: the server system 100, the terminal device 200, and the sensing device 400.

The program according to this embodiment can be stored in, for example, a non-temporary information storage medium (information storage device) that is a computer-readable medium. The information storage medium can be realized by, for example, optical disks, memory cards, HDDs, or semiconductor memories. A semiconductor memory is, for example, ROM. The controller 110 or the like performs various processing of this embodiment based on a program stored in the information storage medium. That is, the information storage medium stores a program for making the computer function as the controller 110, etc. A computer is a device with an input part, a processor, a memory and an output part. Specifically, the program according to the present embodiment is a program for making a computer perform the steps described later with the reference to the FIGS. 24 and 25, etc.

In addition, the method of this embodiment can be applied to an information processing method including the following steps. The information processing method includes a step of performing processing regarding the position of at least one of the person and the object in the assistance according to the positioning application AP1, a step of performing processing to determine the amount of food eaten by the assisted person in the meal assistance of the assisted person in accordance with the meal application AP2, and a step of changing the operation mode of the positioning application AP1 from the first mode to the second mode where the processing load of the positioning application AP1 is higher than that of the first mode when the meal application AP2 determines that at least one of the amount of food eaten by the assisted person and nutrition is insufficient.

2. The Positioning Applications

Next, a detailed example of the positioning application AP1 is described as below. The positioning application AP1 is application software that presents the desired position of a person or an object in the electric bed 610, or in the wheelchair 630 to reduce the risk of the pressure ulcer. The person here is, for example, the assisted person or the caregiver. The objects are cushions, diapers, etc. Also, as described later, the positioning application AP1 may present the desired position of an object in the living room of the assisted person, etc.

For example, the positioning application AP1 may operate in a setting mode for the settings and a usage mode to support the caregiver's assistance according to the settings. The caregivers can understand whether the current positions of the assisted person or the objects are the desired positions in the usage mode, thereby the caregivers can properly adjust the current positions to the desired positions if the current positions of the assisted person or the objects are not the desired positions. In the setting mode, for example, the positioning application AP1 acquires the correct image data that images a person or object at a desired position. Then, in the usage mode, the positioning application AP1 superimposes the transparent correct image data over the current image of the person or object to be adjusted.

Figure 4A:
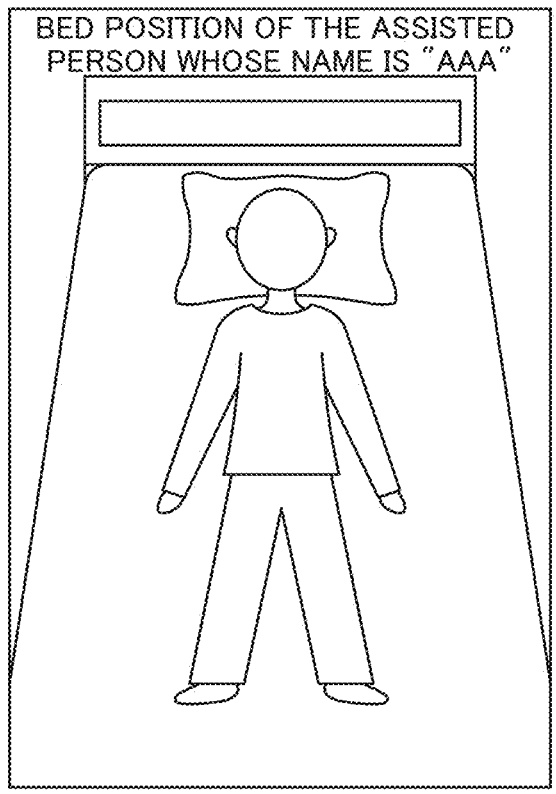
FIG. 4A is an example of correct image data for a positioning application.
Figure 4B:
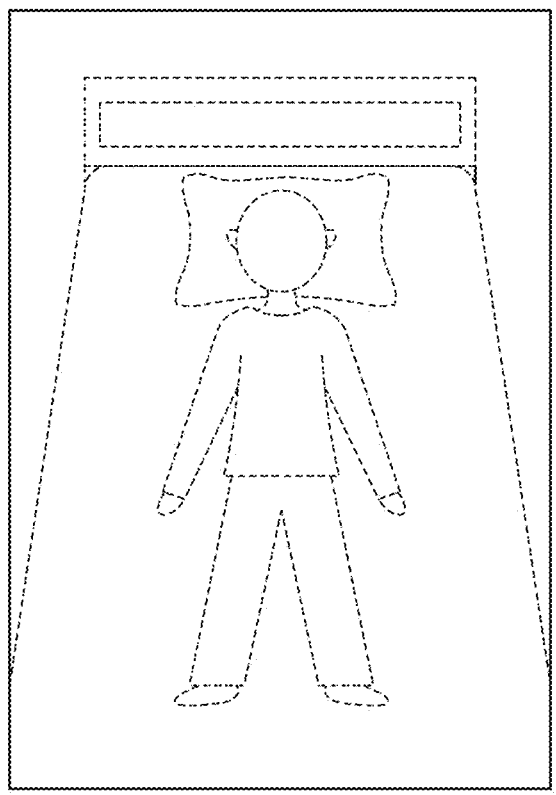
FIG. 4B is an example that an image data acquired from a camera is superimposed over the correct image data in the positioning application

The FIG. 4A shows an example of the correct image data acquired in the setting mode. In the example in the FIG. 4A, the positioning application AP1 acquires the image information representing the desired posture of the assisted person whose name is "AAA" lying on the electric bed 610 as the correct image data. The FIG. 4B shows the correct image data superimposed over the captured current image in the usage mode, the superimposed correct image data is the correct image subjected to a transparent processing. For example, the terminal device 200 superimposes the image of the FIG. 4B over the current image of the assisted person to adjust the position of the assisted person. The caregiver may perform the assistance of the assisted person so that the position of the person on the captured current image approaches the desired position. In this way, it is possible to properly support the position adjustment assistance by the caregivers. Although we had explained an example of superimposing the transparent correct image data over the captured current image, the positioning application AP1 may output the determination result (OK/NG) whether the posture of the assisted person or the object is appropriate for the desired position. More details will follow.

We will describe the detail of the setting mode and the usage mode regarding to the position of the person or the objects in the electric bed 610 (hereinafter referred to as a bed position), and the position of the person or the objects in the wheelchair 630 (Hereafter referred to as a wheelchair position). We will also explain examples applied to the position adjustment of objects which is not limited to the electric bed 610 and the wheelchair 630.

2.1 Bed Position

Figure 5:
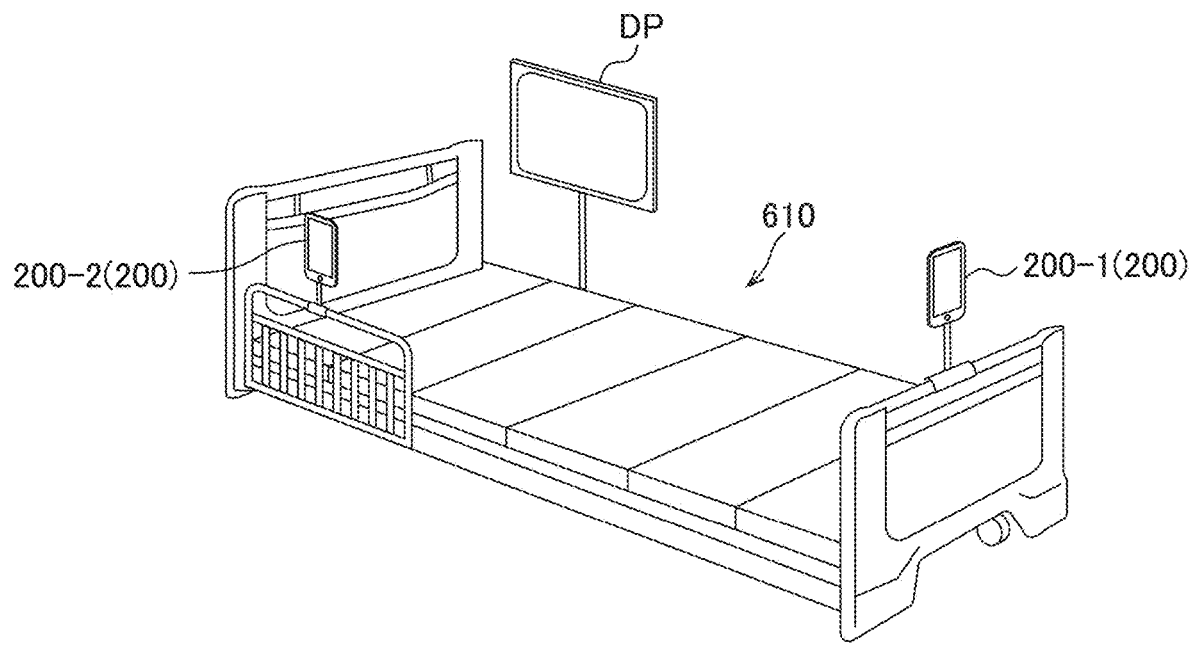
FIG. 5 is a diagram illustrating a device disposed around a bed.

The FIG. 5 shows an example of the arrangement of the devices around the electric bed 610. As shown in the FIG. 5, the terminal device 200 in this embodiment may be a terminal device 200-1 attached to the footboard side of the electric bed 610, a terminal device 200-2 attached to the side rail of the electric bed 610, or both. However, the location where the terminal device 200 is attached is not limited to this, and the terminal device 200 may be attached in another location on the electric bed 610 or attached in another location where the assisted person on the electric bed 610 can be imaged (e.g., a living room wall, a furniture, etc.). Alternatively, the terminal device 200 may be carried by the caregiver and the caregiver may use the terminal device 200 near the footboard or side rail side of the electric bed 610 and may use the positioning application AP1 by the terminal device 200. The following processing is performed by the positioning application AP1.

There is a display DP placed on the opposite side of the terminal device 200-2 for the electric bed 610. The display DP may be attached to the electric bed 610 or may be attached in another position that the caregiver can see easily to perform the assistance to adjust the bed position using the positioning application AP1. For example, the display DP may be attached to a wall surface or may be attached to a stand or the like that stands independently on the floor. Also, the display DP may be omitted in this embodiment.

The terminal device 200 is, for example, a device such as a smartphone having the imaging part 260 (camera), as described above using the FIG. 3. The terminal device 200 transmits the captured image to the server system 100. The display DP receives the captured images transmitted from the server system 100 directly or through other devices such as the terminal device 200 and displays the received images.

The positioning application AP1 may be an application that supports adjustment of the bed position. The adjustment of the bed position may be, for example, a posture control of the assisted person to reduce the risk of the pressure ulcers or an arrangement control of cushions. In addition, the adjustment of the bed position may be the posture control of the assisted person in changing diapers or an arrangement control of the diaper positioning.

<Setting Mode>

The positioning application AP1 first operates in a setting mode to set data used for the assistance of the position adjustment. The data used for the assistance of the position adjustment is the correct image data representing, for example, the desired position of a person or the desired position of an object.

Figure 6:
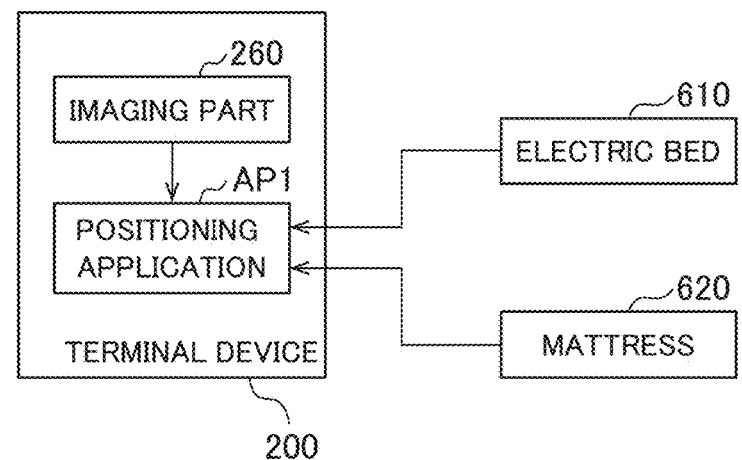
FIG. 6 illustrates the relationship between the positioning application and the devices which adjust a bed position of the assisted person.

The FIG. 6 is a block diagram illustrating the relationship of devices used in the setting mode. For example, the positioning application AP1 may acquire image information, which is the output of the imaging part 260 in the terminal device 200, and information from at least one of the electric bed 610 and the mattress 620. The electric bed 610 and the mattress 620 here are devices that can visualize the pressure distribution in the condition that the assisted person is using. For example, as a method for visualizing the pressure distribution, the well-known method disclosed in Japanese Patent Laid-Open No. 2019-039788 or the like is widely applicable.

Figure 7:
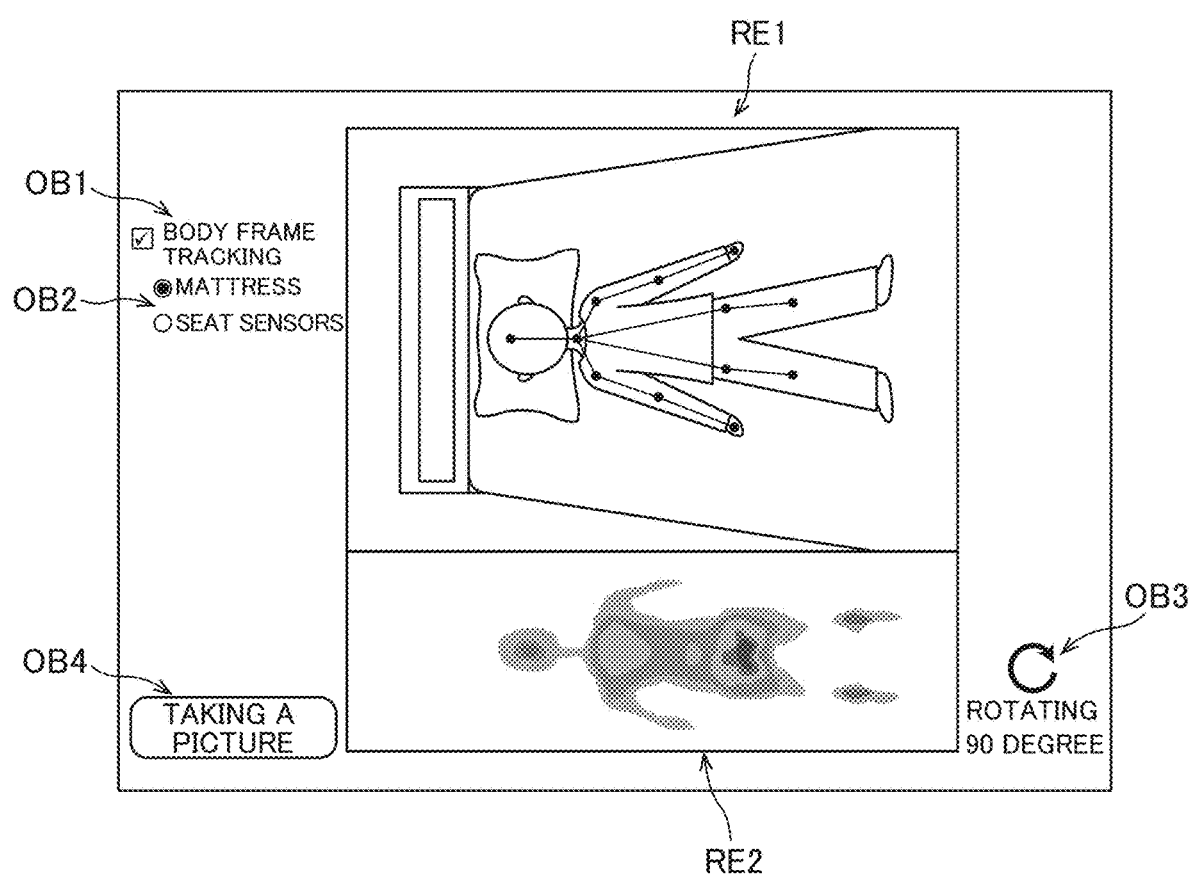
FIG. 7 shows a screen example used to acquire the correct image data in the setting mode.

The FIG. 7 shows a screen example displayed on the terminal device 200 in the setting mode. The screen shown in the FIG. 7 may be displayed on the display 240 of the terminal device 2 or on the display DP. The screen shown in the FIG. 7 may also be displayed on the display of other devices connected via the network.

The screen shown in the FIG. 7 includes the area RE1 for displaying the image acquired from the imaging part 260 in the terminal device 200, and the area RE2 for displaying the pressure distribution. In the example in FIG. 7, the area RE1 display the image of the assisted person lying on the electric bed 610 taken from the footboard side of the electric bed 610. The image may be, for example, acquired by the terminal device 200-1 using an imaging part 260. For example, in the setting mode, a moving image (a movie) acquired by the imaging part 260 of the terminal device 200-1 is displayed in the area RE1 in real time.

The pressure distribution is the information output by the electric bed 610 or the mattress 620 described above, and for example, the pressure value at each position of the surface of the electric bed 610 or the mattress 620 is expressed by using shades of color, etc. For example, in the setting mode, the pressure distribution acquired in time series may be displayed in real time.

Also, the screen shown in the FIG. 7 includes an object OB1 indicating a checkbox to switch whether a body frame tracking function is activated or not, an object OB2 indicating a radio button for selecting either the electric bed 610 or the wheelchair 630, an object OB3 indicating a rotation button to rotate the image acquired from the imaging part 260 in the terminal device 200, and an object OB4 to take an image.

The positioning application AP1 may switch whether or not the body frame tracking function is activated for the assisted person on accordance with a user operation for the object OB1. When the object OB1 had checked, that is, the positioning application AP1 activates the body frame tracking function, the positioning application AP1 performs a body frame tracking processing based on the acquired image. When the object OB1 had not checked, the positioning application AP1 does not perform a body frame tracking processing. There are various methods of skeletal tracking (body frame tracking) based on the image, such as "realtime multi-person 2d pose estimation using part affinity fields" (https://arxiv.org/pdf/1611.08050.pdf), openpose disclosed by zhe cao et al., and they can be widely applied in this embodiment.

The object OB2 indicates whether the caregiver adjusts the bed position or the wheelchair position. The caregiver usually uses the electric bed 610 or the mattress 620 when the caregiver performs the assistance to adjust the posture of the assisted person lying on the electric bed 610, and use the wheelchair 630 when the caregiver performs the assistance to adjust the posture of the assisted person lying on the wheelchair 630. The object OB2 indicates what kinds of devices the caregiver wants to cooperate with the positioning application AP1. In the example of the FIG. 7, the text "mattress" is displayed to adjust the bed position. The text "seat sensor" is also displayed to adjust the wheelchair position. A "seat sensor" is a sensor that detects pressure on the seat surface of the wheelchair 630, such as the seat sensor 440 in the FIG. 13.

For example, the user may determine and instruct which the bed position or wheelchair position is used to the positioning application AP1 on accordance with the operation input of the object OB2. Then the positioning application AP1 may perform an information processing to connect with the target devices based on the instruction.

For example, when the user selects a bed position using the object OB2 as shown in the FIG. 7, the communicator 230 of the terminal device 200 is connected to the electric bed 610 and the mattress 620. Alternatively, the user manually connects the positioning application AP1 with the electric bed 610, the mattress 620, or other devices used to adjust the position of the assisted person, and the positioning application AP1 may determine which the bed position or the wheelchair position is activated based on the connection result. In this case, the positioning application AP1 automatically changes the display of the object OB2 based on the result of the determination.

The object OB3 is an operation interface for rotating at least one of the image displayed in the area RE1 and the pressure distribution displayed in the area RE2. In the example of the FIG. 7, since the left side of the screen is the head side of the assisted person in both the image displayed in the area RE1 and the pressure distribution displayed in the area RE2, the user can easily understand the association between the image displayed in the area RE1 with the pressure distribution if the user see the screen of the FIG. 7. However, In the case that the user uses the positioning application AP1, the direction in which the terminal device 200 takes the image of the assisted person is not necessarily fixed. Therefore, the direction the assisted person is lying may differ between the image displayed in the area RE1 and the pressure distribution displayed in the area RE2. In that regard, when the positioning application AP1 receives an operation input to rotate the area RE1 or the area RE2 by the rotation button, it is possible to align the direction the assisted person is lying by performing a processing to rotate the image displayed in the area RE1 or the pressure distribution displayed in the area RE2.

However, the direction of the image and the pressure distribution are not limited to those manually changed by the user in the above explanation, and may be adjusted automatically by the positioning application AP1. For example, a marker such as a two-dimensional bar code (For example, QR code, QR code is a registered trademark) may be attached in advance to a predetermined position in the range to be imaged by the imaging part 260. For example, a sticker printed with a marker may be attached at a head-side of the electric bed. The positioning application AP1 performs an information processing to detect the position and direction of a marker from an image acquired from the imaging part 260 of the terminal device 200. In this way, since the direction of the assisted person is lying in the image acquired from the imaging part 260 can be appropriately detected, the direction of the image and the direction of the pressure distribution can be automatically and easily adjusted.

The object OB3 corresponding to the rotation button may also be used for processing to rotate both the image displayed in the area RE1 and the pressure distribution displayed in the area RE2 by the same angle. For example, although the area RE1 and the area RE2 are arranged side by side (one of the area is arranged at a top in the screen and another area is arranged at a bottom in the screen), the image displayed in the area RE1 and pressure distribution displayed in the area RE2 may be rotated 90 degrees clockwise or counterclockwise to shift to a state where regions RE1 and RE2 may be arranged side by side (one of the area is arranged at a left-side in the screen and another area is arranged at a right-side in the screen). In this way, various kinds of information can be arranged in the desired positional relation of the user.

As described above, by using the screen shown in the FIG. 7, the user can refer to the image of the assisted person and the pressure distribution, and can also refer to the results of the body frame tracking processing if necessary. The result of the body frame tracking processing may be displayed and superimposed on the image displayed in the area RE1, for example, as shown in the FIG. 7.

For example, the user here may be a skilled caregiver, and the user may determine whether or not the assisted person has taken an appropriate posture by referring to various information displayed on the screen in the FIG. 7. The appropriate posture here may be one suitable for controlling or reducing the pressure ulcers, one suitable for changing diapers of the assisted person, or another one. For example, the skilled caregiver can determine whether the posture of the assisted person is appropriate posture for the assisted person according to his or her tacit knowledge after considering various information such as the assisted person's attributes, a medical history and a medication history.

For example, the user pushes the button shown on the object OB4 when the user determines that the assisted person has taken an appropriate posture. The terminal device 200 stores the image displayed when the user pushes the button in the memory 220 as the correct image data.

The correct image data may also be transmitted to the server system 100. In this way, it is possible to register the positions that the skilled caregiver considers favorable as the correct image data. The correct image data is not limited to image and may include pressure distributions or results of body frame tracking. Although the above example has been described using the terminal device 200-1, this embodiment is not limited to this above example, and the terminal device 200-2 may be used to acquire image. That is, the image may be an image of the assisted person taken from the side.

Figure 8:
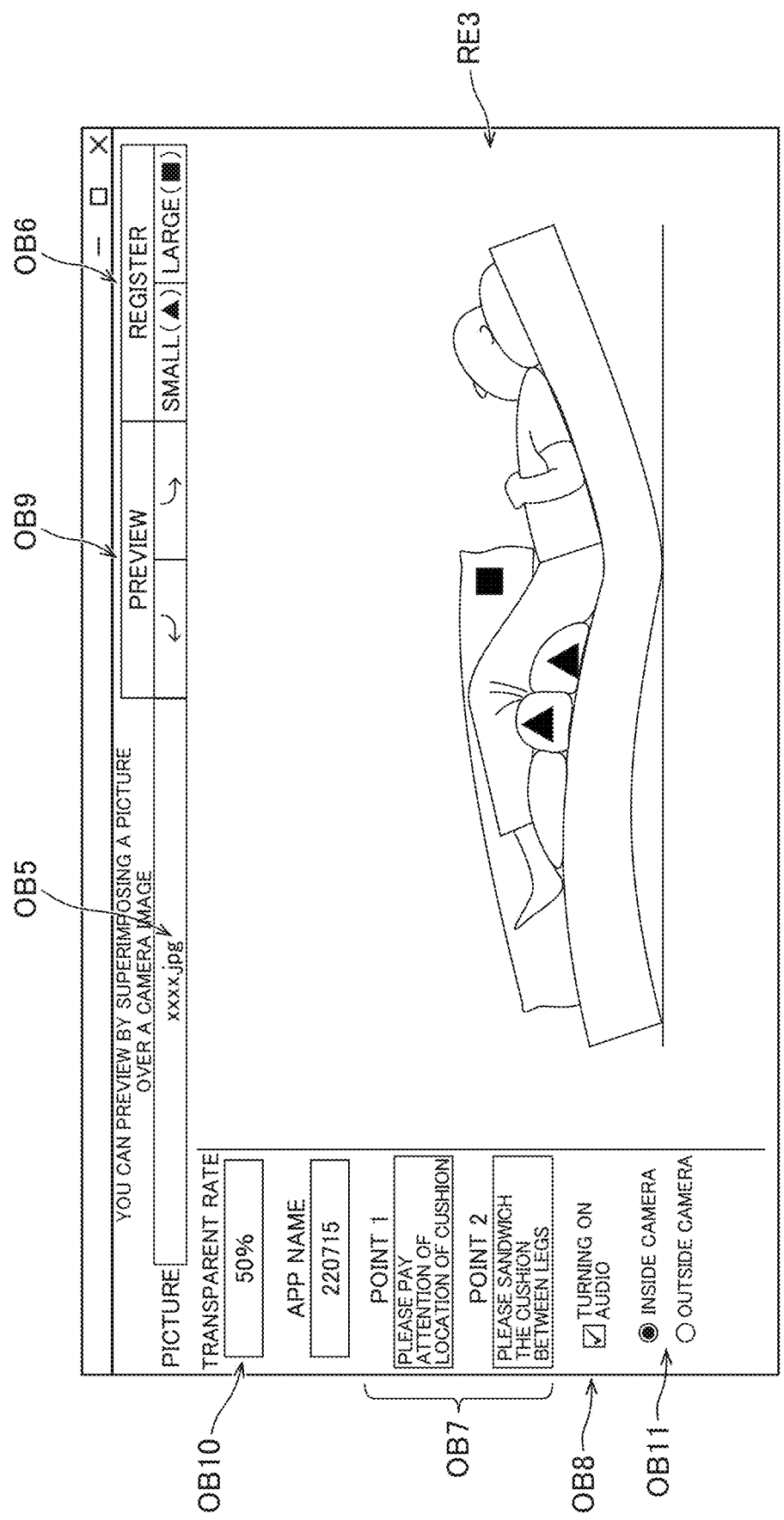
FIG. 8 shows a screen example used to acquire additional information in the setting mode.

Some additional information may be added to the correct image data. The FIG. 8 shows a screen example used for adding additional information to image. For example, when the user selects a image acquired from the terminal device 200, the positioning application AP1 display the image along with the file name on the screen of the FIG. 8. For example, as described above, the image selected by the button OB4 may be stored in the memory 220 of the terminal device 200 or the memory 120 of the server system 100, and the positioning application AP1 may receive the operation input from the user to select any of the image. In the example of the FIG. 8, the selected image is displayed in the area RE3, and an object OB5 representing the file name of the image is also displayed in the screen.

As shown in the FIG. 8, an object OB6, which is a button for adding a specific mark in the image, may be displayed in the screen to input the additional information. For example, the specific mark may be a mark attached to a cushion that is used to induce proper posture of the assisted person. Here, a triangle mark corresponds to cushions smaller than a prescribed size, and a square mark corresponds to cushions larger than the prescribed size. For example, if the above correspondence relationship is presented to the user in advance using a manual book of the positioning application AP1 or the like, and the user may add the specific marks (the triangle mark or the square mark) for the cushions in the image using the object OB6 when there is some cushions for the assisted person to take the appropriate posture. Thereby the correct image data could include information identifying the location and size of cushions.

The additional information may also be comments added by the skilled caregivers. For example, the object OB7, which is a text box to add the comments, may be displayed on a screen to input the additional information. The comments that are in an object OB7 may be text information using the object OB7. For example, the skilled caregiver would input the text information related to essential points to take the appropriate posture for the assisted person, such as the angle between a particular area and another area, the position of the pillow or the cushion, and the relationship between the location of the pillow and the location of the cushion, and the details of the cushion used for the assisted person (size, shape, manufacturer, part number, etc.).

In addition, the skilled caregiver can input the essential points to designate the part of the assisted person in the screen shown in FIG. 8 using the positioning application AP1. For example, if the skilled caregiver thinks that the position of the shoulder of the assisted person is important to take the proper posture, the skilled caregiver may input the points to specify the shoulder of the assisted person. For example, the positioning application AP1 may receive an input that arranges the specific mark shown in the FIG. 8 at a specific location. The skilled caregiver may also consider two or more essential points. In this case, the positioning application AP1 may receive the inputs of the essential points and the priority of each essential point. The additional information may be voice information. For example, there may be the object OB8, which is a check box for setting whether the positioning application AP1 accept to input the voice information in the screen to input the additional information. For example, if the check box is checked, that is "the positioning application AP1 accept to input the voice information", the positioning application AP1 may perform a information processing to record the user's voice.

In addition, the screen shown in the FIG. 8 may allow a review to confirm the settings. For example, there is the object OB9, which is a button for previewing, in the screen to input the additional information. Here, the previewing means to display the screen corresponding to the screen in usage mode. The positioning application AP1 may perform the previewing processing on the screen for additional information which is shown in the FIG. 8. Alternatively, based on the selection operation of the object OB9, the screen of previewing processing may be displayed in a pop-up screen different from the screen shown in the FIG. 8, and the previewing may be performed in the pop-up screen.

For example, as described above with the reference to the FIGS. 4A and 4B, the positioning application AP1 may superimpose and display the transparent correct image data over the captured current image of the assisted person in the usage mode. Therefore, when the user selects and pushes the object OB9 in the FIG. 8, the positioning application AP1 acquires the captured current image using the imaging part 260 and superimposes the captured current image over the correct image data being set with the transparent processing. In this way, it is possible to check the display screen in advance when the correct image data being set is actually used in the usage mode. In this case, the user may be able to set the transparent rate of the correct image data using the screen of the FIG. 8, or if the imaging part 260 includes an internal camera and an external camera, the user may be able to select which camera to use in the usage mode. For example, in order to input the additional information, as shown in the FIG. 8, there are a plurality of text boxes, and one of the text box is used for inputting the transparent rate, which is called the object OB10. There is a radio button for selecting the internal camera or the external camera as the object OB11.

Also, the correct image data used in the positioning application AP1 is not limited to the above examples. For example, a moving image of the motion of a skilled caregiver to take the assisted person into an appropriate position may be used as the correct image data. The correct image data may also include the caregiver's body frame tracking results detected based on the moving image.

<Usage Mode>

In the usage mode in which the caregiver adjusts the bed position of the assisted person, the positioning application AP1 may start acquiring the captured current image using the imaging part 260 of the terminal device 200. The positioning application AP1 also selects and displays the correct image data used to adjust the bed position. For example, in the usage mode, the positioning application AP1 may display multiple tabs on a screen which superimpose and display the transparent correct image data shown in the FIG. 4B over the captured current image, and perform a processing to switch the correct image data based on the selection operation of the tab. For example, the positioning application has a plurality of the correct image data, a first tab on the screen may correspond to a first set of the correct image data, and a second tab on the screen correspond to a second set of the correct image which is different from the first set of the correct image. The set of the correct image data may be selected based on the selection operation of the tab by the caregiver.

It should be noted that the adjustment of the bed position may be performed by the caregiver, or may be performed by the assisted person by himself or herself by changing his or her own posture while viewing the screen displayed by the positioning application AP1.

The positioning application AP1 may select the correct image data based on selection operation by the caregiver. Alternatively, the positioning application AP1 may perform a processing to automatically select the correct image data based on similarity determination between the attributes of the assisted person and the attributes of the assisted person imaged in the correct image data. The attributes here include information such as age, sex, height, weight, medical history and medication history of the assisted person.

Alternatively, the positioning application AP1 may perform an information processing to automatically select the correct image data by comparing the attributes of the assisted person to be adjusted for the bed position with the additional information included in the correct image data. For example, the additional information in the correct image data may include a text such as "the assisted person with XX tendency should adjust his or her left shoulder to YY." In this case, if the assisted person to be adjusted the bed position is satisfied with the requirement of "the assisted person with XX tendency", the correct image data can be easily selected based on the requirement. For example, the caregiver inputs the information identifying the assisted person to be adjusted the bed position, and the terminal device 200 may identify the attributes of the assisted person based on the information input by the caregiver.

The positioning application AP1 may output an image in which the transparent correct image data is superimposed on the real-time captured image captured by, for example, the terminal device 200. In this case, the additional information of the correct image data may be presented in the screen. For example, the text data may be superimposed and displayed in the screen, or voice data may be output from a speaker such as the terminal device 200.

In addition, the positioning application AP1 may determine whether the posture of the assisted person is appropriate posture, as either OK or NG based on the degree of similarity between, for example, the captured current image during adjusting the bed position of the assisted person and the correct image data, and output the result of the determination processing. For example, the positioning application AP1 outputs OK indicating that the posture is appropriate when the degree of similarity is equal to or greater than the predetermined threshold, and NG indicating that the posture is inappropriate when the degree of similarity is less than the predetermined threshold.

The result of the determination processing may be displayed on the display 240 of the terminal device 200 or directly or via the server system 100 on the display DP. The positioning application AP1 may also display a specific point and reasons determined as NG. For example, the positioning application AP1 compares the captured current image with the correct image data and displays an highlight of the area which the positioning application AP1 determines the difference between the captured current image with the correct image data is larger than a threshold.

The positioning application AP1 may also obtain the pressure distribution and the body frame tracking results of the assisted person in the usage mode. In this case, the positioning application AP1 determines whether the posture of the assisted person is appropriate posture, as either OK or NG based on the comparison of the pressure distribution acquired in the usage mode with the pressure distribution included in the correct image data, or the comparison of the body frame tracking results of the assisted person acquired in the usage mode with the body frame tracking results included in the correct image data.

In this way, it is possible to easily compare the current posture of the assisted person with the ideal posture of the bed position, and to present information to achieve the ideal posture of the bed position.

Also, as the mentioned above, The correct image data used in the positioning application AP1 may include a moving image of a skilled caregiver's movements to adjust the posture of the assisted person to an appropriate posture and the caregiver's body frame tracking results detected based on the moving image. In this case, the positioning application AP1 may whether the movement of the caregiver is appropriate, as either OK or NG by imaging the caregiver in the usage mode, performing the body frame tracking on the caregiver, and comparing the current results of the body frame tracking with the results of the body frame tracking, which are in correct image data, in the usage mode. In this way, it is possible to make the caregiver perform the same movements as a highly skilled caregiver, regardless of the caregiver's skill level.

The positioning application AP1 again may be used to assist the excretion assistance to change the diaper of the assisted person, e.g., the positioning application AP1 may determine whether the assisted person is in a lateral position, whether the diaper is properly positioned, whether the pad is not out of the diaper, or whether the diaper is properly fitted to the assisted person. These may be realized by superimposing the current image over the correct image data indicating an appropriate state or may be realized by the body frame tracking, object detection processing, etc.

In this way, it becomes possible not only to make the caregiver adjust his/her posture (sleeping posture) appropriately when the assisted person is continuously lying on the electric bed 610, but also to make the caregiver perform the change the diapers of the assisted person appropriately by making appropriate use of tacit knowledge. The caregiver need to move the body of the assisted person to change the diaper. For example, the caregiver makes the posture of the assisted person the lateral position once to place the diaper easier and raises the legs of the assisted person to wear the diaper therefore when the excretion assistance is complete, the posture of the assisted person may not be the appropriate posture or the appropriate position in the electic bed. Therefore, the positioning-application AP1 may perform an information processing to automatically adjust the bed posture or the position of the assisted person when the positioning-application AP1 detects that the excretion assistance has been completed.

As the mentioned above, the positioning application AP1 has multiple functions such as a display function for superimposing the current image over the correct image data, and a determination function for determining whether the posture of the assisted person or the movement of the caregiver is appropriate as OK or NG. Each function may be activated and inactivated. For example, the positioning application AP1 may activate only the display function in the usage mode, or may activate both the display function and the determination function in the usage mode. The state of each function, that is an active state or an inactive state may be set by a user such as a caregiver, but is not limited to this, and the positioning application AP1 may automatically activate each function based on the attribute of the assisted person.

In addition, the positioning application AP1's function is not limited to the above functions, and the positioning application AP1 may have a function to control the electric bed 610 used by the assisted person. For example, the memory 220 of the terminal device 200 is the electric bed 610 remembers a setting information about the electric bed 610 the assisted person uses. The setting information here may be information in which setting values are associated with each of the multiple setting items. Multiple settings include a setting of a height of the electric bed 610, and a setting of an angle of the bottom against the floor. The bottom of the electric bed 610 represents the surface on which the mattress 620 is placed. The electric bed 610 may include more than one bottom, and the setting items may include the angle of each bottom against the floor or angle between two of the bottoms. Then, when the positioning application AP1 determined that the difference between the height or the angle of the bottom in the electric bed 610 in the correct image data and the current height or the current angle of the bottom in the electric bed 610 in the usage mode is more than a predetermined threshold, the positioning application AP1 outputs instructions to control the electric bed 610 so that the current height or the current angle of the bottom approaches the height or the angle in the correct image data.

For example, the positioning application AP1 may acquire the setting information of the electric bed 610 by communicating with the electric bed 610. For example, in the setting mode, the positioning application AP1 may acquire the setting information from the electric bed 610 when the user had selected and pushed the button to take the images to use the correct image data, and may add the setting information into the correct image data. In the usage mode, the positioning application AP1 may control the electric bed 610 by acquiring the current setting information from the electric bed 610 and comparing the current setting information with the setting information of the correct image data. Alternatively, the positioning application AP1 may determine the difference between the current height or the current angle of the bottom in the electric bed 610 and the correct height or the correct angle by comparing the correct image data, which is image information, with the captured current image. The positioning application AP1 controls the electric bed 610 to reduce the difference. For example, the positioning application AP1 may use voice or text to ask questions such as "May I control the electric bed 610 using the setting information?" in addition to the information processing to superimpose and display the transparent correct image data shown in the FIG. 4B. The positioning application AP1 starts controlling the electric bed 610 when the user's permission is obtained by voice or input of buttons in response to the questions.

While we have explained the above example of controlling the bed 610 during adjusting the posture of the assisted person in the position adjustment assistance, the device to be controlled is not limited to the electric bed 610. For example, if a mattress 620 is used to urge the assisted person to change the posture by adjusting the amount of air in the mattress 620, the positioning application AP1 may control the mattress 620 when adjusting the posture of the assisted person in the position adjustment. For example, in the case of using a mattress 620 including multiple air cells and with adjustable air pressure (hardness) for each air cell, the positioning application AP1 may instruct to adjust the hardness of each air cell to the mattress 620. In addition, when the assisted person uses the wheelchair and caregiver adjusts the posture of the assisted person as described later, the positioning application AP1 may control the height of the seat surface or the angle of the backrest of the wheelchair 630 during adjusting the posture of the assisted person in the position adjustment.

Also, the function for controlling the electric bed 610 or the like during adjusting the posture of the assisted person may be activated or inactivated based on user settings or automatic determination.

<Device Examples Used in a Positioning Application>

In addition, the above examples of devices used for setting up and using the positioning application AP1 include, but are not limited to, the electric bed 610 and the mattress 620 capable of pressure detection.

Figure 9:
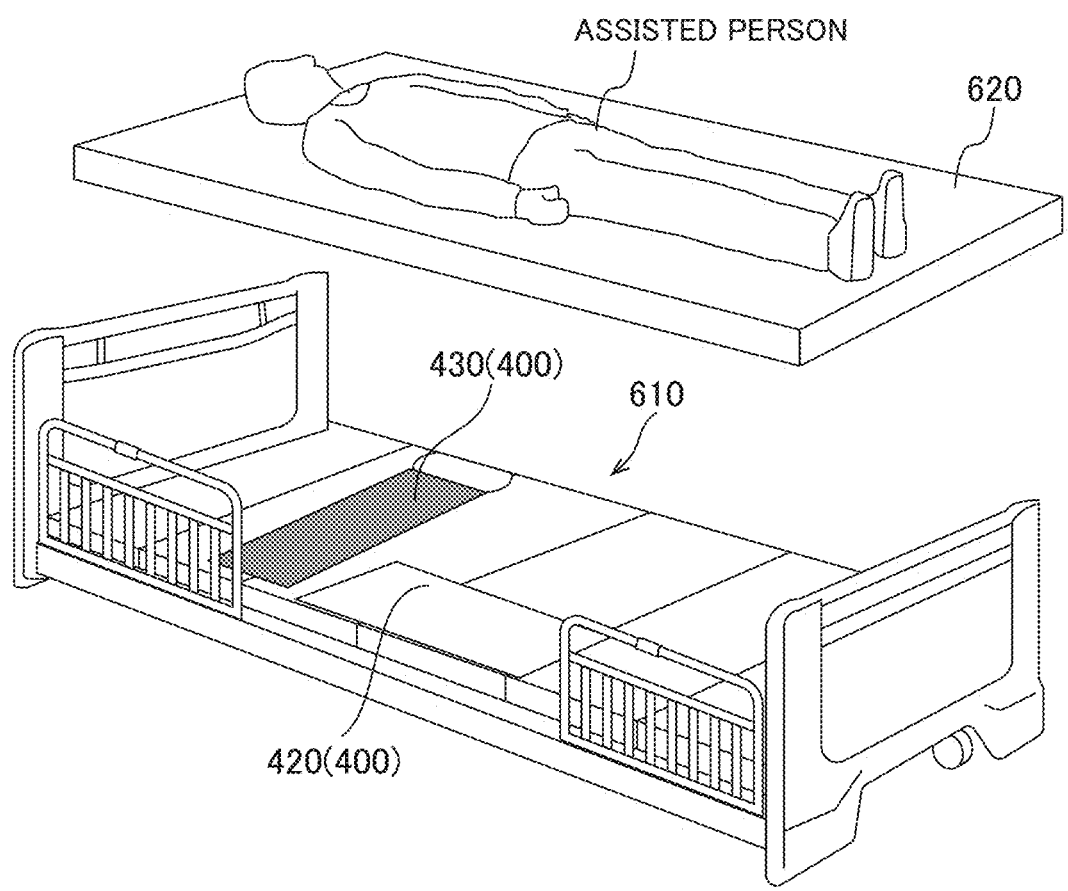
FIG. 9 is a diagram illustrating a device placed in a bed.

The FIG. 9 is a diagram illustrating an example of the bedside sensor 420 and the detection device 430, which are examples of other devices available for the positioning application AP1 and are located between the electric bed 610 and mattress 620. The bedside sensor 420 and the detection device 430 are sheet-like or plate-like devices provided between the electric bed 610 and the mattress 620, for example, as shown in the FIG. 9.

The bedside sensor 420 and the detection device 430 may be devices used for setting and using the positioning application AP1, or as described later, the motion determination device 410 whose changes an information processing based on the determination result of the positioning application AP1. The bedside sensors 420 include a pressure sensor that outputs a pressure value as sensing data, and are placed on the side of the electric bed 610 which the assisted person gets in or gets out from the electric bed 610. In the example of the FIG. 9, the assisted person gets in or gets out from the electric bed 610 on the front side of the electric bed 610. In this case, as shown in the FIG. 9, a siderail to prevent falling is placed on the front side of the electric bed 610, and the bedside sensor 420 may be placed in a position where the side rail is not placed. In this way, the assisted person who gets in or gets out of the electric bed 610 may perform the sitting action on the bedside sensor 420. The bedside sensors 420 may output time-series pressure data to the server system 100 as sensing data. Alternatively, the bedside sensor 420 may determine the presence or absence of movement by performing the processing described below and output the determination result as sensing data to the server system 100.

The bedside sensor 420 acquires a pressure value as an input data, for example, according to an application software installed in the bedside sensor 420, and performs the information processing to determine the movement of the assisted person on the electric bed 610 from the pressure value.

For example, when the assisted person gets out from the electric bed 610 and stand up nearby the electric bed 610, we assumed that the assisted person moves from a supine position on the electric bed to a sitting position on the bedside, and then stands up by applying force with his or her hands on his or her knees and the bottom of the electric bed 610. The pressure value detected by the bedside sensor 420 may increase in the order of lying down, sitting down, and standing up. For example, the bedside sensor 420 may determine that the assisted person starts standing up from the sitting position based on comparing the pressure value with a predetermined threshold. Alternatively, from the perspective of detecting standing up or getting out from the electric bed at a faster stage, the bedside sensor 420 may determine that the assisted person starts sitting down the edge of the electric bed from the supine position based on comparing the pressure value with a predetermined threshold.

Alternatively, when the assisted person continues a motion of standing up, the buttocks of the assisted person will rise from the bottom of the electric bed, which greatly reduces the pressure value output from the pressure sensor. Therefore, the bedside sensor 420 may determine, based on the time series data of the pressure value, that the standing up motion of the assisted person is completed if the pressure value increases above the first threshold and then decreases below the second threshold which is smaller than the first threshold. In addition, various modifications can be made to the specific processing content to determine whether the motion starts.

In addition, the detection device 430 shown in the FIG. 9 is a device for sensing information about a sleeping state of the assisted person. The detection device 430 includes a pressure sensor that outputs a pressure value.

The detection device 430 detects a body vibration (body movement and vibration) of the user of the electric bed 610 (mainly assisted person) via the mattress 620 when the user is lying in the electric bed. Based on the body vibrations detected by the detection device 430, the detection device may calculate a respiration rate, a heart rate, the amount of activity, a posture of the user, whether the user is awake or falling asleep, and whether the user gets out of or is in electric bed. The detection device 430 may also determine whether the sleeping state of the assisted person is a non-REM sleep or a REM sleep, or determine the depth of sleeping state of the assisted person. For example, the periodicity of body movement may be analyzed, and the respiratory rate and the heart rate may be calculated from the peak frequency. The analysis of periodicity is, for example, Fourier transform etc. The respiration rate is the number of breaths during a certain period. The heart rate is the number of beats during the certain period. The certain period is, for example, one minute period. The body vibration may also be detected per sampling unit period, and the number of detected body vibrations may be calculated as the amount of activity. In addition, since the detected pressure value may decrease when the user gets out of the electric bed compared to when the user is staying in the electric bed, it is possible to determine whether the user gets out of the electric bed or in the electric bed based on the pressure value and its time series change.

For example, the detection device 430 may output the output of the pressure sensor to the server system 100 as the sensing data. Alternatively, the detection device 430 may output the aforementioned information about the respiration rate, the heart rate, the amount of activity, a posture of the user, whether the user is awake or falling asleep, and whether the user gets out of or is in electric bed to the server system 100 as the sensing data.

The detection device 430 may also determine whether the assisted person starts moving. The detection device 430 determines that the assisted person starts moving if a state of the assisted person has transferred from a state the assisted person is in the electric bed to a state assisted person starts getting out of the electric bed. In addition, from the perspective of detecting signs of starting moving at an earlier stage, the detection device 430 may determine that the assisted person starts moving if the state of the assisted person has transferred from a sleeping state to an awake state. The detection device 430 may output the determination result of starting moving to the server system 100 as the sensing data.

2.2 Wheelchair Position

Figure 10:
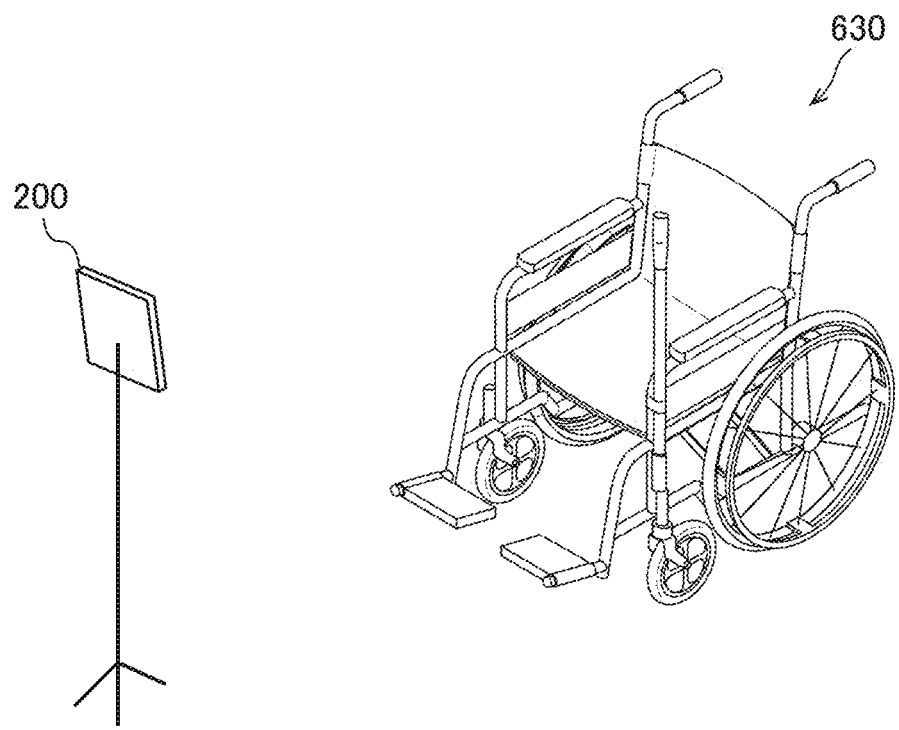
FIG. 10 illustrates a device disposed around a wheelchair.

The FIG. 10 is a diagram illustrating the system configuration when the caregiver or the assisted person adjusts the wheelchair position. As shown in the FIG. 10, when the caregiver or the assisted person by himself or herself adjusts the wheelchair position, the terminal device 200 is attached at a height at which the terminal device 200 can take an image including at least the upper body of the assisted person seated in the wheelchair 630. The terminal device 200 is placed in a predetermined position in a nursing facility, for example, and the caregiver transfers the assisted person to the wheelchair 630, moves the assisted person to the front of the terminal device 200, and then adjusts the wheelchair position (posture) of the assisted person. However, the caregivers is in front of the wheelchair 630 with holding the terminal device 200 and the processing described below may be performed in that situation.

The terminal device 200 is, for example, a device such as a smartphone including an imaging part 260 that is, the camera, as described above using the FIG. 3. The positioning application AP1 may be an application software that supports wheelchair position adjustment. The wheelchair position adjustment may include a controlling the wheelchair to adjust the posture of the assisted person to reduce pressure ulcers and a controlling to instruct the placement of the cushions on the screen of the terminal device 200 or a controlling of placement of the cushions to automatically adjust the placement. In addition, the wheelchair position adjustment may be a controlling the posture of the assisted person when the assisted person is eating the meal in a wheelchair.

<Setting Mode>

The positioning application AP1 set the data used for the wheelchair position adjustment in the setting mode as in the case of a bed position adjustment.

Figure 11:
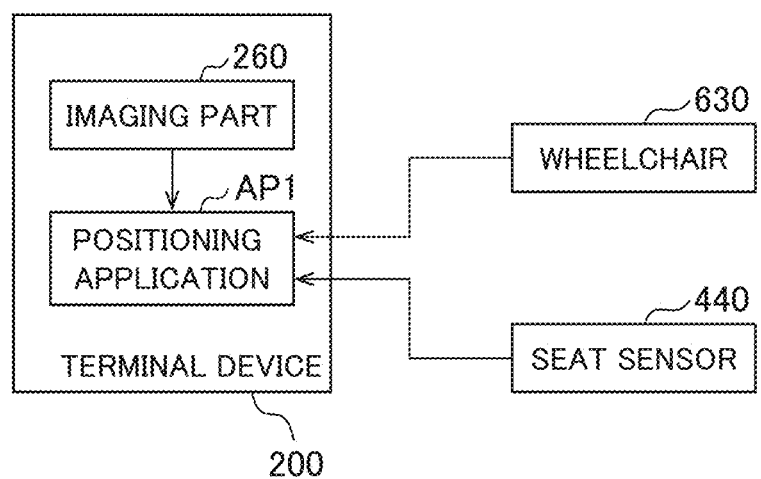
FIG. 11 illustrates the relationship between the positioning application and devices which adjust a wheelchair position of the assisted person.

The FIG. 11 is a diagram illustrating the relationship between the positioning application and the devices which adjust a wheelchair position of the assisted person in the setting mode. For example, the positioning application AP1 may acquire image data, which is the output of the imaging part 260 in the terminal device 200, and data acquired from at least one of sensors in the wheelchair 630 and the seat sensor 440. Here, the wheelchair 630 is a device that can visualize the pressure distribution in the condition used by the assisted person. The seat sensor 440 are described later using the FIG. 13.

Figure 12:
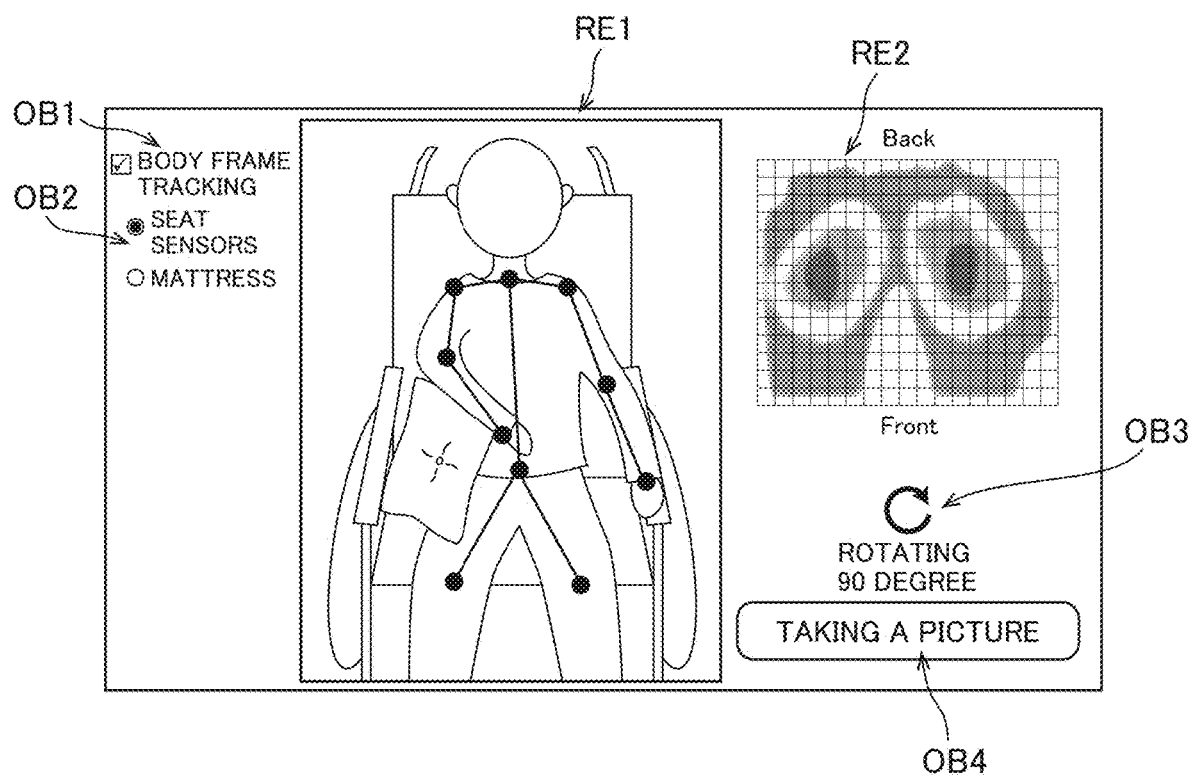
FIG. 12 is a screen example used to acquire the correct data in the setting mode.

The FIG. 12 shows the screen example used to acquire the correct data in the setting mode. The screen shown in the FIG. 12 may be displayed on the display 240 of the terminal device 200 or on the display of other devices connected via a network.

The configuration of the screen shown in the FIG. 12 is similar to that in the FIG. 7 except that the image information displayed in the area RE1 becomes an image of the assisted person seated in the wheelchair 630 and the pressure distribution displayed in the area RE2 becomes information representing the pressure on the seat surface of the wheelchair 630. Therefore, the details of the information displayed on the screen in the FIG. 12 will not be explained further.

By using the screen shown in the FIG. 12, the user can refer to the image taken of the assisted person and the pressure distribution, and also refer to the results of the body frame tracking processing if necessary. Therefore, for example, the skilled caregiver can determine whether or not the assisted person has an appropriate posture by referring to various information displayed on the screen in the FIG. 12, that is, using not only the image itself but also the pressure distribution, results of the body frame tracking. The appropriate posture here can be one that is suitable for controlling pressure ulcers, one that is suitable for eating the meal, or another.

The skilled caregiver can register an appropriate posture of the assisted person as the correct image data based on the selection operation of a button shown in the object OB4. The correct image data is not limited to image information and may include the pressure distribution or the results of body frame tracking.

Furthermore, some additional information may be added to the correct image data including image information as in the case of the bed position. For example, the screen described above using the FIG. 8 may be used to add some additional information.

<Usage Mode>

In the usage mode where the caregiver actually assists the wheelchair position adjustment of the assisted person, the positioning application AP1 starts acquiring the captured current image using the imaging part 260 of the terminal device 200. The positioning application AP1 also selects the correct image data used to adjust the wheelchair position.

The selection processing of the correct image data by the positioning application AP1 is similar to that of the bed position adjustment, and the correct image data may be selected based on user input or may be selected automatically based on the attributes of the assisted person, etc.

The positioning application AP1 superimposes and displays the transparent correct image data over the captured current image as described above using, for example, the FIG. 4B. In addition, the positioning application AP1 may determine whether the posture of the assisted person or the movement of the caregiver is appropriate as either OK or NG based on the degree of similarity between, for example, the current image captured during the wheelchair position adjustment and the correct image data, and output the determination result. Also, in the situation where the caregiver uses the positioning application AP1, the results of the pressure distribution and body frame tracking may be acquired in the usage mode as in the setting mode.

In this way, it is possible to compare and present the wheelchair position or the wheelchair posture of the assisted person with the ideal wheelchair position or the ideal wheelchair posture, and to present information to achieve the ideal wheelchair position or the ideal wheelchair posture.

When the terminal device 200 is arranged as shown in the FIG. 10 in the usage mode, since the imaging part 260 of the terminal device 200 can take an image of the assisted person from the front, the face of the assisted person can be clearly captured compared with the case where the device attached to the electric bed 610 as the terminal device 200-1 in the FIG. 5. Therefore, in the case of automatically selecting the correct image data according to the assisted person, the positioning application AP1 may automatically identify the assisted person based on the result of the face recognition processing. In addition, the positioning application AP1 may automatically select the correct image data based on the results of the face recognition processing. For example, if multiple positioning applications AP1, each positioning application corresponding to each correct image data, are installed in the terminal device 200, the terminal device 200 may determine which the positioning application AP1 would be activate based on the result of the face recognition processing. Alternatively, when multiple sets of correct image data are associated with one positioning application AP1, the correct image data to be used may be selected from the multiple sets of correct image data based on the result of the face recognition processing.

<Device Example Used in a Positioning Application>

In addition, as a device used for setting up and using the positioning application AP1, we shows a wheelchair 630 capable of pressure detection as the example, but the devices used in the postioning application are not limited to this wheelchair 630, other devices may be used.

Figure 13:
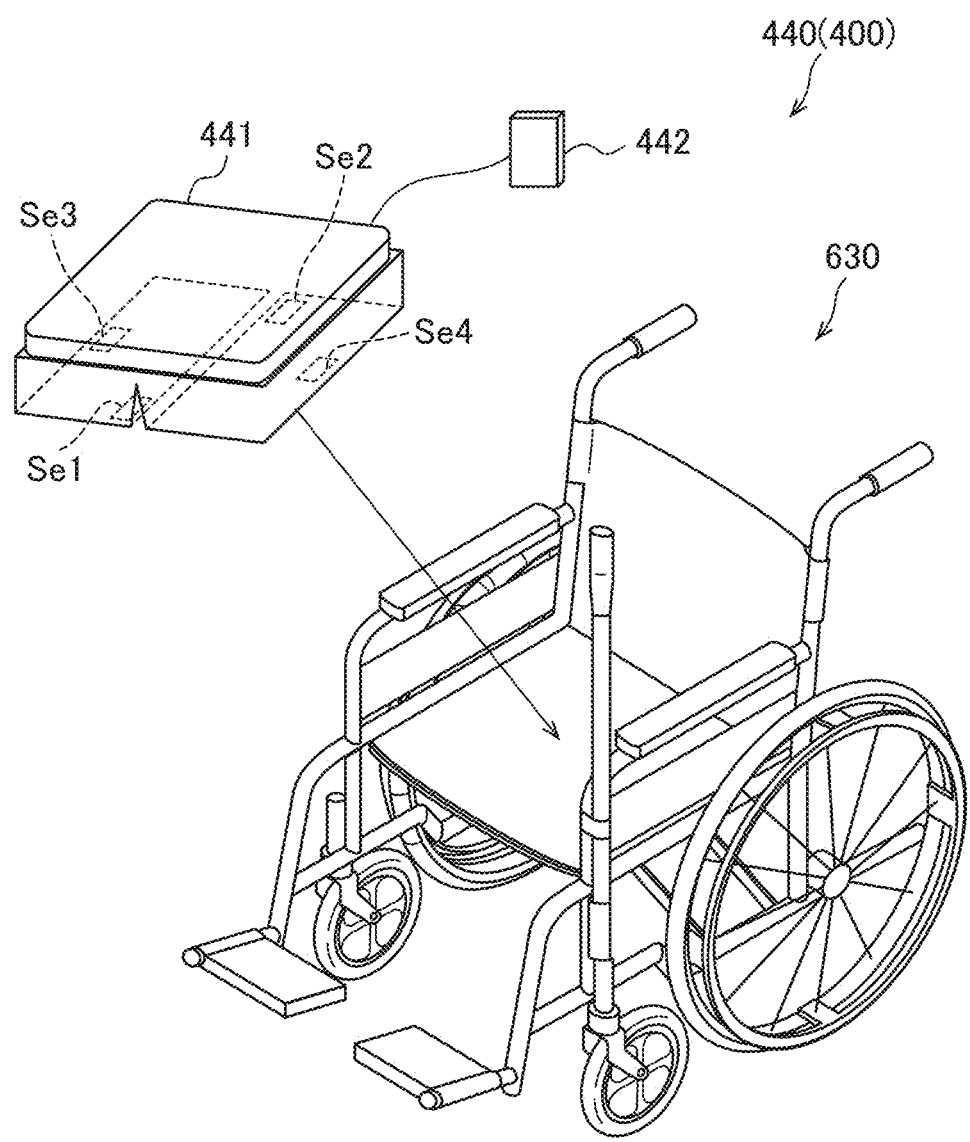
FIG. 13 illustrates a pressure sensor disposed on a wheelchair.

The FIG. 13 is an example of other devices used for the positioning application AP1, showing the seat sensor 440 placed on the seating surface of, for example, a wheelchair 630. The seat sensor 440 includes a pressure sensor that outputs a pressure value and outputs the pressure value. For example, the output of the seat sensor 440 may be used as the information corresponding to the pressure distribution in the screen of the FIG. 12.

The seat sensor 440 may be capable of processing other than outputting the pressure value to the positioning application AP1. For example, the seat sensor 440 may determine, based on the pressure value of the pressure sensor, which of the multiple postures, including a normal posture, a forward displacement posture, a lateral displacement posture, the posture (Hereafter, it is also described as a sitting posture.) of the assisted person is when the assisted person is sitting in the wheelchair 630. The forward displacement posture refers to a state in which the center gravity of the user (mainly the assisted person) is shifted to the forward more than the normal posture, and the lateral displacement posture refers to a state in which the center gravity of the user (mainly the assisted person) is shifted to either the left or right more than the normal posture. The risk of falling from the seat of the wheelchair is pretty high if the posture of the assisted person corresponds to either the forward displacement posture or and the lateral displacement posture. In addition, the seat sensor 440 may determine the possibility that the assisted person falls from the wheelchair.

In the example of the FIG. 13, there are four pressure sensors Se1 to Se4 arranged on the back side of a cushion 441. The cushion 441 is arranged on the seat of the wheelchair 630. The pressure sensor Se1 is a sensor positioned at front side of the cushion 441, the pressure sensor Se2 is a sensor positioned at back side of the cushion 441, the pressure sensor Se3 is a sensor positioned at the right side of the cushion 441, and the pressure sensor Se4 is a sensor positioned at the left side of the cushion 441. Here, the front side, the back side, the left side, and the right side represent the direction as seen from the assisted person in the state where the assisted person sits in the wheelchair 630.

As shown in the FIG. 13, the pressure sensors Se1 to Se4 are electrically connected to the control box 442, and the control box 442 includes a processor for controlling the pressure sensors Se1 to Se4, and a memory that becomes the work area of the processor. The processor is configured to detect pressure values acquired from the pressure sensors Se1-Se4.

The assisted person sitting in the wheelchair 630 may feel pain in his or her buttocks and displace the buttocks. For example, the forward displacement posture indicates a condition in which the buttocks are shifted to the forward more than the normal posture, and the lateral displacement posture indicates a condition in which the buttocks are shifted to either the left or right. The center gravity may also shift obliquely because both the forward displacement and the lateral displacement simontainously occur in the posture of the assisted person. By using a pressure sensor placed on the cushion 441 as shown in the FIG. 13, since the seat sensor 440 can detect changes in the buttocks position of the assisted person, the seat sensor 440 can detect the forward displacement posture or the lateral displacement posture with high accuracy. For example, the seat sensor 440 determines the posture of the assisted person is the forward displacement posture when the value of the pressure sensor Se1 increases by more than a prescribed amount compared to the initial state, and determines the posture of the assisted person is the lateral displacement posture when the value of the pressure sensor Se3 or Se4 increases by more than a prescribed amount compared to the initial state.

The seat sensor 440 may output the pressure value, which is the output of the pressure sensors Se1 to Se4, to the server system 100 as the sensing data, or may output the determination result of the forward displacement posture or the lateral displacement posture, and the determination result of the possibility of falling, etc. to the server system 100 as the sensing data. In addition, a control box 442 may include a light emitting part, etc., and the light emitting part may be used to inform a notification to the caregiver. In this way, since the seat sensor 440 can easily notify the change of the sitting posture in the wheelchair 630, the risk of falling of the assisted person can be reduced.

2.3 The Position of Objects to be Placed in the Living Environment of the Assisted Person In the above, we have explained an example of adjusting the position of an object such as a cushion as additional information when the caregiver adjusts the position of the assisted person. However, in the method of the present embodiment, the caregiver may not adjust the position adjustment of the assisted person, and the caregiver may adjust only the position adjustment of the objects arranged around the assisted person.

The environment of the assisted person refers to a living room or other place used by the assisted person for living. In this case, the terminal device 200-1 or 200-2 shown in the FIG. 5 may operate the positioning-application AP1, the terminal device 200 shown in the FIG. 10, another terminal device 200 placed in a living room or the like, or a terminal device 200 carried by a caregiver may operate the positioning-application AP1.

The objects placed around the assisted person may be furniture, electric appliances, ornaments or other small items. The objects placed around the assisted person may also include devices used for medical and nursing care, such as the electric bed 610 with adjustable or moveable bottom and height, the wheelchair 630 with adjustable backrest angle, and peripheral devices 500 described later using the FIGS. 19A to 19D.

The correct image data acquired in the setting mode is similar to the example of the bed position adjustment or the wheelchair position adjustment. For example, the correct image data is image information captured when an object is placed in a correct position which the skilled caregiver determines. In the usage mode, the positioning application AP1 may perform information processing for superimposing and displaying the correct image data over the captured current images, or perform information processing for determining whether the object is placed in the correct position, and determines the object is not placed in the correct position as NG when there is an object whose amount of deviation from the correct position is equal to or greater than a predetermined threshold.

In this way, the caregiver can easily adjust the positions of the objects around the assisted person so that the objects are placed in the correct positions. This processing is useful, for example, in cooperative processing associated with the disquieting behavior. The details of cooperative processing associated with the disquieting behavior. will be described later using the FIG. 23, etc.

However, if there is tacit knowledge regarding the object arrangement to ensure the safety of the caregiver, the assisted person, and the family member of the assisted person, (For example, preventing falling and collisions, preventing the objects from falling from a high position, etc.), the positioning application AP1 may be set according to the tacit knowledge. In this way, it is possible to make the living conditions safer by using the positioning application AP1. For example, the positioning application AP1 that adjusts the position of objects may be used to ensure safety in the hospitals and the nursing facilities. In the care assistance at home, the correct image data acquired in the hospitals and the nursing facilities can be used for the care assistance at home from the perspective of diverting the object arrangement in the hospitals and the nursing facilities. In addition, the correct image data representing the safe object arrangement at home may be acquired by a skilled person such as a visiting caregiver.

3. Cooperative Processing, Including Positioning Applications

Next, we will explain the cooperative processing between the positioning application AP1 and other applications and other devices using several examples.

3.1 Cooperative Processing Under the Perspective of Pressure Ulcers

Figure 14:
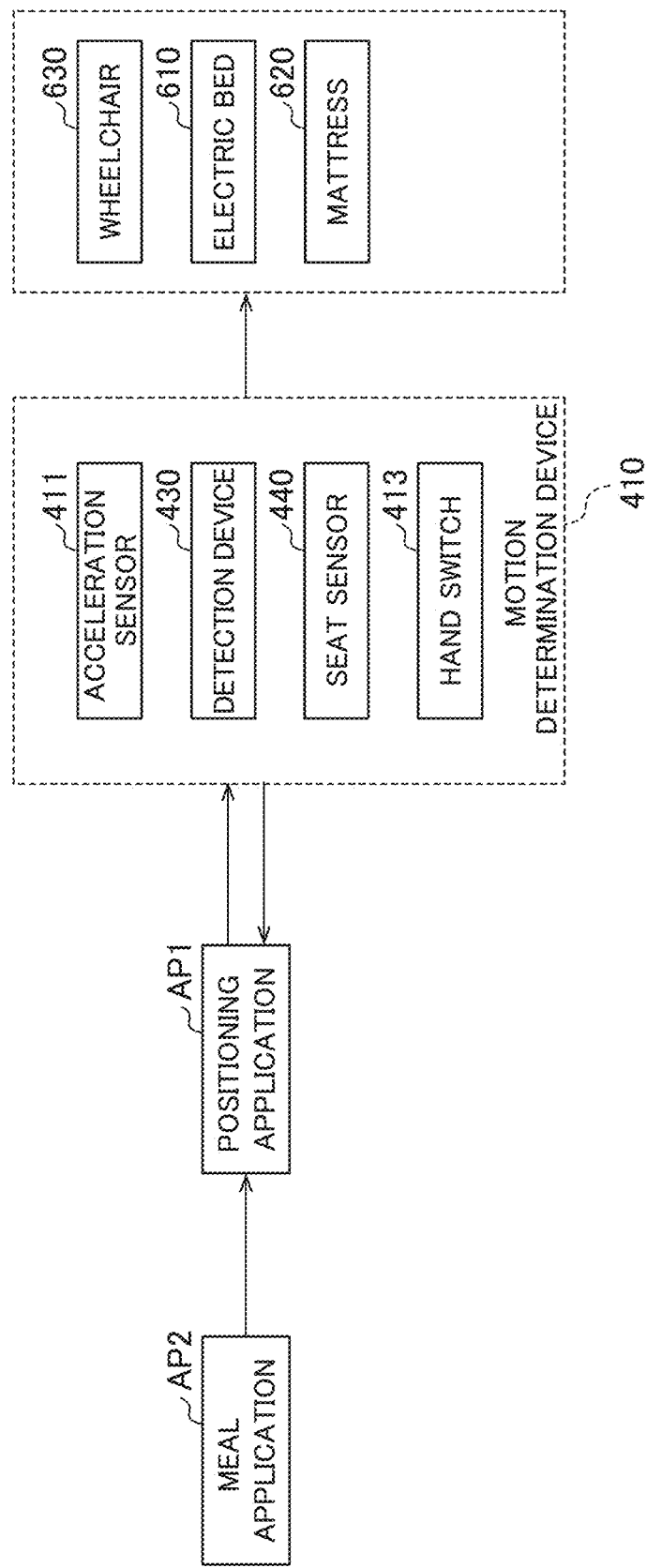
FIG. 14 illustrates a cooperation example of a positioning application in view of pressure ulcers.

The FIG. 14 is a diagram illustrating the cooperative processing between the positioning application AP1 and other applications and devices in view of suppressing the pressure ulcers for the assisted person. As shown in the FIG. 14, the meal application AP2, the positioning application AP1, the motion determination device 410, the electric bed 610, the mattress 620, the wheelchair 630, etc. mentioned above may be cooperative to suppress the pressure ulcers of the assisted person.

3.1.1 The Meal Applications

<The Operation of the Meal Application>

The meal application AP2 detects at least one of the type and amount of food eaten by the assisted person in the meal assistance of the assisted person. That is, the information processing system 10 of this embodiment may include a device on which the meal application AP2 operates.

For example, the idea named "SSKIN" is known as the basic idea of preventing the pressure ulcers. The idea named "SSKIN" indicates "Skin Inspection, Support Surface, Keep Moving, Incontinence Management, Nutrition & Hydration". That is, in order to suppress pressure ulcers, it is useful to comprehensively use both items that can be managed using the positioning application AP1 such as "Support Surface" and "Keep Moving", and items that can be managed using the meal application AP2 called "Nutrition & Hydration". Therefore, it is possible to effectively suppress pressure ulcers using the positioning application AP1 together with the meal application AP2.

Figure 15:
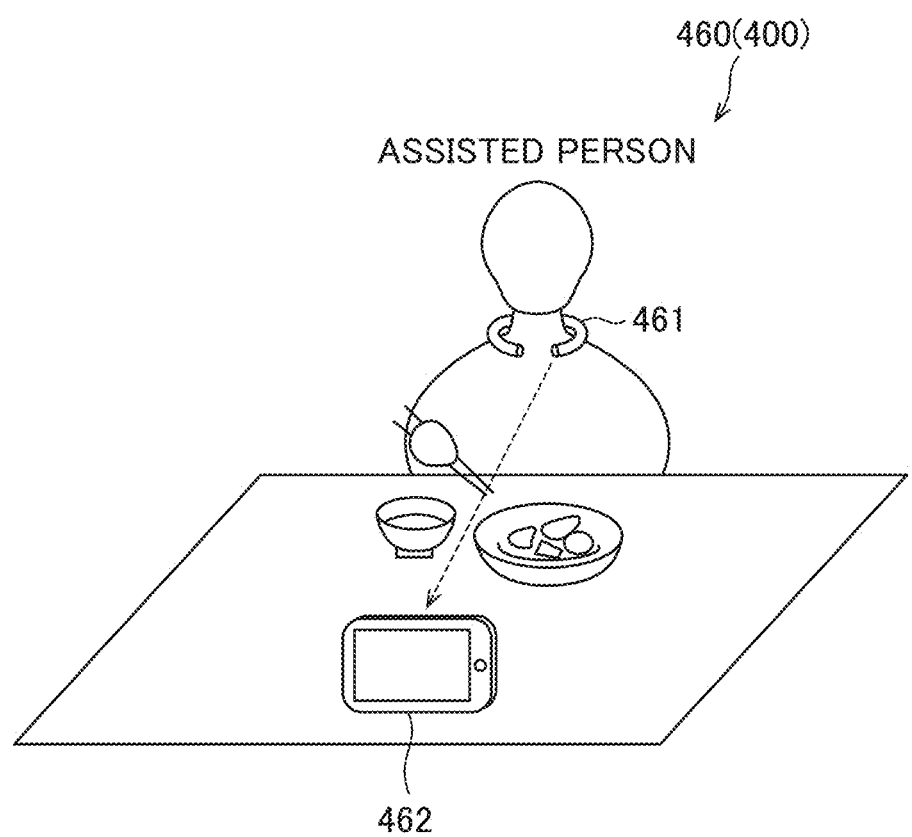
FIG. 15 illustrates an example of a device for detecting the swallowing or the choking.

FIG. 15 is an example of a device in which the meal application AP2 operates, and is a diagram illustrating a swallowing choke detection device 460 used in the meal scene. As shown in the FIG. 15, the swallowing choke detection device 460 includes a throat microphone 461 worn around the neck of the assisted person and a terminal device 462 with a camera. However, the meal application AP2 may operate in a device other than the swallowing choke detection device 460, such as the terminal device 200 or the server system 100.

A throat microphone 461 outputs voice data acquired from swallowing, or coughing of the assisted person. The camera of the terminal device 462 outputs an image captured the state of the assisted person in the meal scene. The terminal device 462 is, for example, a smartphone or a tablet-type PC placed on a desk where the assisted person eats. The throat microphone 461 is capable of electrically connecting or communicating to a terminal device 462 using Bluetooth® or the like, and the terminal device 462 is capable of electrically connecting or communicating to a server system 100 through a network. However, both the throat microphone 461 and the terminal device 462 may be directly electrically connectable to the server system 100, and the detailed communication method allows various modifications to be performed.

For example, the terminal device 462 may include a memory for storing the meal application AP2 and a processor operating according to the meal application AP2. The terminal device 462 then performs an information processing to determine at least the type and amount of food eaten by the assisted person according to the meal application AP2.

Figures 16A, 16B:
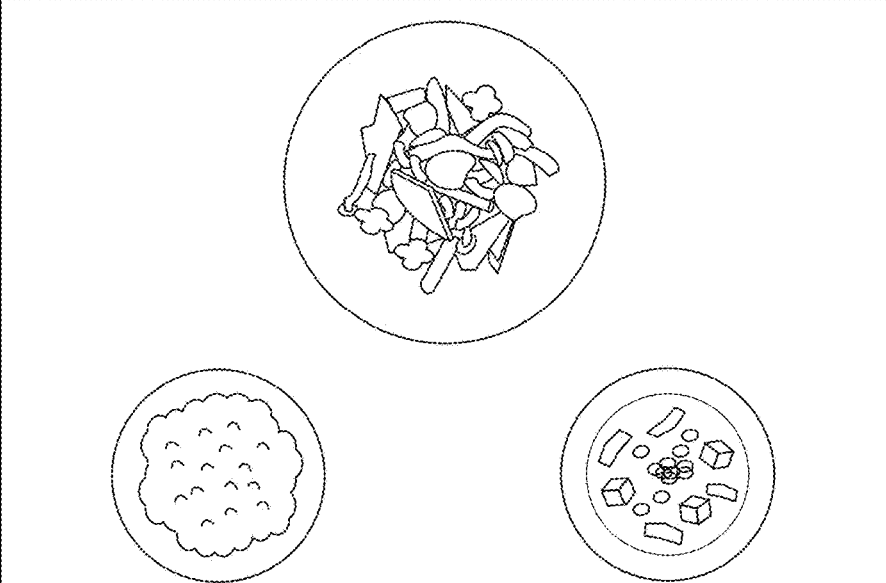
FIG. 16A is a screen example for a meal application.
FIG. 16B is a screen example for the meal application.

The FIGS. 16A and 16B illustrate examples of operation screens of the meal application AP2. This operation screen is displayed, for example, on the display of the terminal device 462.

The FIG. 16A is a screen to input information identifying the assisted person and information identifying whether the captured image corresponds to the meal before the assisted person eats or the meal after the assisted person had eaten. For example, in nursing facilities, in order to manage the diet of each assisted person, a tag is provided to each meal to indicate which the assisted person the meal was prepared for. The meal includes food served in a plurality of dishes. The tag here may include, for example, a barcode or QR code. The meal application AP2 identifies the assisted person to eat the meal by reading the barcode using a barcode reader such as a camera of the terminal device 462. On the screen shown in the FIG. 16A, a text instructing the reading of the barcode is displayed and an image captured by the camera of the terminal device 462 is also displayed. The meal application AP2 of the terminal device 462 acquires information identifying the assisted person by the caregiver adjusting the camera of the terminal device 462 so that the barcode is clearly imaged. When the meal application AP2 reads the barcode, the meal application AP2 may display the name of the assisted person, which is the result of the reading, in the column of "Name" on the screen shown in the FIG. 16A.

The screen shown in the FIG. 16A may also include a radio button for selecting whether the captured image corresponds to the meal before the assisted person eats or the meal after the assisted person had eaten, as either "before" item or "after" item. By the caregiver selecting either "before" item or "after" item, the meal application AP2 can determine whether the captured image acquired using the screen in the FIG. 16B corresponds to the image of the meal before the assisted person eats or the image of the meal after the assisted person had eaten.

When the caregiver pushed the "next" button on the screen of the FIG. 16A, that is, the "next" button was selected, the meal application AP 2 displays the screen of the FIG. 16B. The screen of the FIG. 16B displays the name of the assisted person and information selected either "before" item or "after" item by the caregiver using the screen in the FIG. 16A. In the screen of the FIG. 16B, the meal application AP2 display the image captured by the camera of the terminal device 462 as a moving image. The FIG. 16B shows an example of the meal captured from directly above, but the meal may be captured from an oblique direction. When the caregiver pushed the "picture" button in the screen of the FIG. 16B, that is, the "picture" button was selected, the captured image is stored in the memory as a still image. Thus, by the similar method, the image corresponding to the "before" and the image corresponding to the "after" may be stored in the memory as the still image respectively. While the FIG. 16B shows an example there are three dishes in the captured image, the number of dishes in a given menu can be variously modified.

Figure 17A:
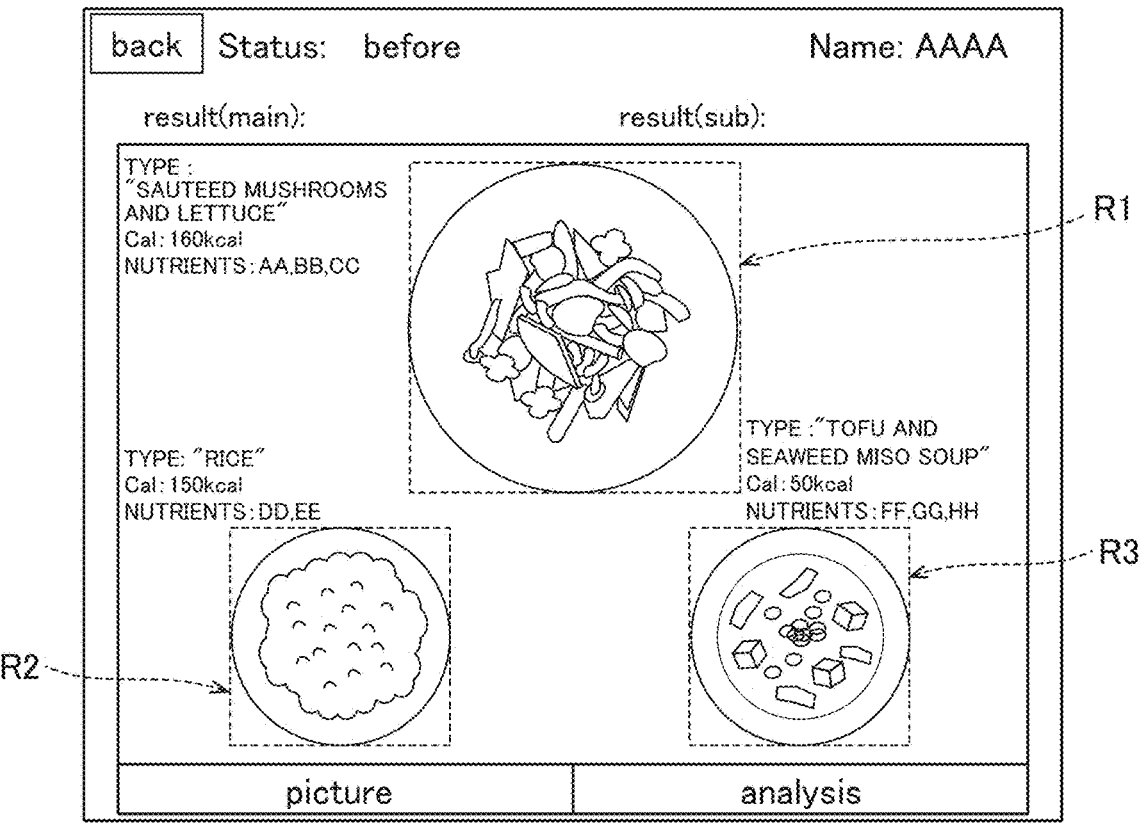
FIG. 17A illustrates the processing of the meal application.
Figure 17B:
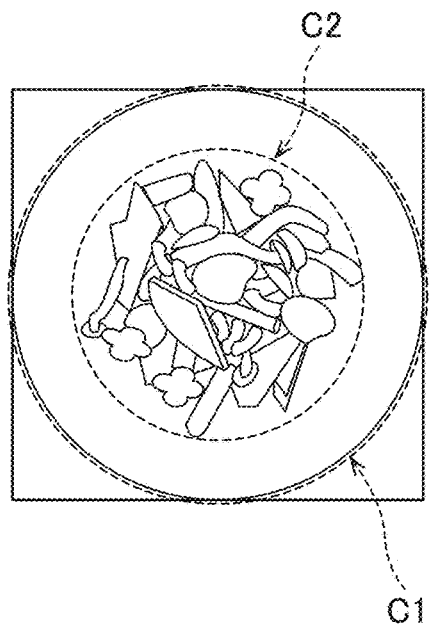
FIG. 17B illustrates the processing of the meal application.

When the caregiver selects the "analysis" button on the screen of the FIG. 16B, that is, the "analysis" button is selected, the meal application AP2 determines the type and amount of food eaten by the assisted person based on the stored still images corresponding to the "before" and "after". The FIGS. 17A and 17B show diagrams illustrating the processing performed by the meal application AP2. Firstly, As shown in the FIG. 17A, the meal application AP2 detects areas corresponding to dishes or bowls from the still images. For example, the meal application AP2 performs an information processing to detect a rectangular area enclosing a dish or bowl on which food is mounted. In this case, the meal application AP2 detects the rectangular regions R1 to R3 because the meal application AP2 detects a region containing each of the three dishes or three bowls. In this process, well-known object detection techniques can be widely applied, so a detailed description is omitted.

The meal application AP2 may perform an information processing to determine the type of food eaten by the assisted person based on the rectangular areas R1 to R3, which are detected by the object detection techniques. For example, "FOOD IMAGERECOGNITION USING DEEP CONVOLUTIONAL NETWORK WITH PRE-TRAINING AND FINE-TUNING" (http://img. cs.uec.ac.jp/pub/conf15/150703yanai_0.pdf) by Yanai et al., discloses methods for recognizing food from images based on DCNN (deep convolutional neural network). The meal application AP2 of this embodiment may determine the type of food based on the result of image processing as in the above method. For example, the meal application AP2 inputs the images corresponding to each of rectangular area R1 to R3 into the above method and identifies the type of food eaten by the assisted person. The example shown in the FIG. 17A shows an example where identification results were obtained for three dishes: "rice", "tofu and seaweed miso soup", and "sauteed mushrooms and lettuce", respectively. The meal application AP2 also identifies the calories for each dish and the types of nutrients consumed by each food based on the results of identifying the type of food. As shown in the FIG. 17A, the meal application AP2 may display the identified calories and the nutrients in association with the type of food.

As shown in the FIG. 17B, the meal application AP2 may perform an information processing to crop a circular area from an image of the rectangular region which include the dish and food.

In the following, although we will explain the example using the region R1 as the rectangular region, the same processing is performed for the rectangular regions R2 and R3. The circular area is an area inside the circle C1 shown in the FIG. 17B. For example, the meal application AP2 may perform an information processing to change the rectangular region R1 detected by the processing shown in the FIG. 17A to a square shape, and then may perform an information processing to trim the square shape to the circular shape C1 inscribed in the square shape. As a result of the trimming processing, this processing makes the ratio of the dish or the bowl including the served food increase, thereby suppressing the influence of other objects such as tables. Note that the circular shape C1 is not limited to a perfect circle, the circular shape C1 may be an ellipse or a shape with a concave and convex part of the circle, and may broadly include shapes with a degree of difference from the circle of less than a predetermined degree.

Moreover, the meal application AP2 calculates a first pixel value of the first region corresponding to a center region from the result of the trimming processing and a second pixel value of the second region corresponding to a peripheral region from the result of the trimming processing. For the sake of the explanation, the first region is described as the central region and the second region is described as the peripheral region. Again the first pixel value is expressed as the center pixel value, and the second pixel value is expressed as the peripheral pixel value. The pixel value as described here can be the pixel value in a grayscale image or one of the RGB pixel values in a color image. In view of the fact that the center region or the peripheral region includes multiple pixels, the center pixel value and the peripheral pixel value are not limited to a single value, but may be a set of multiple pixel values (e.g., a distribution).

For example, the meal application AP2 sets two circular shapes C1 and C2 in the rectangular region R1 to the center region or the peripheral region according to the result of the trimming processing for the rectangular area R1. The center region is the region inside the circular shape C2. The peripheral area is the area outside of the circular shape C2 and inside the circular shape C1. The circular shape C2 is smaller than the circular shape C1, and the size ratio of the two circular shapes may be fixed or may be changeable based on a user input, etc. The circular shape C1 and the circular shape C2 are, for example, concentric circles with a common center, but may be set with the center shifted.

As the example of the FIG. 17B, the food is more likely to be placed in the center of the dish. Thus, in the center region of the image corresponding to the meal before the assisted person eats, a ratio of the area captured the food is relatively larger than a ratio of the area captured the dish. As a result of this, the distribution of center pixel values corresponding to "before" has a higher frequency of pixel values corresponding to the food and a lower frequency of pixel values corresponding to the dish. In contrast, the food is unlikely to placed up to the rim of the dish. Therefore, in the peripheral region of the image, the ratio of the area captured the food is relatively smaller than the ratio of the area captured the dish even if the image is the image corresponding to the meal before the assisted person eats. As a result of this, the distribution of peripheral pixel values corresponding to "before" has a lower frequency of pixel values corresponding to the food and a higher frequency of pixel values corresponding to the dish.

For example, the meal application AP2 determines the range of pixel values corresponding to the food and the range of pixel values corresponding to the dish or bowl by comparing the distribution of center pixel values corresponding to "before" with the distribution of peripheral pixel values corresponding to "before". Specifically, as described above, the range in which the frequency is high in both the center pixel value and the peripheral pixel value corresponds to the dish, and the range in which the frequency is high in the center pixel value but low in the peripheral pixel value corresponds to the food. For example, the meal application AP2 may set a threshold value as a boundary between the pixel value corresponding to the food and the pixel value corresponding to the dish in the range where the pixel value can be taken (0 to 255 as an example). Since Otsu's binarization method or other well-known techniques can be widely applied to the threshold setting, a detailed explanation is omitted.

We had explained the example of DCNN above as the method the meal application AP2 identifies the type of food, but the method is not limited to this DCNN method. For example, the meal application AP2 may determine the type of food based on a range of pixel values corresponding to the identified food. For example, table data associating the pixel value range with the type of food is stored in advance, and the meal application AP2 identifies the type of food based on the table data. In addition, the meal application AP2 may obtain user input indicating whether the target dish is a main dish or a side dish, and use the user input to identify the type of food.

In addition, after the assisted person had eaten the food, the amount of food left on the plate changes according to the amount of food the assisted person had eaten. In other words, the area captured the food in the image corresponding to the meal after the assisted person had eaten will be smaller than the area captured the food in the image corresponding to the meal before the assisted person eats according to the amount of intake, and therefore, the frequency of pixel values corresponding to food decreases compared with the image corresponding to the meal before the assisted person eats, when we see the distribution of the central pixel values after the assisted person had eaten. And the degree of decrease in the frequency of pixel values corresponding to food is related to the amount the assisted person had eaten, that is the intake.

Therefore, the meal application AP2 may calculate the amount of decrease in the frequency of the pixel value corresponding to food in the central pixel value of the image corresponding to the "after" relative to the frequency of the pixel value corresponding to food in the central pixel value of the image corresponding to the "before", as an index value representing the intake amount. It should be noted that the meal application AP2 performs an information processing to associate the image corresponding to the "before" with the image corresponding to the "after" of the same dish based on the information identifying the assisted person and the timing when the still image is captured. For example, the meal application AP2 uses a imaging timing of acquiring the image of the target assisted person corresponding to the "before" as a reference, and identifies the image of the same assisted person captured after the imaging timing and at the timing closest to the imaging timing as the image of the target assisted person corresponding to the "after". The meal application AP2 then uses the two images as a set of images that capture the same dish provided to the same assisted person, and obtain the index value representing the intake amount described above.

For example, the meal application AP2 stores a table data with which actual intake (actual amount the assisted person had eaten) and the index values are associated in advance. The actual intake here is measured on a scale of 1 to 10, for example. Then, the meal application AP2 obtains the difference or the ratio between the number of pixels corresponding to the food in the image corresponding to the "before" and the number of pixels corresponding to the food in the image corresponding to the "after" as an index value, and by comparing the index value with the above table data, the meal application AP2 may determine the actual intake amount in a range 0 to 10. While we had explained the above example using table data, a function to obtain the actual intake from the index value may be used. The functions here can be a linear function or a nonlinear function. In addition, more or less than 10 steps may be used to determine the actual amount of intake, and various modifications can be made to determine the actual intake amount.

<Cooperative Processing Between the Meal Application and the Positioning Application>

As noted above, eating the meal is important to control or suppress the pressure ulcers, and the assisted person with dietary problems seems to have a highly risk of the pressure ulcers. Therefore, the positioning application AP1 changes the operating mode of the positioning application from the first mode to the second mode with a relatively high processing load when the meal application AP2 detects at least one of the deficiency of the amount of food eaten by the assisted person and the nutritional deficiency of the assisted person. The amount of food the assisted person had eaten is information that represents the total amount of food eaten by the assisted person during a predetermined period, regardless of, for example, the type of food. For sake of the explanation easily, below, the total amount of food eaten by the assisted person during a predetermined period is also referred to as the amount of eaten food. The nutritional deficiency refers to the fact that the intake of each nutrient in food, such as carbohydrates, lipids, proteins and vitamins, is not satisfied with the necessary amount for the assisted person.

In this way, the positioning application AP1 can be actively used in situations where the risk of pressure ulcers is high, such as when the amount of food is insufficient or when the amount of food is sufficient but specific nutrients are insufficient. As a result, it becomes possible to reduce the risk of the pressure ulcers.

For example, the meal application AP2 determines whether the amount of eaten food is insufficient by comparing the actual amount of eaten food with the reference amount of food determined by the attributes of the target assisted person. The meal application AP2 may also determine the amount of nutrients per one unit amount included in a subject food by identifying the type of food. The meal application AP2 then multiplies the amount of nutrients per one unit amount by the amount of food eaten by the assisted person to find the nutrients that can be eaten by the meal of the target assisted person. For example, the meal application AP2 determines whether the target assisted person is undernourished by comparing the reference value of nutrients determined by the target assisted person's attributes with the amount of nutrients the target assisted person had actually eaten.

Here, among a plurality of the operation modes of the positioning application AP1, the first mode is an operation mode corresponding to an off state or a standby state, and for example, the positioning application AP1 may not be activated. Note that the terminal device 200 can activate the applications other than the positioning application AP1, that is the positioning application AP1 may not be activated in the first mode even if the terminal device 200 itself is an on state. The second mode is a state in which the positioning application AP1 is activated, and may be an operation mode that superimposes and displays the transparent correct image data over the real-time captured image or outputs whether the posture of the assisted person or the movement of the caregiver is appropriate as either OK or NG based on, for example, the body frame tracking. In this way, the positioning application AP1 can be properly activated when the meal application AP2 had determined that the risk of the pressure ulcer is relatively high about the target assisted person. For example, in a state where the positioning application AP1 is the inactive state and the meal application AP2 is activated firstly, and when the meal application AP2 determines the target assisted person has detected that food quantity or nutrition is insufficient for the target assisted person as a trigger, the positioning application AP1 may be automatically activated or automatically set to be activated when the excretion assistance is performed by the caregiver.

However, the examples of the first and second modes are not limited to the above explanation. For example, the first mode is the state in which the positioning application AP1 may be already activated. The positioning application AP1 may be activated as a trigger by detection of the presence of a person in the electric bed 610, detection of changing the diaper of the assisted person, detection of a person in the wheelchair 630, etc. The positioning application AP1 transfer the second mode from the first mode when the meal application AP2 detects the deficiency of the amount of food eaten by the assisted person or the nutritional deficiency of the assisted person during activating the positioning application AP1. For example, the second mode here is an operation mode where the number of functions of the positioning application AP1 is larger than that of the functions in the first mode, that is, the positioning application AP1 may use a large number of functions in the second mode compared with the first mode. The positioning application AP1 includes, for example, a function for superimposing the correct image data over the current image, a function to determine whether the posture of the assisted person or the movement of the caregiver is appropriate as either OK or NG, a function for automatically selecting the correct image data, a function to automatically control the electric bed 610, and the various functions described above, such as the function for automatically controlling something, etc.

For example, the first mode may be an operation mode in which only one of the function for superimposing the correct image data over the current image, and the function to determine whether the posture of the assisted person or the movement of the caregiver is appropriate as either OK or NG, the second mode may be an operation mode in which both of the two functions are capable of being used. In this way, if the meal application AP2 determines the target assisted person has a high risk of the pressure ulcers, the positioning application AP1 will transfer the operation mode from the first mode to the second mode to use more functions.

The positioning application AP1 can be activated in a variety of situations, such as when the assisted person is in the electric bed, when the caregiver changes the diapers of the assisted person, when the assisted person uses the wheelchair 630 or the assisted person is staying in the wheelchair 630, or when the assisted person eats the meal in a wheelchair 630. For example, the second mode may be an operation mode where the number of scenes the positioning application AP1 can activate may be larger than that of scenes in the first mode. For example, the first mode may be an operation mode the positioning application AP1 is activated in one of the above multiple scenes, and the second mode may be a mode the positioning application AP1 is activated in two or more of the above multiple scenes.

Alternatively, the second mode may be an operation mode which has a higher processing load compared to the first mode, various modifications can be performed.

<Examples of Other Processing Performed by the Swallowing Choke Detector>

We have explained an example in which the meal application AP2 operates in the terminal device 462 of the swallowing choke detection device 460. However, the swallowing choke detection device 460 may perform different processing from an information processing for determining the type of food and amount of food. For example, the swallowing choke detection device 460 may obtain various information about the meal by performing the processing described below based on audio data acquired from the microphone and captured images acquired from the camera in the swallowing choke detection device 460. The processing described below may be realized by an application different from, for example, the meal application AP2 or as a part of the meal application AP2.

For example, the swallowing choke detection device 460 determines the choking or the swallowing of the assisted person based on the voice data of the throat microphone 461. A device that uses a microphone around the neck to detect swallowing is disclosed in, for example, U.S. patent application Ser. No. 16/276,768 titled "Swallowing action measurement device and swallowing action support system" filed Feb. 15, 2019 which is herein incorporated by reference in its entirety. The processor can detect the number of times a choking has occurred during eating the meal, the time of the choking (time of occurrence, duration, etc.), and whether the person has swallowed based on the audio data acquired from the throat microphone 461.

Also, the camera of the terminal device 462 can detects eyes of the assisted person, and objects such as chopsticks, spoons, etc. used by the assisted person by capturing the image of the assisted person from the front which is shown in the FIG. 15. Various techniques for detecting these facial parts and objects based on image processing are known, and the known techniques can be widely applied in this embodiment.

For example, the swallowing choke detection device 460 can determine whether or not the assisted person's mouth is open, whether or not eaten food is coming out of the mouth of the assisted person, and whether or not the assisted person is biting the meal, based on the captured image of the camera. Also, the swallowing choke detection device 460 can determine whether or not the assisted person's eyes are open based on the captured image of the camera. In addition, based on the captured image of the camera, the swallowing choke detection device 460 can determine whether there are the objects such as chopsticks, spoons near the dishes, whether the assisted person can hold the chopsticks or the spoons, and whether the assisted person spilled the meal from the dishes.

In the method of this embodiment, based on this above information, the swallowing choke detection device 460 estimates the state of the assisted person regarding to the swallowing of the assisted person and the choking of the assisted person. For example, the swallowing choke detection device 460 may obtain information about the meal based on the detection results of swallowing and the choking and the detection results whether the mouth of the assisted person is open or close.

For example, the swallowing choke detection device 460 may determine whether the choking occurs frequently based on the number of times and the time of choking, and output the determination result. For example, the swallowing choke detection device 460 may determine that choking occurs frequently when the number of choking per unit time exceeds a threshold. In this way, the swallowing choke detection device 460 automatically determines the state of the assisted person regarding to the choking.

In addition, the swallowing choke detection device 460 may determine the swallowing period from the time the assisted person opens his or her mouth to the time he or she swallows the food based on the detection result of whether the assisted person is swallowing and the determination result whether the assisted person open his or her mouth. In this way, for example, if the number of swallowing is decreasing, the swallowing choke detection device 460 determines detailed situations such as whether the assisted person does not put the meal into his or her mouth by himself or herself or whether the assisted person does not swallow when the assisted person put the meal into his or her mouth. For example, the swallowing choke detection device 460 may start counting up the timer when the assisted person closes his or her mouth from opening his or her mouth based on the captured image from the terminal device 462 and stop counting up the timer when the assisted person is swallowing based on the audio data acquired from the throat microphone 461. The period described above represents the swallowing period. In this way, it can be accurately determined that there is a high risk of aspiration when the assisted person eats the meal and that this is a situation in which the caregiver should take some actions to reduce the risk of aspiration.

In addition, the swallowing choke detection device 460 may determine the pace of eating the meal based on the swallowing period. In addition, the swallowing choke detection device 460 may determine whether the swallowing period is long for the assisted person based on the change in swallowing period in one meal (e.g., increase amount or ratio to swallowing period in the first half of the meal, etc.) or the processor may determine the average swallowing period, etc. in each taking the meal for the same assisted person and determine whether swallowing period is long for the same assisted person based on the change in the average swallowing period.

In addition, the swallowing choke detection device 460 may determine whether the assisted person does not open his or her mouth even if the caregiver approaches the spoon with the meal or the like by using the determination result whether the assisted person open his or her mouth based on the captured image of the terminal device 462 Thus, if the swallowing period is prolonged in a situation where the assisted person is reluctant to open his or her mouth, the swallowing choke detection device 460 may determine that there is a possibility that the food remain in his or her mouth. In addition, the swallowing choke detection device 460 may determine the assisted person can no longer bite the food by using the determination result whether the food is coming out of his or her mouth and the recognition result whether the assisted person bites the food based on the captured images. For example, if the swallowing choke detection device 460 detects that the number of bites is a normal number of the assisted person but the swallowing period is long, the swallowing choke detection device 460 presume that the assisted person can no longer bite the food. Also, if the swallowing choke detection device 460 determined that the eyes of the assisted person may be closed using the captured image, the swallowing choke detection device 460 can determine whether the assisted person will fall asleep.

In addition, the swallowing choke detection device 460 may determine whether the assisted person is playing with the food, the assisted person can not hold the tableware or the assisted person does not doing anything by performing an object recognition processing of chopsticks, spoons, etc., using the captured image. For example, if the swallowing choke detection device 460 determines that an object such as the spoon overlaps the hands of the assisted person, but the period to bring the object to his or her mouth is greater than a predetermined threshold, the swallowing choke detection device 460 determines that the assisted person can not hold the tableware or the assisted person is playing with food. In addition, if an object such as the spoon does not overlap the hands of the assisted person and the period when the assisted person's gaze is directed to the food or the assisted person is facing with the food is equal to or greater than a predetermined threshold, the swallowing choke detection device 460 determines that the assisted person is watching the food without doing anything or the assisted person does not doing anything.

In the method of the present embodiment, the positioning application AP1 may change the operation mode from the first mode to second mode based on the processing result of the swallowing choke detection device 460. The positioning application AP1 may be controlled by a first trigger acquired from the meal application AP2, by a second trigger acquired from other processing results of the swallowing choke detection device 460, or by the both the first and second triggers.

For example, the swallowing choke detection device 460 may determine the swallowing ability of the assisted person based on the number and frequency of choking, the severity of choking, changes in the swallowing period, etc., obtained by the method described above. Then, when the swallowing choke detection device 460 determines that the swallowing ability of the assisted person had decreased below the prescribed level, the positioning application AP1 changes the operation mode from the first mode to second mode. For example the positioning application AP1 may be activated by triggering a decrease in the swallowing ability of the assisted person.

The swallowing choke detection device 460 may start monitoring a situation the assisted person is eating when the swallowing ability of the assisted person had decreased below the prescribed levels. Therefore, when the swallowing choke detection device 460 starts monitoring the situation, the positioning application AP1 may be activated. In addition, the swallowing choke detection device 460 may have various functions corresponding to different processing as described above, and these functions may be controlled "active" or "inactive" respectively. For example, the number of activated functions in the swallowing choke detection device 460 increases when the swallowing ability of the assisted person decreases. In this case, when the number of activated functions in the swallowing choke detection device 460 increases, or when a certain function is actived as a trigger, the positioning application AP1 may be activated. The positioning application AP1 controls the operation mode based on the ADL of the assisted person in addition to the processing results of the swallowing choke detection device 460 and the activated function.

The swallowing choke detection device 460 may determine the timing of swallowing and the amount of swallowing based on the audio data detected by the throat microphone 461, and it is known that the features of the audio data vary according to various situations. The features here may be the amplitude or the frequency in the waveform of the audio data, or a wavenumber in one swallowing of the assisted person. For example, the audio data of the swallowing vary depending on factors such as the consistency and thickness of the food and the pace of eating the meal. In addition, it has been found that the audio data of the swallowing vary according to the physical condition of the assisted person, even when the consistency and thickness of the food are the same.

Therefore, the swallowing choke detection device 460 may obtain a feature representing the audio data of swallowing based on the output of the throat microphone 461 and estimate the physical condition of the assisted person based on the feature. For example, the swallowing choke detection device 460 stores association data that correlates the feature of the audio data of swallowing with the physical condition of the assisted person based on the past history. The swallowing choke detection device 460 then estimates the physical condition of the assisted person by comparing the association data with the actually acquired feature of the audio data. The association data for correlating the features of the audio data of swallowing with the physical condition of the assisted person may be a learned model generated by machine learning.

The positioning application AP1 changes the operation mode when the swallowing choke detection device 460 determines the physical condition of the assisted person is worse than the normal condition of the assisted person. For example, as described above, if the positioning application AP1 has multiple functions, the number of activated functions when the assisted person is in poor physical condition may be greater than that of functions when the assisted person is in good physical condition.

In the method of the present embodiment, the medication management system may operate to cooperate with the swallowing choke detection device 460 when a certain meal event has detected, for example the swallowing choke detection device 460 detects the choking of the assisted person during eating the meal. For example, there are known medication assistance robots that notify medication time, supply medicines based on the user operation, manage medication history, etc. The medication assistance robots may be used as a medication management system. Also known are medication assistance applications to keep track of whether the assisted person take medicines properly and cloud systems to analyze and display medication information. The medication assistance systems may include these applications and the systems.

For example, the meal application AP2 described above detects any events such as a start event the assisted person starts eating the meal and an end event the assisted person finishes eating the meal. The medication management system accurately perform a processing for the medication management on a meal-by-meal (or, more narrowly, after each meal) basis by activating the medication management system triggered by these events. For example, the positioning application AP1 may detect, as the start event, that the posture of the assisted person is a certain posture for eating the meal in the wheelchair 630 or the electric bed 610. Also, the meal application AP2 may detect the end event when the meal application AP2 received an image corresponding to the meal after the assisted person had eaten, or the swallowing choke detection device 460 may detect the end event when swallowing has not occurred for more than a predetermined period. However, the method for detecting the events can be modified in various ways, such as detecting the start event when the meal application AP2 received an image corresponding to the meal before the assisted person eats.

We have explained the examples for detecting the events using both the positioning application AP1 and the meal application AP2 (or the swallowing choke detection device 460) described above, but the methods for detecting the events are not limited to this. For example, if the meal application AP2 is an inactive state and the end event may be detected based on the positioning application AP1, the medication management system may be performed to cooperate with the positioning application AP1 based on the detection result.

In addition, the medication management system may not be separately provided, but the meal application AP2 or the swallowing choke detection device 460 may provide medication assistance. For example, the meal application AP2 may acquire an image of medicines to be taken, and perform a information processing to determine the type and amount of the medicines the assisted person intends to take. In addition, the swallowing choke detection device 460 may determine whether or not the medicines has been properly swallowed based on the image around the mouth captured using the camera, the audio data of swallowing, etc. In this way, the meal application AP2 and the swallowing choke detection device 460 make it possible to perform the medication assistance at an appropriate time.

In addition, although we have described an example in which the positioning application AP1 may operate to cooperate with and the medication management system based on the event related to the meal, the positioning application AP1 may operate to cooperate with other systems operating while the assisted person eats the meal.

3.1.2 Motion Determination Device
<Cooperative Processing Between the Positioning Application and Other Devices, Other Applications>

As shown in the FIG. 14, the information processing system 10 of this embodiment may include the motion determination device 410 for determining motion. It should be noted that the motion determination here intends to, in a narrow sense, a determination of the motion related to the pressure ulcers, but the motion determination device 410 is not prevented from making other motion determination.

The motion determination device 410 may change the operation mode of the motion determination device 410 when the positioning application AP1 changes the operation mode to the second mode. This makes it possible to make the motion determination device 410 operate in conjunction with activating the positioning application AP1 or adding on the certain functions of the the positioning application AP1. The motion determination device 410 may also change the operation mode of the motion determination device 410 when the abnormality of the assisted person is detected based on the result acquired from the positioning application AP1. Here, the abnormality of the assisted person includes, for example, the case where the caregiver has not completed the position adjustment even after a prescribed amount of time has passed from starting the position adjustment, or the case where the positioning application AP1 determines the posture of the assisted person is not appropriate posture, that is, the result is treated as NG. This makes it possible to have the motion determination device 410 perform an information processing to respond to the detected abnormality of the assisted person. We will explain this in detail as following.

It should be noted that the motion determination device 410 may activate a certain program stored in the motion determination device 410 when the caregiver uses the positioning application AP1 for adjusting the bed position of the assisted person. The certain program includes a program to detect how much time has passed in the same posture of the assisted person, and to determine there is a high risk of the pressure ulcers if a predetermined time has passed in the same posture, and to activate an alarm or a notification to the caregiver.

As shown in the FIG. 14, the motion determination device 410 may include an acceleration sensor 411, a hand switch 413, the detection device 430, and the seat sensor 440. However, other devices such as the bedside sensors 420, a pressure-sensing electric bed 610 or a mattress 620 may be used as the motion determination device 410.

The acceleration sensor 411 is a sensor mounted on, for example, the skin or clothing of the assisted person. The acceleration sensor 411 may be a 3-axis acceleration sensor, a 6-axis gyro sensor or the like, or any other configuration.

The hand switch 413 is a user interface provided on the electric bed 610 and the wheelchair 630 and includes, for example, buttons for changing the angle of the bottom of the electric bed 610 and the angle of the backrest of the wheelchair 630. The hand switch 413 may also include a button or the like that is used to request caregivers to help or assist when the assisted person feels an abnormality or the assisted person actually has an abnormality. For example, the hand switch 413 is electrically connected or communicatable to a control device provided in the electric bed 610 and the wheelchair 630, and the angle of the bottom and the backrest is controlled based on the user operation of the hand switch 413. The detection device 430, the seat sensor 440 and the mattress 620 are same as described above.

The motion determination device 410 in this embodiment may change the operation mode between the inactive mode and the active mode. Alternatively, the motion determination device 410 may have multiple functions and may change the operation mode between a first mode in which only fewer functions can be used and a second mode in which more functions are used than the first mode.

The motion determination device 410 may perform various processing. For example, the acceleration sensor 411 may determine the posture (e.g. sitting position, right lateral decubitus position, left lateral decubitus position, etc.) of the assisted person in the electric bed 610. In addition, when the assisted person uses the hand switch 413 frequently, the assisted person may intend to change the current position to a different position, which may be caused by pain in the current position. Therefore, the motion determination device 410 obtains the information such as the frequency when the assisted person feels an abnormality and time of day when the assisted person feels an abnormality and the angle of the bottom against the floor and the angle of the backrest when he feels an abnormality, based on the output from the hand switch 413. The detection device 430, the seat sensor 440, and the mattress 620 calculate the information representing the trend of the pressure distribution. In addition, the detection device 430 may obtain whether the assisted person is sleeping or awake, whether the assisted person is staying in the electric bed 610 or gets out of the electric bed 610 as described above. In addition, the seat sensor 440 may output the possibility of the forward displacement posture, the lateral displacement posture, or falling from the electric bed 610 or the wheelchair 630 (Hereafter, the possibility of falling is described.) as the attribute information of the assisted person.

In this way, the bed or wheelchair position adjustment using the position adjustment application AP1 can reduce the risk of the pressure ulcers, and furthermore the motion determination device 410 can monitor the movement of the assisted person even in situations where the bed or wheelchair position adjustment is not performed.

For example, the information processing system 10 of this embodiment determines the risk of the assisted person based on the above various information obtained by the motion determination device 410. For example, the information processing system 10 of this embodiment determines that the risk of the assisted person is high if the following conditions are satisfied: the current heart rate is higher than normal, the sleep duration of the assisted person is insufficient, the frequency of waking up often during the night is high, waking up during the midnight occurs, body movement is not reduced even when the assisted person is sleeping, the frequency of forward displacement posture occurs is high, and the possibility of falling is high.

The information processing system 10 of this embodiment determines the risk of the pressure ulcers of the assisted person is high if the motion determination device 410 obtains the following detection results.

detecting, by using the acceleration sensor 411, that the assisted person has been facing in the same direction for a predetermined time in the electric bed 610 or the assisted person take a same posture for the predetermined time.

detecting, by the detection device 430, that the assisted person has been facing in the same direction for the predetermined time or the assisted person take a same posture for the predetermined time.

detecting, by the seat sensor 440, the pressure applied at a certain location for the predetermined period of time.

detecting, by the hand switch 413, a behavior in which the assisted person appeared to be in pain. (For example, the frequency of operation of the hand switch 413 became higher than the prescribed frequency in order to change the posture frequently.)

When the motion determination device 410 detects these risks described above, the motion determination device 410 may notify the caregiver of information about these risks described above. For example, the motion determination device 410 presents the name, content of the risk, and the degree of the detected risk of the target assisted person to the caregiver by outputting audio or displaying text on the screen. In addition, the motion determination device 410 may provide an output that encourages the caregiver to make specific interventions, such as reviewing the electric bed, the mattress, or environment devices or applying medication to the skin.

<Cooperative Processing Between the Motion Determination Device and Other Devices, Other Applications>

As described above, by operating the motion determination device 410 in conjunction with the positioning application AP1, if the motion determination device 410 determines the target assisted person has high risk of the pressure ulcers according to the contents of the meal the assisted person had eaten, the motion determination device 410 is activated and can monitor the movement of the target assisted person to reduce the risk of the pressure ulcers. For example, as described above, it is possible to evaluate the risk of the pressure ulcers based on the specific movements of the assisted person even in situations other than during position adjustment.

The motion determination device 410 detects the risk of the assisted person and may output the information related to the risk of the assisted person to the positioning application AP1, and the positioning application AP1 may change the operation mode based on the received information related to the risk. For example, if the motion determination device 410 determines the risk of the assisted person is equal to or greater than a predetermined threshold, the positioning application AP1 may change the operation mode from a mode suitable for the assisted person of the first attribute to a mode suitable for the assisted person of the second attribute different from the first attribute. The risk here is, in a narrow sense, the risk of pressure ulcers. However, the risks of the assisted person may be other risks. The attributes here are information such as age, sex, height, weight, medical history, medication history, etc., but may also include information representing the risk. The information representing the risk may indicate the degree of the risk or the output of the motion determination device 410 used to calculate the risk. For example, the acceleration value of the acceleration sensor 411, the pressure value of the detection device 430 or the seat sensor 440, the operation history of the hand switch 413, etc. may be used as attribute information related to the risk.

According to the method of this embodiment, it becomes possible for the positioning application AP1 to select the correct image data corresponding to the risk for the assisted person determined as high risk by the motion determination device 410. For example, the correct image data in this embodiment is associated with attribute information that identifies the attributes of the assisted person suitable for the correct image data, and the first attribute is an attribute corresponding to the low-risk assisted person and the second attribute is an attribute corresponding to the high-risk assisted person. Since the correct image data suitable for the assisted person can be selected, it is possible to realize appropriate position adjustments to reduce the risk of the assisted person.

Furthermore, even among those assisted person at high risk for the pressure ulcers, appropriate correct image data for the assisted person vary depending on a variety of factors, including the degree of dementia, the presence or absence of contractures, and the tendency to the posture during the assisted person is sleeping (whether the assisted person prefers to the supine position or the lateral position). And those assisted person at high risk of the pressure ulcers also have a greater need of the assistance to adjust their bed or wheelchair positions, thereby the correct image data more likely to be generated for the assisted person at high risk of the pressure ulcers. Therefore, it was not easy for caregivers to select appropriate correct image data for those assisted person at high risk of the pressure ulcers. In this respect, the method of this embodiment can automatically select the appropriate correct image data corresponding to the assisted person because the attribute of the assisted person is reviewed when the information processing system 10 detects the assisted person has a high risk of the pressure ulcers. As a result, the method of this embodiment may be pretty convenience. We will describe some specific examples below.

For example, the assisted person may be able to sleep with high quality because the assisted person can take an appropriate position in the electric bed 610 by adjusting the bed position using the positioning application AP1. However, as described above, if the detection device 430 detects a condition such as a condition the heart rate of the assisted person is higher than normal, a condition the sleep duration of the assisted person is insufficient, or a condition the frequency of waking up often during the night is high, the current posture may not be suitable for the assisted person. In such cases, it is possible to change the correct image data so that the target assisted person can take a more appropriate posture. For example, as described above, the positioning application AP1 may obtain information representing the attributes of the assisted person and may associate the correct image data with the information of the attributes representing what attributes the correct image data is suitable for the assisted person. Then the caregiver can use the appropriate correct image data for the assisted person by switching the correct image data based on the attributes of the assisted person. The positioning application AP1 may not only change the appropriate correct image data, but may also notify the caregivers of the risk of the assisted person. For example, the positioning application AP1 presents the content of the risk, the degree of the detected risk of the assisted person to the caregiver by outputting the audio or displaying the text on the screen. In addition, the positioning application AP1 may provide an output that encourages the caregiver to make a specific intervention such as reviewing the electric bed, the mattress, or environment devices.

The above explanation can be applied to the case of adjusting the wheelchair position, for example, if the seat sensor 440 detects a possibility of the forward displacement posture or falling, the current posture may not be suitable for the assisted person in the wheelchair 630. Therefore, by changing the appropriate correct image data, it is possible to make the target assisted person take a more suitable posture. Also, as mentioned above, the positioning application AP1 may notify the caregiver of the risk of the assisted person.

When the motion determination device 410 detects the risk of the assisted person, the attributes of the assisted person may have changed from the previous attributes. For example, the attributes of the assisted person (the sitting ability and past history) may change due to factors such as reduced sitting ability of the assisted person or advanced dementia of the assisted person. Therefore, when the motion determination device 410 detects the risk of the assisted person, the positioning application AP1 may update the correct image data after the positioning application AP1 perform an information processing to update the information representing the current attributes of the assisted person.

Also, as described above, it is possible to detect the risk of the pressure ulcers based on the operation of the hand switch 413. For example, if the assisted person uses the hand switch 413 frequently, the assisted person may intend to change the current position to a different position, which may be caused by pain in the current position. Therefore, the information processing system 10 obtains the information such as the frequency when the assisted person feels an abnormality and time of day when the assisted person feels an abnormality and the angle of the bottom against the floor and the angle of the backrest when he feels an abnormality as attribute information, based on the output from the hand switch 413. When the information processing system 10 detects the risk of the assisted person based on the operation of the hand switch 413 (If the attribute of the assisted person includes information indicating that the assisted person uses the hand switch 413 frequently), it is possible that the situation has not improved despite the assisted person's attempt to change posture. The positioning application AP1 may therefore suggest updating correct image data. This makes it possible to generate new correct image data that is appropriate for the target assisted person. Alternatively, the tacit knowledge (e.g., changing the electric bed or the mattress) from a different point of view than the bed or wheelchair position adjustment may be suggested.

Also, the output of the motion determination device 410 is not limited to use to automatically select the appropriate correct image data. For example, the output of the motion determination device 410 may be used when setting (generating) the correct image data. For example, when the acceleration sensor 411 changes the operation mode from an inactive mode to an active mode, the output of the acceleration sensor 411 may be displayed in the screen of the FIG. 7 or the FIG. 12. This allows more information to be presented to the skilled caregiver in the setting of the correct image data by the skilled caregiver. The output of the motion determination device 410 may also be used when the positioning application AP1 determines whether the posture of the assisted person is appropriate posture as OK or NG. For example, the positioning application AP1 may determine whether the current posture of the assisted person is appropriate posture as OK or NG by comparing the acceleration value from the acceleration sensor 411 with the acceleration value included in the correct image data.

In addition, the motion determination device 410 determines the risk of the assisted person above, but the motion determination device 410 may determine other risks. For example, the motion determination device 410 such as the detection device 430 may determine whether the assisted person is sleeping or awake. The positioning application AP1 may then change the operation mode if a state of the assisted person is changed between a sleeping state and an awaken state.

For example, when the assisted person is in the sleeping state, the positioning application AP1 may change the operation mode to a mode in which the function for superimposing the transparent correct image data over the captured current image is activated and the function for determining whether the posture of the assisted person or the movement of the caregiver is appropriate as either OK or NG is inactivated. When the assisted person is in the sleeping state, the caregiver moves the assisted person or the cushion used for the assisted person because the assisted person does not voluntarily adjust his or her position by himself or herself. Therefore, since the user of the positioning application AP1 in this case is an expert (caregiver) rather than an assisted person, the caregiver as the user can determine either OK or NG by himself by looking at the superimposed image.

Alternatively, if the assisted person is in the sleeping state, the positioning application AP1 may not be activated and the acceleration sensor 411, the detection device 430, the mattress 620 with a pressure-sensing function may perform a tracking processing of the assisted person. Then, when an alert is activated based on the result of the tracking processing, the positioning application AP1 may be activated or notify the caregiver of the alert. The alert is activated, for example, when the acceleration sensor 411 determined that the assisted person has been in a lateral position facing with the same side for more than the predetermined time, or when the detection device 430 or the mattress 620 determined that the assisted person is located at the edge of the electric bed 610. In addition, when the alert is activated, firstly the mattress automatically performs a processing to change the posture of the assisted person such as a rotating processing, and when the alert still continues to be activated or when a plurality of types of alerts are activated, the positioning application AP1 may be activated or the alert may be notified to the caregiver, and various modifications can be performed for specific control.

On the other hand, when the assisted person is in the awake state, the positioning application AP1 changes the operation mode to a mode in which the function for superimposing the transparent correct image data over the captured current image is activated and the function for determining whether the posture of the assisted person or the movement of the caregiver is appropriate as either OK or NG is activated. This is because when the assisted person is in the awake state, the assisted person may voluntarily adjust his or her position by himself or herself as the user of the positioning application AP1, and it is difficult for the non-expert assisted person to determine whether the posture of the assisted person or the movement of the caregiver is appropriate. Furthermore when the assisted person is in the sleeping state, the positioning application AP1 may activate both the function for superimposing the transparent correct image data over the captured current image and the function for determining whether the posture of the assisted person or the movement of the caregiver is appropriate as either OK or NG, and when the assisted person is in the awaken state, the positioning application AP1 may activate another function in addition to the above two functions.

In addition, the positioning application AP1 controls activating or deactivating each function on accordance with combining whether the assisted person is in the sleeping state or the awake state with other information. For example, the positioning application AP1 performs a facial recognition processing for the assisted person and may control activating or deactivating the function for each assisted person. Alternatively, the positioning application AP1 may control activating or deactivating each function based on the index value of the assisted person's ADL (Actives of Daily Living). For example, the positioning application AP1 may perform a processing to add functions to be used for the target assisted person when the ADL of the target assisted person decreases. The detection device 430 or the seat sensor 440 may determine the ADL of the assisted person. Alternatively, the positioning application AP1 may automatically add a function to be used for the assisted person when the period of activating the positioning application is equal to or greater than a predetermined threshold. When the period of activating the positioning application is equal to or greater than a predetermined threshold, this situation may indicate that it takes a long time for the caregiver to take the assisted person an appropriate posture even when using the positioning application AP1. It is therefore useful to support the bed or wheelchair position adjustment by adding features.

In addition, the positioning application AP1 may perform a processing to automatically change the correct image data according to which motion determination device 410 is communicating with the positioning application AP1. For example, the correct image data used by the positioning application AP1 may include the correct image data for the bed position adjustment and the correct image data for the wheelchair position adjustment. The positioning application AP1 may automatically select the correct image data for the bed position adjustment when the positioning application AP1 is communicating with the electric bed 610, the mattress 620, the detection device 430, etc. The positioning application AP1 may automatically select he correct image data for the wheelchair position adjustment when the positioning application AP1 is communicating with the wheelchairs 630 and the seat sensor 440. In this way, the positioning application AP1 can automatically select the correct the image data to suit the situation.

3.1.3 Other Equipment

When the motion determination device 410 detects the highly risk of the assisted person, as described above, the posture of the assisted person may not be considered to be appropriate. In this case, it is effective to change the correct image data of the positioning application AN, but it is also possible that the condition of the electric bed 610, the mattress 620 and the wheelchair 630 side may not be suitable for the assisted person in the first place.

Therefore, as shown in the FIG. 14, the motion determination device 410 may perform a processing to cooperate with the electric bed 610, the mattress 620, the wheelchair 630, etc. For example, when the motion determination device 410 determined that the risk of the assisted person is high, the electric bed 610 performs a processing to change the height of the electric bed or the angle of the bottom against the floor. Also the mattress 620 are known to be able to automatically change the position such as the rotating processing. Therefore, when the motion determination device 410 determined that the risk of the assisted person is high, the mattress 620 automatically perform a control processing to prompt the assisted person to automatically change the position. For example, the mattress 620 may be repeatedly controlled to increase the pressure of some air cells and to decrease the pressure of other air cells several times. When the motion determination device 410 determines that the risk of the assisted person is high, the wheelchair 630 automatically perform a control processing to change the height of the seat surface, the angle of the backrest against the floor.

If the positioning application AP1 stores the setting information of the electric bed 610 or the wheelchair 630 as described above, the positioning application AP1 may control the operation of the electric bed 610 or the like. That is, when the motion determination device 410 detects that the risk of the assisted person is high, The operation of the electric bed 610 or the like may be controlled by a device which is different from the positioning application AP1 independently or the positioning application AP1 may operate the main body of the electric bed 610 or the like, and various modifications can be carried out in specific aspects.

The positioning application AP1 may also perform a processing to cooperate with positioning pillows including the pressure sensors. For example, a positioning pillow is used in a case where the positioning pillow is sandwiched between the legs of the assisted person. In this case, the pressure sensor in the positioning pillow detects a higher pressure value than a pressure value of the case where the positioning pillow is not sandwiched between the legs of the assisted person. For example, the positioning application AP1 may trigger communication with the positioning pillow to start processing to determine whether or not the positioning pillow has been removed from the legs of the assisted person.

For example, the positioning application AP1 acquires the pressure value, which is the output of a pressure sensor in the positioning pillow, by communicating with the positioning pillow. The positioning application AP1 may set the pressure value at the timing of communication with the positioning pillow as the initial value, and determine that the positioning pillow has been removed from the legs of the assisted person when the pressure value output by the pressure sensor becomes smaller than the initial value or when the pressure value output by the pressure sensor becomes smaller than a predetermined value. In this way, the positioning application AP1 can support the bed or wheelchair position adjustment using the positioning pillow properly. If the frequency that the positioning pillow is removed from the legs of the assisted person is equal to or greater than a predetermined threshold, the positioning application AP1 may perform processing to recommend different positioning pillows to the target assisted person or the caregiver corresponding to the target assisted person.

3.2 Cooperative Processing Under the Perspective of Falling

Figure 18:
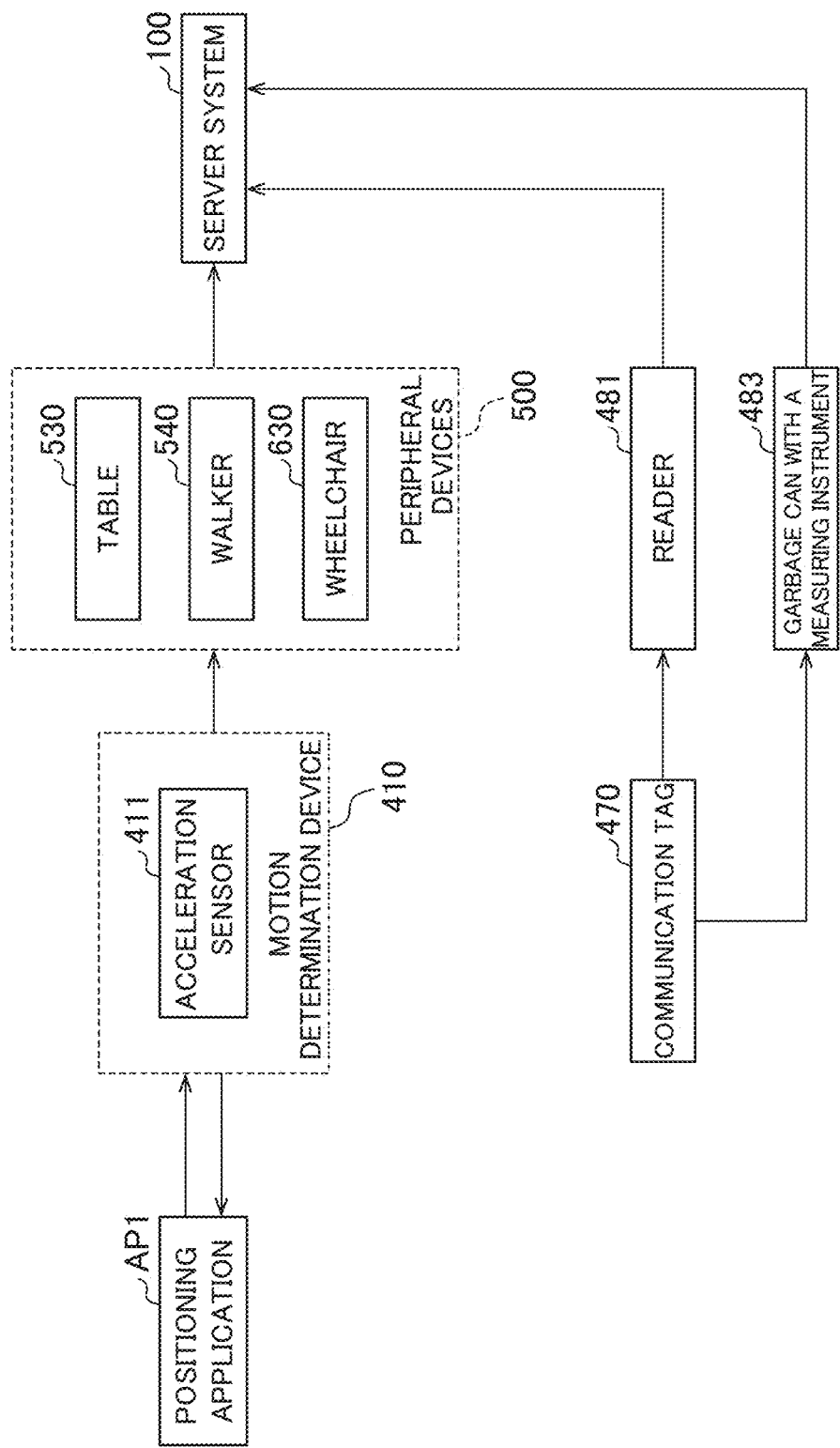
FIG. 18 illustrates a cooperation example of a positioning application in view of falling.

The FIG. 18 is a diagram illustrating the cooperative processing based on the viewpoint of preventing the assisted person from falling. As shown in the FIG. 18, the positioning application AP1 can perform processing to cooperate with the motion determination device 410 and the peripheral device 500 to suppress and reduce the falling of the assisted person. In addition, the operation history, etc. of the peripheral devices 500 is transmitted to the server system 100. The server system 100 stores the operation history in association with the operation results of the communication tag 470, a reader (an RFID reader 481), or a garbage can 483 with a measuring instrument, etc.

In the FIG. 18, the cooperation between the positioning application AP1 and the motion determination device 410 is substantially same as the example of reducing the pressure ulcers described above using the FIG. 14. For example, as described above, the meal application AP2 may perform processing to cooperate with the positioning application AP1, and as a result, the positioning application AP1 can perform processing to cooperate with the motion determination device 410. In this case, since the undernourished assisted person has a highly risk of falling, the risk of falling can be reduced by using with the motion determination device 410. However, in the method of this embodiment, the meal application AP2 may be omitted. For example, the positioning application AP1 may perform processing to cooperate with the motion determination device 410 in order to suppress the falling of the assisted person who has a high risk other than nutritional deficiency, or sudden falling by the assisted person who is not determined to have the high risk. In the FIG. 18, the acceleration sensor 411 is illustrated as the motion determination device 410, but as described above, the motion determination device 410 may include other devices.

<Peripheral Devices>

As shown in the FIG. 18, the information processing system 10 of this embodiment may further include the peripheral devices 500 that may be located around the assisted person. The peripheral devices have moving parts. The motion determination device 410 determines whether the assisted person was falling or the possibility of falling. The peripheral device 500 performs at least one of locking the moving part and automatically driving or moving to a predetermined location if the motion determination device 410 determines that there is the possibility or the risk of falling regarding to the assisted person (Hereafter described as the risk of falling).

The peripheral device 500 here represents a device used by the assisted person and placed around the assisted person in his or her daily life. In this way, the cooperation between the positioning application AP1 and the peripheral device 500 can suppress the risk of falling of the assisted person or to reduce the impact caused by falling even if the assisted person can not avoid falling itself. The processing details are described below.

For example, the acceleration sensor 411 may determine the risk of falling by performing the following processing: The acceleration sensor 411 obtains the acceleration value in x axes, the acceleration value in y axes, the acceleration value in z axes, and the square mean of the acceleration values in the x, y and z axes. When the assisted person was falling and the assisted person is wearing the acceleration sensor 411, the magnitude of the acceleration value may increase to a discernible extent compared to the normal condition due to the impact of falling. Therefore, the acceleration sensor 411 may set a threshold for distinguishing between the two conditions, one of the two conditions indicates a normal condition, and the other condition indicates a falling condition the assisted person had being falling. The acceleration values in the normal condition and the falling condition may be obtained in advance, and the acceleration sensor 411 may set a threshold using the acceleration values in the normal condition and the falling condition. The acceleration sensor 411 determines the risk or possibility of falling by comparing the threshold to at least one of the acceleration value in x-axis, the acceleration value in y-axis, the acceleration value in z-axis, and the squared mean of the acceleration values in x, y and z axes.

In addition, before actually occurring the falling, various signs of falling appear, such as the legs of the assisted person get tangled, and the assisted person lose balance of the body. Therefore, the acceleration value in the normal condition and the acceleration value at the time when the signs of falling occurs (Hereafter described as a possibility condition) may be obtained in advance, and the acceleration sensor 411 may set a threshold for distinguishing between two conditions, that is, the normal condition and the possibility condition. In this way, the risk or the possibility of falling can be detected before actually occurring the falling, because the acceleration sensor 411 can predict the falling in advance.

The falling determination process is not limited to this above explanation, and for example, a processing using the machine learning may be applied to the falling determination process. The machine learning here is a learning model using neural networks, for example. Hereafter, neural networks are referred to as NNs. However, the machine learning is not limited to the NNs, other methods such as SVM (support vector machine) and k-means methods may be used, or methods developed from these methods may be used. Also, although a supervised learning is exemplified below, other machine learning such as unsupervised learning may be used.

The NN here is, for example, RNN (Recurrent neural network). The RNN may be, for example, a Long Short Term Memory (LSTM). A Deep Neural Network (DNN) and a convolutional neural network (CNN) may also be used as the NNs.

For example, the input data of the NN includes sensor information of the acceleration sensor 411. The sensor information, as described above, includes the acceleration values in x axes, y axes and z axes and the square mean of the acceleration values in the three axes. However, it is not mandatory to use all four values described above, and some of them may be omitted. The input information may also include information on where the assisted person is, such as a location of the electric bed 610, a location of the wheelchair 630, a location of the toilet, etc. The input data may be time-series data. For example, in a case that the acceleration sensor 411 performs a measurement processing once every predetermined time and the acceleration sensor 411 obtains four values including the acceleration value in x axis, in y axis, in z axis and the mean square of the acceleration values in the three axes as a result of one measurement, the input data is a set of N*4 acceleration values obtained by N times measurements. N is an integer greater than or equal to 2.

In this way, by using the input data as time-series data, it is possible to process the input data considering the time-series change. For example, if the falling occurs in different locations, chronological behaviors may be different for each falling of the assisted person. The chronological behaviors may include why the falling occurred, background until the falling occurs, how the falling occurred. In this regard, by processing time-series input data using LSTM, etc., it becomes possible to reflect time-series differences in the falling determination process.

In addition, the output data in the machine learning is information that represents the certainty of whether a person has a risk of falling. For example, the output layer of the NNs may output a probability value between 0 and 1 as output data. The larger the value is, the higher the probability that the assisted person has a risk of falling is, that is, the higher the risk of falling is.

For example, in the case that a threshold Th, which is within a range 0 to 1, is set beforehand, the acceleration sensor 411 may determine that there is the risk of falling if the value of the output data is equal to or higher than the threshold Th. The falling determination process based on the acceleration value is not limited to the above process performed by the acceleration sensor 411. For example, the acceleration sensor 411 is electrically connected or communicable to the server system 100 directly or through other devices such as the terminal device 200, and the server system 100 performs the falling determination process based on the acceleration value acquired from the acceleration sensor 411.

In the above, we have explained the example of detecting the falling of an assisted person using an acceleration sensor 411 above. However, the falling determination process is not limited to this, and the falling determination process using other devices such as the motion determination devices 410 may be performed. For example, a falling from the electric bed 610 (e.g., a falling from a mattress 620) may be detected based on the output of the bedside sensor 420 or the detection device 430. Also, based on the output of the seat sensor 440, a falling from the wheelchair 630 (e.g., a fall from the seat surface) may be detected.

Figure 19A:
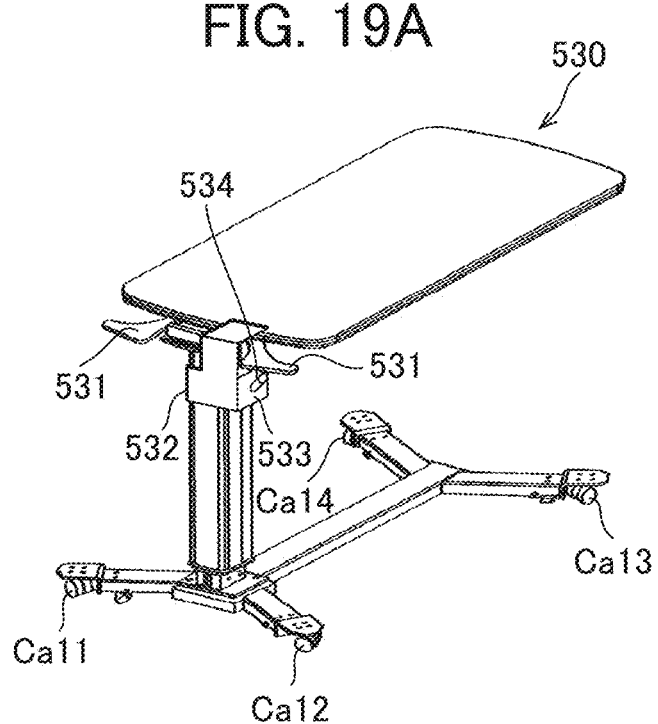
FIG. 19A illustrates a table that is a peripheral device.
Figure 19B:
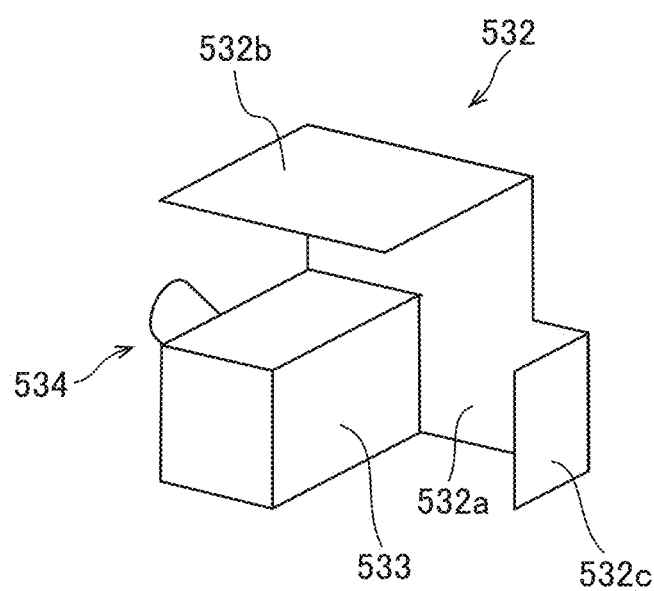
FIG. 19B illustrates the driving mechanism of the table.

The FIGS. 19A to 19B illustrate a table 530 as an example of the peripheral device 500. For example, the table with a compact operating mechanism is described in Japanese Patent Application No. 2015-229220, filed on Nov. 24, 2015, entitled "Operating mechanism and a movable table with the same". This patent application is incorporated by reference herein in its entirety. For example, the table 530 is a movable table including casters Ca11 to Ca14 as the moving parts. The table 530 usually is in a locked state which the table can not move, but the table 530 may be in the off-lock state in which the brake is released and the table can move if the user operates the operating lever 531 under a normal state (the locked state). Further, the operating lever 531 can be fixed to maintain the off-lock state, and the fixed operating lever 531 may be released by further user's operation to change the off-lock state to the locked state.

Figure 19C:
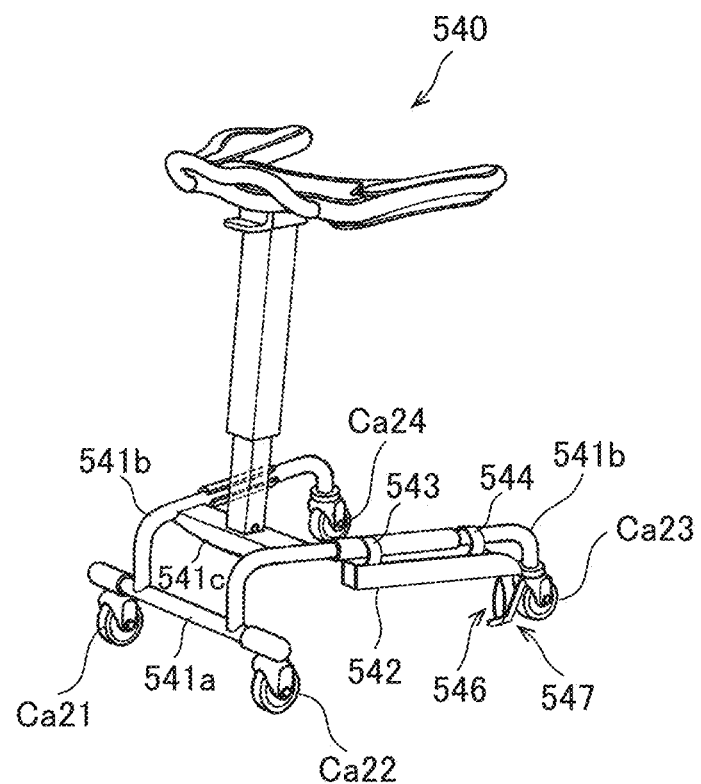
FIG. 19C illustrates a walker which is the peripheral device.
Figure 19D:
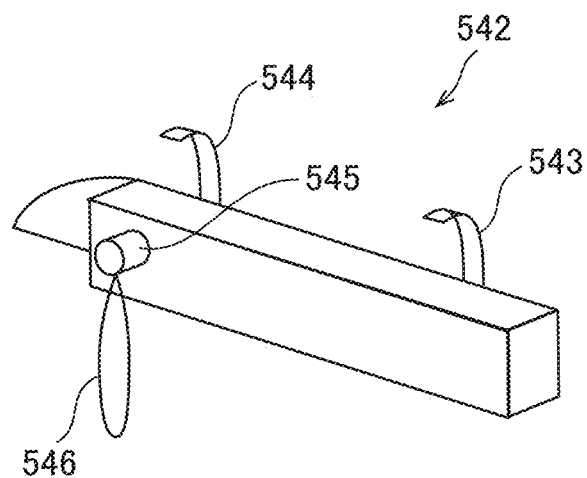
FIG. 19D illustrates the driving mechanism of the walker.

The FIGS. 19C and 19D are diagrams illustrating a walker 540, which is an example of the peripheral device 500. For example, the walker intended to be lighter, more stable and more maintainable is described in Japanese Patent Application No. 2005-192860, filed on Jun. 30, 2005, entitled "Walking Aids". This patent application is incorporated by reference herein in its entirety. The walker 540 includes casters Ca21 to Ca24, which are the movable parts, for example, and is a device that assists the walking of the assisted person. The table 530 may have a function of restricting movement by locking at least a part of casters Ca11 to Ca14.

Therefore, in this embodiment, when the risk of falling regarding to the target assisted person is detected, the casters of the peripheral devices 500 may be locked if the peripheral devices 500 can move by the casters. The motion determination device 410 may output the signal indicating the control to lock the casters or the server system 100 may output the signal indicating the control to lock the casters. The peripheral devices 500 that can move by the casters may be, for example, the table 530 or the walker 540, but other peripheral devices 500 may be used.

For example, as shown in the FIGS. 19A and 19B, the table 530 includes a pair of operating levers 531 and a fixing member 532 that fixes a drive mechanism to the table 530. Here, the driving mechanism represents a mechanism that operates to lock the moving part of the peripheral device 500. The fixing member 532 has a main surface 532*a* having a relatively large area, a surface 532*b* intersecting the main surface 532*a* and parallel to the table surface, and a surface 532*c* intersecting the main surface 532*a* and parallel to one surface of the support, and is fixed to the table 530 using these surfaces 532*a* to 532*c*. As shown in the FIG. 19B, the fixing member has a solenoid 534 and a substrate box 533 for housing the substrate that drives the solenoid 534. Here, the substrate is a substrate on which, for example, a processor or memory for controlling the solenoids 534 is mounted. As shown in the FIG. 19A, with the fixing member 532 fixed to the table 530, the solenoid 534 is positioned below one of the pair of operating levers 531. For example, when the motion determination device 410 outputs a control signal instruction to lock the table 530, the substrate drives the solenoid 534 based on the control signal. In this way, the operation lever 531 is operated based on the control signal from the motion determination device 410. Therefore, even if the operating lever 531 is fixed in the off-locked state, the lock is activated and the table 530 may change the state from the off-locked state to the locked state or the normal state. Thereby the casters Ca11 to Ca14 of the table 530 may be automatically locked.

Also, as shown in the FIGS. 19C and 19D, the walker 540 includes a base frame and a support upright on the base frame, an adjustable support provided on the support so as to be stretchable and adjustable, and a backrest provided on the top of the adjustable support for supporting the upper body of the user. The base frame includes a straight transverse leg pipe 541*a*, a pair of longitudinal leg pipes 541*b* that are integrally joined on one end side near both ends of the transverse leg pipe 541*a* to widen the other end side largely in comparison with the spacing between the two ends, and a base frame member 541*c* that is integrally joined between the pair of longitudinal leg pipes 541*b* and is for attaching to the support. The housing 542 includes hooks 543, 544 and is hung by the hooks 543, 544 on one of a pair of vertical leg pipes 541*b*. Inside the housing, as shown in the FIG. 19D, a motor 545 is provided, and the motor 545 winds up and releases the wire 546. As shown in the FIG. 19C, the wire 546 is connected to the plate-like member of brake 547.

Thus, the plate-like member is moved upward by the motor 545 winding up the wire 546, and then the caster Ca 23 is locked.

In this way, the peripheral devices 500 can be automatically locked when there is the risk of falling of the assisted person, so that the occurrence of injury for example can be suppressed when the assisted person can catch the peripheral devices 500.

The peripheral devices 500 may automatically move to a predetermined location and then may control to lock the moving part. The predetermined location here is a location where the assisted person who is about to be falling can hold the peripheral devices 500 easily, for example, the location away from the current assisted person's location by a prescribed distance. In this way, the peripheral devices 500 can be locked in the location where the assisted person can easily hold on the peripheral devices 500, and therefore, the occurrence of injury on accordance with falling for example can be suppressed.

Alternatively, the peripheral device 500 may be a device having a height adjustment function. The peripheral device with the height adjustment function may be, for example, the electric bed 610. Here, the electric bed 610 is a movable and adjustable bed whose bottom height can be changed. Using the height adjustment function, since the assisted person can easily hold the mattress 620 and the side-rail and, as a result, the assisted person can fall on the mattress 620 or grasp the side-rail, the occurrence of injury can be suppressed. However, other devices may be used as the peripheral devices 500 having the height adjustment function.

When the motion determination device 410 and the peripheral device 500 according to the present embodiment performs the above control processing, the motion determination device 410 and the peripheral device 500 may transmit information about the control processing to the server system 100. This makes it possible to properly store information about the falling of the assisted person.

For example, when the motion determination device 410 detects the risk of falling is high, the motion determination device 410 transmits the information to the server system 100, such as an index indicating the degree of the risk of falling, a prediction on how the assisted person falls, and the type of peripheral devices 500 which receives the lock instruction form the motion determination device 410. The peripheral devices 500 also transmit information such as an identification information and control contents of the peripheral devices 500 to the server system 100. In addition, the motion determination device 410 and the peripheral devices 500 may transmit information about the target assisted person and the caregiver in charge of the target assisted person. In addition, if the location of the peripheral device 500 can be identified, the location of the peripheral device 500 may be used as information regarding the location of a high risk of falling. For example, if the peripheral device 500 may communicate with an access point in the nursing facilities, the location of the peripheral device 500 can be estimated based on the communication history of the access point.

<Communication Tags, Etc.>

As mentioned above, the server system 100 can collect the information about the situation the assisted person had been falling by using the positioning application AP1, the motion determination device 410 and the peripheral devices 500. The information processing system 10 of this embodiment may collect other information about the situation the assisted person had been falling by using other devices. For example, as shown in the FIG. 18, the information processing system 10 includes a communication tag 470 and may collect more detailed information using the communication tag 470.

The communication tag 470 here is, for example, an RFID (radio frequency identifier) tag. For example, an RFID reader 481 is located at a predetermined location in the nursing facilities, there are a plurality of RFID readers 481 in the nursing facilities, and the time-series location of the communication tag 470 is obtained based on the reading result by a plurality of RFID readers 481. The RFID readers 481 can be located at various positions in the nursing facilities, such as living rooms, toilets, dining rooms, etc. Since each communication tag 470 is assigned to an ID (identification information) and the ID is associated with the assisted person, the server system 100 can collect the time-series location of the assisted person by tracking the location of the communication tag 470. The information processing system 10 stores the reading result of the communication tag 470 detected by the RFID reader 481 in the memory 120 or the like in association with the falling determination result determined by the motion determination device 410.

In addition, the communication tag 470 may be attached with a diaper, that is, the the communication tag 470 is a diaper-mountable device. For example, as shown in the FIG. 18, the information processing system 10 according to this embodiment may include the garbage can 483 with the measuring instrument to measure the weight of discarded garbage. Then, by installing the RFID reader 481 in the garbage can 483 with a measuring instrument, the weight of the diaper discarded in the garbage can 483 can be measured by the measuring instrument, and it is easy to identify the assisted person who had used the diaper discarded in the garbage can 483. This makes it easy to record the presence or absence of excretion of the assisted person and the weight of the diaper discarded in the garbage can 483. In other words, the communication tag 470 may be used to record information about the excretion of the assisted person in addition to tracking the location of the assisted person. The RFID reader 481 in this case may be provided separately from the garbage can 483 with a measuring instrument or may be built in the garbage can 483 with a measuring instrument.

In the above, we have explained an example in which the communication tag 470 is always communicable with the RFID reader 481, but the communication tag 470 of this embodiment is not limited to this example. For example, the communication tag 470 of the present embodiment is attached to the clothing of the assisted person and may have two operation modes. The communication tag 470 may be in a non-communicable state if the clothing is normally attached, and may be in a communicable state if the assisted person moves the clothing. In this case, the information processing system 10 includes a memory, and stores, in the memory, the information in which the reading result of the communication tag 470 detected by the RFID reader 481 in association with the falling determination result determined by the motion determination device 410. The memory here may be, for example, the memory 120 of the server system 100, but the memory 220 in the terminal devices 200 or the like may be used. As described above, the reading result of the communication tag 470 detected by the RFID reader 481 may be stored in association with the information representing the control results of the peripheral devices 500.

Figure 20A:
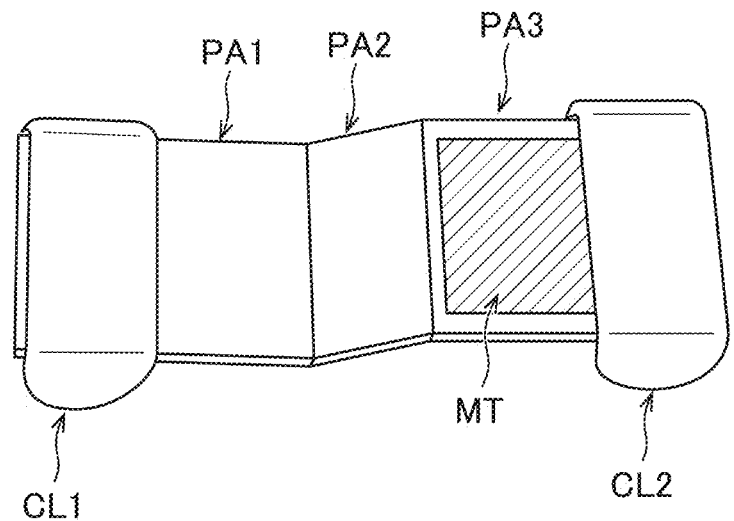
FIG. 20A is an example of the configuration of a communication tag.
Figure 20B:
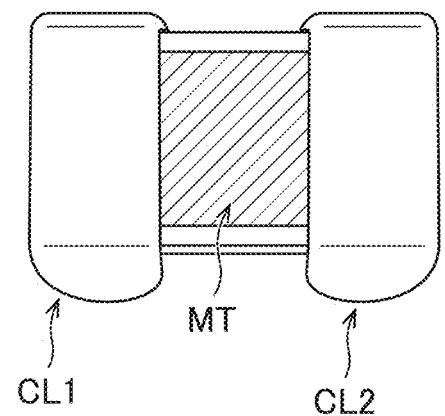
FIG. 20B is an example of the configuration of the communication tag.
Figure 20C:
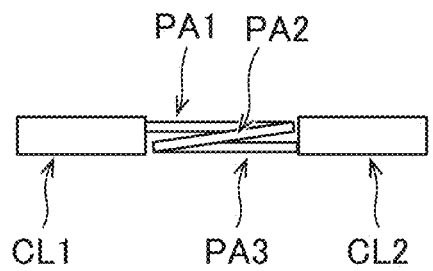
FIG. 20C is an example of the configuration of the communication tag.

The FIGS. 20A to 20C show an example of the configuration of the communication tag 470. For example, the communication tag 470 includes a tag body and two clip parts CL1 and CL2 provided at both ends of the tag body.

The tag body includes a first tag part PA1 with an internal coil, a second tag part PA2 with an internal antenna for communication, and a third tag part PA3 with an internal coil. The clip parts CL1 and CL2 are provided at the ends of, for example, the first tag part PA1 and the third tag part PA3. A metal member MT is also provided on the surface of the third tag section PA3.

As shown in the FIG. 20A, the first tag section PA1, the second tag section PA2 and the third tag section PA3 are each part of the tag body and are arranged in this order along a predetermined direction. A first foldable part is provided between the first and second tag sections PA1 and PA2, and a second foldable part is provided between the second and third tag sections PA2 and PA3. By folding the two folded parts in different directions, the communication tag 470 may be folded so that the second tag part PA2 is sandwiched by the first tag part PA1 and the third tag part PA3.

The FIG. 20B shows a view of the communication tag 470 in a folded state from the front, and the FIG. 20C shows a view of the communication tag 470 in a folded state from the side (e.g. view from the top in the FIG. 20B). As shown in the FIGS. 20B and 20C, the metal member MT provided on the surface of the third tag section PA3 is arranged so as to overlap the antenna provided on the second tag section PA2 if the communication tag 470 in the folded state. In this state, since the antenna is shielded by the metal member MT, the RFID reader 481 can not communicate with the communication tag 470 even if the communication tag 470 is located in the communication range of the RFID reader 481. On the other hand, as shown in the FIG. 20A, if the communication tag 470 is not in the folded state, that is, an open state, since the antenna is not shielded by the metal member MT, the communication tag 470 can communicate with the RFID reader 481.

Figure 21A:
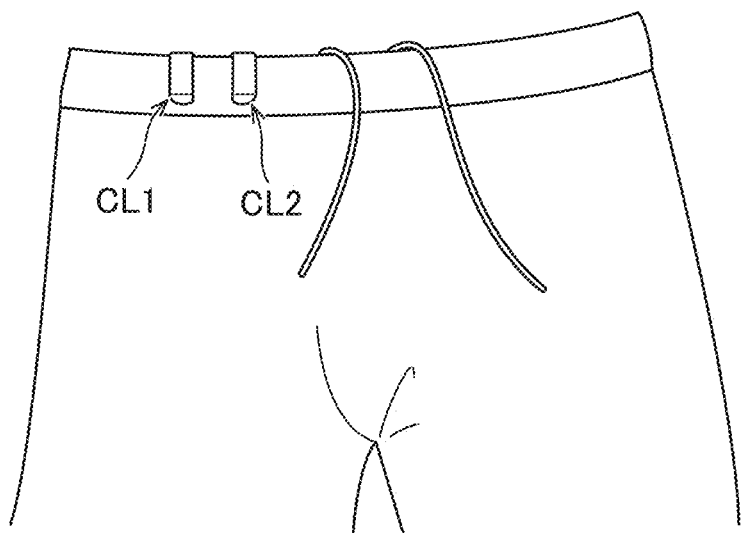
FIG. 21A is an example of attaching the communication tag to a clothing.
Figure 21B:
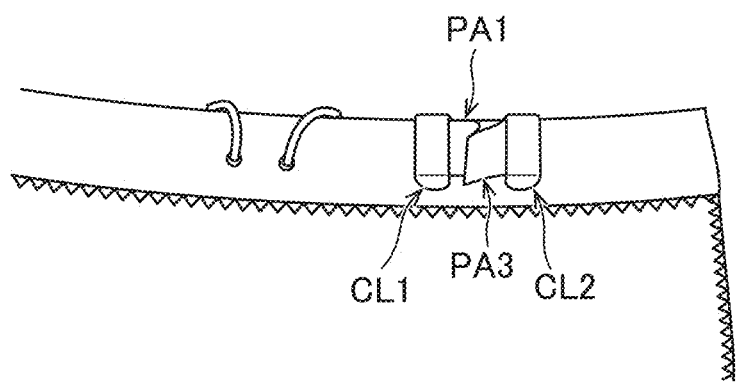
FIG. 21B is an example of attaching the communication tag to the clothing.
Figure 21C:
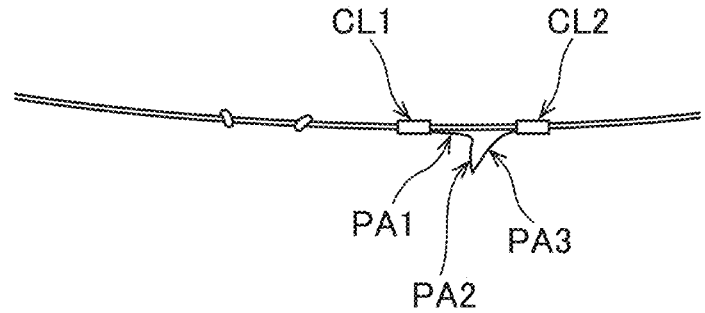
FIG. 21C is an example of attaching the communication tag to the clothing.

The FIGS. 21A to 21C illustrate the communication tag 470 when the communication tag 470 is attached to the clothing. The FIG. 21A shows a view in which a communication tag 470 attached to the clothing is observed from the front side of the clothing, and the FIG. 21B shows a view in which a communication tag 470 attached to the clothing is observed from the back side of the clothing. As shown in the FIGS. 21A and 21B, the communication tag 470 is attached to clothing by clip parts CL1 and CL2 so that the tag body (first tag part PA1 to third tag part PA3) enters inside the clothing. The FIG. 21C shows an upper view of the attached communication tag 470. The communication tag 470 may be attached to clothing by clip parts CL1 and CL2 so that the tag body (first tag part PA1 to third tag part PA3) is located outside the clothing. Various modifications can be applied to a configuration and an attaching method to the clothing.

As shown in the FIGS. 21B and 21C, if no force is applied to the communication tag 470, that is, there is a space between the body of the assisted person and the clothing, the communication tag 470 is configured to open naturally. For example, in the example of the FIG. 21C, the antenna inside the second tag section PA2 does not overlap with the metal member MT on the surface of the third tag section PA3, so the RFID reader 481 can communicate with the communication tag 470. On the other hand, if the assisted person normally wears the clothing, that is, there is no space between the body of the assisted person and the clothing, the area attached to the communication tag 470 (e.g., the waist of the garment) in the clothing will adhere to the assisted person's skin and the underwear of the assisted person. In this case, since the communication tag 470 is pressed against the clothing side by the body of the assisted person, the communication tag 470 is in the folded state as described above using the FIGS. 20B and 20C.

As described above, the communication tag 470 of this embodiment is unable to communicate if the assisted person normally wears the clothing with the communication tag 470, and is able to communicate if the assisted person moved and a position of the communication tag 470 is different from that of the normal state. The condition of the assisted person moves includes the condition in which the assisted person puts his or her hand into the clothing and the elastic band in the clothing is stretched to some extent.

For example, the assisted person could put his or her hand inside the clothing if the assisted person has an urge to defecate. If the assisted person has already excreted with a diaper or other object, the assisted person may put his or her hand inside the clothing to touch his or her excrement. Therefore, by using the communication tag 470 of this embodiment, it becomes possible to identify whether the assisted person takes actions related to defecate and the location where the assisted person takes such actions. That is, rather than simple location tracking, it is possible to detect where a particular situation where the assisted person takes actions related to defecate has occurred.

In particular, the assisted person suffering from dementia may defecate outside the toilet. In this regard, by using the communication tags 470 shown in the FIGS. 20A to 21C, it becomes possible to obtain information on whether the assisted person may defecate outside the toilet, whether the assisted person may defecate improperly and the location where the assisted person may defecate improperly. If the caregivers have already known the location where the assisted person will defecate to some extent, the RFID reader 481 may be provided at the location where the assisted person will defecate. In the method of this embodiment, a normal communication tag (for example, a communication tag always capable of constant communication without any metal member) and a communication tag 470 shown in the FIGS. 20A to 21C may be used in combination. In this way, it becomes possible to detect the timing when the assisted person may put his or her hand inside the clothing and the location where the assisted person may defecate improperly by the communication tag 470 while continuously tracking the location by the communication tag.

In addition, by accumulating the reading results of the RFID reader 481, it is possible to estimate the reason why the assisted person puts his or her hand inside the clothing or touches the clothing. For example, if the communication tag 470 is read frequently by the RFID reader 481 near the electric bed 610, it is considered the assisted person feel sudden skin discomfort. In this case, the information processing system 10 may prescribe or recommend a moisturizer for purchasing. In addition, if the communication tags 470 are read frequently by RFID readers 481 placed in unexpected locations apart from the electric bed 610 (a location other than a toilet, a location may be specific to the assisted person, or a location the assisted person like), the information processing system 10 can presume there is a possibility of improper excretion by disquieting behavior caused by, for example, dementia.

Although the communication tags 470 fixed to the clothing by the clip parts CL1 and CL2 are illustrated in the FIGS. 20A to 21C, the configuration of the communication tags 470 is not limited to this example. For example, elastic stretch belts may be used instead of the clip parts CL1 and CL2 or with the clip parts CL1 and CL2. In this case, the assisted person may wear the communication tag 470 by attaching the stretch belt to the waist with the clip parts CL1 and CL2. In this case, if the stretch belt is properly tightened, the communication tag 470 is in the folded state and the communication tag 470 can not communicate with the RFID reader 481, and if the stretch belt is extended by putting his or her hand inside the clothing, the communication tag 470 is in the open state and the communication tag 470 can communicate with the RFID reader 481.

For example, the server system 100 may acquire and present information about the location to be noted in assisting the assisted person based on the information from the motion determination device 410 and peripheral devices 500 and the information from the RFID reader 481.

The FIG. 22 shows a screen example that suggests the locations to be noted. The image here may be, for example, an image in which an object OB12 representing a location to be noted in assisting the assisted person is superimposed over a map MP of the nursing facilities. The object OB12 is displayed in a highly visible manner compared to other areas of the map MP, for example. The locations to be noted may be the location where the motion determination device 410 detected the risk of falling is high as described above, or the location where the peripheral devices 500 are locked, or the destinations of the peripheral devices 500. The location to be noted may be a location where the assisted person may excrete, such as a location where the communication tag 470 corresponding to FIGS. 20A to 21C has communicated with the RFID reader 481. By presenting the screen shown in the FIG. 22 to the caregiver, the caregiver can evaluate the degree of the risk depending on whether or not the assisted person is near the location to be noted. As a result, the caregiver is able to change his or her response to the assisted person depending on whether or not the assisted person is near the location to be noted, so that the caregiver can assist the assisted person smoothly. Although one screen is shown in the FIG. 22, the object OB12 representing the location to be noted may be changed according to the time periods. The time periods here may be divided into morning, noon, evening, night, midnight, etc., or the time periods can be divided into more finer. In that way, for example, the information processing system 10 can present the information such as the risk of this certain location is high in the evening. As a result, it is possible to contribute to the appropriate allocation of number of the caregiver in nursing homes during the time period when the risk of this certain location is high. For example, in the above example, it would be possible to increase the number of the caregiver deployed around the location where the risk of this certain location is high during the evening.

As shown in the FIGS. 15 to 17B, the meal application AP2 can detect the type and amount of food eaten by the assisted person and the timing the assisted person eats the meal. In addition, by using the communication tag 470, the timing and location of the excretion of the assisted person and the weight of excrement of the assisted person can be detected as described above. In other words, the information processing system 10 of the present embodiment can monitor the entire flow of daily life from eating the meal to excreting, which makes it possible to have the caregiver perform more appropriate assistance. For example, the server system 10 may predict the timing of the excretion of the assisted person, whether the assisted person will be excreting, or the amount of excretion of the assisted person by comparing the amount of food and the amount of excretion of the assisted person. The server system 10 may also estimate and predict the next timing of the excretion based on the past history of eating the meal and excreting.

In addition, the server system 100 may prompt the caregiver to respond to a prescription of a laxative or the like when the assisted person does not excrete despite passing the excretion timing.

3.3 Cooperative Processing Under the Perspective of Disquieting Behavior

The FIG. 23 shows a diagram illustrating the cooperative processing between the positioning application AP1 and other applications or other devices based on the perspective of the disquieting behavior of the assisted person. As shown in the FIG. 23, the disquieting application AP3, the positioning application AP1, and the peripheral devices 500 may cooperate to suppress the risk related to the disquieting behavior of the assisted person. As described above, the disquieting application AP3 is software that detects disquieting behavior of the assisted person and may operate on the server system 100 or other devices such as the terminal device 200 or the management terminal device 300. The positioning application AP1 may then perform processing to support the arrangement of objects located around the assisted person when disquieting application AP3 detects the disquieting behavior of the assisted person.

In the narrow sense, the disquieting behavior may be categorized in the peripheral symptoms of dementia, for example, the peripheral symptoms include the disquieting behavior and delirium. The Delirium indicates a disorder of mental function that involves impaired attention and impaired thinking. The peripheral symptoms, which include psychiatric symptoms and behavioral symptoms, are also called BPSD (Behavioral and Psychological Symptom of Dementia). However, the disquieting behavior in this embodiment includes a wide range of behavior that differs from normal conditions and is not limited to the behavior of dementia factors.

One of the possible factors of the disquieting behavior is environmental factors caused by the environment around the assisted person. For example, the environment around the assisted person includes the condition of the objects placed around the assisted person. More specifically, a factor determining the environment around the assisted person is the location of furniture, the location of the home appliances, the location of the ornaments, or the location of the small items, etc. in the assisted person's living room. For example, for the assisted person suffering from dementia, if there is a change in the arrangement of the objects located around the assisted person, the change may cause the assisted person a major stress, and such the change can be a factor in disquieting behavior.

However, it is burdensome for the caregivers to learn the arrangement of the objects for each assisted person, because the type of object arrangement that is appropriate for suppressing disquieting behavior varies from person to person. In this regard, since the positioning application AP1 supports the arrangement of the objects located around the assisted person as a trigger if detecting the disquieting behavior of the assisted person, it becomes possible to make the caregiver appropriately perform the arrangement of the objects suitable for the assisted person.

A system for evaluating the disquieting risk based on biometric information obtained from sensors worn by the user is described in U.S. patent application Ser. No. 16/755,110, filed on Oct. 5, 2018, titled "Biological information processing system, biological information processing method, and biological information processing program recording medium". This patent application is incorporated by reference herein in its entirety.

For example, in this embodiment, the disquieting application AP3 is capable of electrically connecting or communicating to the acceleration sensor 411 and the detection device 430, and detects the disquieting behavior based on the acceleration value output by the acceleration sensor 411 and biological information output by the detection device 430. In addition, the sensors included in other sensing devices 400, such as the bedside sensors 420 and the seat sensor 440, may be used for the detection processing of disquieting behavior.

If the disquieting behavior is detected, the positioning application AP1 may perform processing to compare the current positions of the peripheral devices 500 with the reference positions of the peripheral devices 500 to support the arrangement of the objects around the assisted person. Here, the reference positions represent the positions of the peripheral devices 500 in the correct image data of the positioning application AP1. If the positioning application AP1 determined that the current positions of the peripheral devices 500 are different from the reference positions, the peripheral devices 500 of this embodiment may automatically move (self-driving) to the reference positions.

In this way, the peripheral devices 500 can be automatically adjusted to the reference position suitable for the assisted person, thus reducing the burden on the caregiver to suppress disquieting behavior. The positioning application AP1 may retain the information identifying the reference positions of the peripheral devices 500 as the correct image data and transmit the information to the peripheral devices 500. For example, the correct image data may be coordinate values in a predetermined coordinate space or a value specifying angles or heights of the peripheral devices 500. Alternatively, the correct image data is image information, and the positioning application AP1 may perform control processing to move the peripheral devices 500 to the reference positions based on the positions of the peripheral device 500 in the correct image data and the current positions of the peripheral devices 500 in the captured image acquired from the terminal devices 200 for example. In this case, the positioning application AP1 may perform a feedback control processing such as that the positioning application AP1 determines the positions of the peripheral devices 500 again after the peripheral devices 500 move and the positioning application AP1 transmits a control signal for re-adjustment to the peripheral devices 500. The peripheral devices 500 may automatically move on accordance with the control signal.

Also, if the disquieting behavior is detected by the disquieting application AP3, the assisted person is in a state different from the normal state and may be more prone to the falling and collisions with the objects around the assisted person. Therefore, if the disquieting behavior is detected, the peripheral devices 500 located around the assisted person may automatically lock the moving part. In this way, it is possible to ensure the safety of the assisted person who is engaging in disquieting behavior. For example, if disquieting behavior is detected, firstly the peripheral device 500 is prioritized to lock the moving part, and after the disquieting behavior has subsided, then the peripheral device 500 may release the locked state and move to the reference positions described above.

As described above, the positioning application AP1 may store the setting information of the electric bed 610 and the wheelchair 630 and adjust the height and the angle of the bottoms of the electric bed 610 and the angle of the backrest of the wheelchair 630 based on the setting information. Therefore, the positioning application AP1 may control the electric bed 610 or the wheelchair 630 to a condition suitable for the assisted person by activating this function in conjunction with the disquieting application AP3.

Also, as shown in the FIG. 23, the processing result of the disquieting application AP3 may be transmitted to the server system 100. In this way, log data of the disquieting behavior of the assisted person can be accumulated in the server system 100. For example, the server system 100 may determine the degree of progression of dementia by chronologically storing the past history of the disquieting behavior, or may determine whether the frequency of the disquieting behavior has decreased by controlling the peripheral devices 500 described above.

3.4 Example of the Detailed Flow

Figure 25:
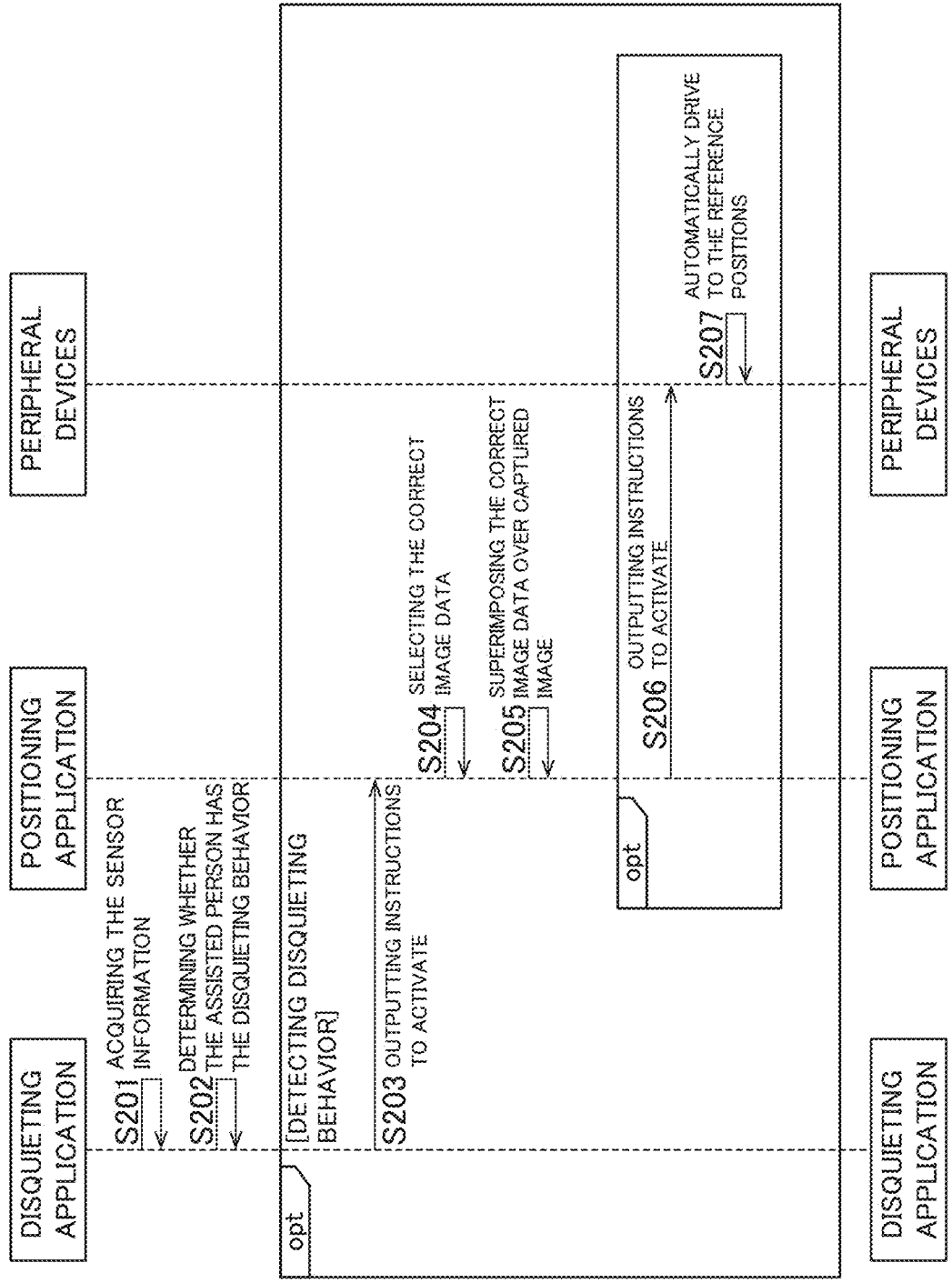
FIG. 25 is a sequence diagram to explain the processing flow of the information processing system of this embodiment.

Next, the detailed flow of the information processing system 10 will be explained using the FIGS. 24 and 25. The FIGS. 24 and 25 illustrate part of cooperative processing. And a processing which is not shown in the FIGS. 24 and 25 may be performed. In addition, when prescribed applications or prescribed devices in the FIGS. 24 and 25 communicate with other applications or other devices, the communication may be done directly or through other devices such as the server system 100, and the communication method can be implemented in various variations.

The FIG. 24 shows a diagram illustrating the cooperative processing based on the aforementioned pressure ulcers and falling perspective. When this processing is started, firstly in the step S101, the meal application AP2 accepts the image corresponding to the "before" based on the screen described above using the FIGS. 16A and 16B. Similarly, in the step S102, the meal application AP2 accepts the image corresponding to the "after" based on the screen described above using the FIGS. 16A and 16B.

In the step S103, the meal application AP2 determines the deficiency of the meal amount and the nutritional deficiency based on comparing the image corresponding to the "before" with the image corresponding to the "after". Specifically, as described above with the reference to the FIGS. 17A and 17B, the meal application AP2 performs object detection processing, setting processing of a circular area, processing of finding the distribution of pixel values, and processing of comparing the distribution based on comparing the image corresponding to the "before" with the image corresponding to the "after".

When the meal application AP2 detects an insufficient amount of food or a nutritional deficiency, the following processing the steps S104 to S112 are performed. First, in the step S104, the meal application AP2 outputs the information for making the positioning application AP1 perform the cooperative processing to the positioning application AP1. The information here may be, for example, a control signal that activates the positioning application AP1 if the positioning application AP1 is in the inactive state, or a control signal that instructs the positioning application AP1 to change the operating mode. Changing the operating mode indicates, for example, adding at least one function to be used or removing at least one function not to be used. The trigger for changing the operation mode of the positioning application AP1 may be provided from other devices or other applications which are separately from the meal application AP2. For example, the trigger here may be a trigger whether the assisted person is staying in the electric bed 610, or a trigger the assisted person is sitting in the wheelchair 630, etc. In this case, if the positioning application AP1 receives the information the trigger to activate, the positioning application AP1 performs the processing after the step S105.

The positioning application AP1 starts performing the cooperative processing which is activated from the processing in the step S104. For example, in the step S105, the positioning application AP1 changes the operation mode from the inactive state to the active state and performs processing to select the correct image data. As mentioned above, the correct image data may be selected based on the selection of the caregiver, or may be selected automatically based on the attributes of the assisted person, etc.

In the step S106, the positioning application AP1 performs processing based on the correct image data. For example, the positioning application AP1 performs the transparent processing to the captured image representing the desired posture of the assisted person as the correct image data, and superimposes the correct image data on the captured current image. However, in the step S106, the positioning application AP1 performs a processing to determine whether the posture of the assisted person is appropriate posture as either OK or NG.

In the step S107, the positioning application AP1 outputs the information for making the motion determination device 410 perform the cooperative processing to the motion determination device 410. The information here may be, for example, a control signal that activates the motion determination device 410 if the motion determination device 410 is in the inactive state. In addition, if the motion determination device 410 has already activated and may perform multiple processing, a control signal for adding the processing which is not activated or removing the processing which is already activated.

In the step S108, the motion determination device 410 performs the processing to detect the motion of the assisted person based on the sensor in the motion determination device 410.

If the motion determination device 410 detects a specific movement of the assisted person in the processing of the step S108, then the motion determination device 410 outputs the information to the positioning application AP1 to change the operation mode of the positioning application AP1 in the step S109. The specific movement here is, for example, a decreasing tendency in the frequency of rolling over in the electric bed 610, or a movement continuing that the pressure in a specific area concentrates. The specific movement is not limited to this, other movement may be the specific movement.

In the step S110, the positioning application AP1 performs cooperative processing with the motion determination device 410 based on the results of the motion determination device 410. Specifically, the positioning application AP1 may change the operation mode to a different mode from a mode operating before receiving the information in the step S109. For example, in the step S110, the positioning application AP1 may change the operation mode to activate the function to automatically change the correct image data. If the positioning application AP1 does not determine whether the posture of the assisted person is appropriate posture as either OK or NG before the step S109, the positioning application AP1 may change the operation mode to activate the function to determine whether the posture of the assisted person is appropriate posture after the step S110.

If the motion determination device 410 detects the risk of falling of the assisted person in the step S108, the motion determination device 410 may output instructions to the peripheral devices 500. In the step 111, the instructions here are instructions to lock the peripheral devices 500 or instructions the peripheral devices 500 automatically move (self-drive).

In the step S112, the peripheral devices 500 locks the moving part or the peripheral devices 500 move to a predetermined location based on the result of the motion determination device 410.

Using the above cooperative processing, if the risk of the pressure ulcers increases due to the deficiency of the meal amount and the nutritional deficiency, the positioning application AP1 automatically may be activated or add the functions to reduce the risk of such pressure ulcers. Also, by the positioning application AP1 performs the cooperative processing with the motion determination device 410 and the peripheral devices 500, it becomes possible to appropriately reduce the risk of falling of the assisted person.

The FIG. 25 shows a diagram illustrating the cooperative processing based on the above-mentioned disquieting behavior perspective. When this processing is started, firstly, in the step S201, the disquieting application AP3 acquires the sensor information sensing the assisted person. For example, as shown in the FIG. 23, the disquieting application AP3 may acquire the output of the acceleration sensor 411 or the detection device 430.

In the step S202, the disquieting application AP3 determines whether the assisted person has the disquieting behavior. As for the specific processing in the step 202, the well-known method can be widely applied.

If the disquieting application AP3 detects that the assisted person has the disquieting behavior in the step 202, following steps S203 to S207 are performed. First, in the step S203, the disquieting application AP3 outputs the information for making the positioning application AP1 perform the cooperative processing to the positioning application AP1. The information here may be, for example, a control signal that activates the positioning application AP1 if the positioning application AP1 is in the inactive state, or a control signal that instructs the positioning application AP1 to change the operating mode.

The positioning application AP1 starts performing the cooperative processing which is activated from the processing in the step S203. Specifically, in the step S204, the positioning application AP1 changes the operation mode from the inactive state to the active state and performs processing to select the correct image data. In the step S205, the positioning application AP1 performs processing based on the correct image data. As described above, the processing here may include determining whether the current positions of the objects located in the environment around the assisted person is close to the reference positions.

If the positioning application AP1 determines that the current positions of the objects differs from the reference positions by more than a predetermined amount in the step S205, the positioning application AP1 outputs the instructions to the peripheral devices 500 to move. The instructions here may be instructions that the peripheral devices 500 automatically move to the reference positions respectively.

In the step S207, the peripheral device 500 performs the cooperative processing to move automatically based on the determination result in the positioning application AP1. Specifically, the peripheral devices 500 move (self-driving) to reference positions determined based on the correct image data of the positioning application AP1.

With the above processing, if the disquieting behavior is detected, it becomes possible to automatically perform a control processing to resolve environmental factors.

Although the present embodiment has been described in detail as described above, a person skilled in the art will readily understand that many modifications can be made that do not materially deviate from the novel matters and effects of the present embodiment. Therefore, all such variations shall be included in the scope of this disclosure. For example, a term appearing at least once in a description or drawing with a different term that is broader or synonymous may be replaced by that different term anywhere in the description or drawing. All combinations of the present embodiment and variations are also included in the scope of this disclosure. Also, the configuration and operation of the information processing device and the information processing method, etc. are not limited to those described in this embodiment, and various modifications can be performed.

What is claimed is:

1. An information processing device comprising:
a processor configured to perform a first processing related to a position of at least one of a person and an object around the person using a positioning application and perform a second processing to determine an amount of food eaten by the person using a meal application,
wherein the processor is configured to change an operation mode of the positioning application from a first mode to a second mode with a higher processing load of the positioning application than the first mode if the meal application determines at least one of the amount of the food or an amount of nutrients is insufficient, the positioning application being operable in a first function in the first mode and being operable in the first function and a second function in the second mode.

2. The information processing device according to the claim 1, wherein:
the meal application is configured to perform a processing of trimming a circular area from an image of the food in a dish, and to determine the amount of food based on the first pixel value of the first region corresponding to a center of the trimmed circular area and the second pixel value of the second region corresponding to a peripheral part of the trimmed circular area.

3. The information processing device according to the claim 1, further comprising:
a motion determination device configured to determine a movement of the person; and
wherein the processor is configured to change an operation mode of the motion determination device if the operation mode of the positioning application is changed to the second mode or if an abnormality of the person is detected based on the processing result of the positioning application.

4. The information processing device according to the claim 3, wherein:
the processor is configured to change a processing of the positioning application from a processing suitable for the person with a first attribute to a processing suitable for the person with a second attribute different from the first attribute if the motion determination device determines a risk of the person is equal or more than a threshold.

5. The information processing device according to the claim 4, wherein:
the processor is configured to perform a third processing to determine whether the person has a disquieting behavior using a disquieting application,
wherein the disquieting application is configured to perform a processing to support an arrangement of objects around the person if the disquieting application determines the person has a disquieting behavior.

6. The information processing device according to the claim 3, further comprising:

a peripheral device including a moving part, the peripheral device locating around the person,
wherein the motion determination device is configured to determine whether there is the risk of falling of the person, and
wherein the peripheral device is configured to lock the moving part or automatically move to a first location if the motion determination device determines the risk of falling of the person.

7. The information processing device according to the claim 6, further comprising:
a communication tag capable of being attached to a clothing of the person, the tag being configured to communicate with a reader if the person put his or her hand into the clothing; and
a memory configured to store a determination result regarding to the risk of falling by the motion determination device in association with a communication result by the reader.

8. The information processing device according to the claim 7, wherein:
the processor is configured to perform a third processing to determine whether the person has a disquieting behavior using a disquieting application,
wherein the disquieting application is configured to perform a processing to support an arrangement of objects around the person if the disquieting application determines the person has a disquieting behavior.

9. The information processing device according to the claim 1, wherein:
the processor is configured to perform a third processing to determine whether the person has a disquieting behavior using a disquieting application,
wherein the disquieting application is configured to perform a processing to support an arrangement of objects around the person if the disquieting application determines the person has a disquieting behavior.

10. An information processing method performed by an information processing system including a processor, the information processing method comprising:
performing, by the processor, a first processing related to a position of at least one of a person and an object around the person using a positioning application;
performing, by the processor, a second processing to determine an amount of food eaten by the person using a meal application; and
changing, by the processor, an operation mode of the positioning application from a first mode to a second mode with a higher processing load of the positioning application than the first mode if the meal application determines at least one of an amount of the food or the amount of nutrients is insufficient, the positioning application being operable in a first function in the first mode and being operable in the first function and a second function in the second mode.

11. The information processing method according to the claim 10, wherein:
performing the second processing, performed by the processor, includes performing a processing of trimming a circular area from an image of the food in a dish, and determining the amount of food based on the first pixel value of the first region corresponding to a center of the trimmed circular area and the second pixel value of the second region corresponding to a peripheral part of the trimmed circular area.

12. The information processing method according to the claim 10, the information processing system including a motion determination device configured to determine a movement of the person, further comprising:

changing, by the processor, an operation mode of the motion determination device if the operation mode of the positioning application is changed to the second mode or if an abnormality of the person is detected based on the processing result of the positioning application.

13. The information processing method according to the claim 12, further comprising:

changing, by the processor, a processing of the positioning application from a processing suitable for the person with a first attribute to a processing suitable for the person with a second attribute different from the first attribute if the motion determination device determines a risk of the person is equal or more than a threshold.

\* \* \* \* \*